United States Patent [19]
Bahn

[11] Patent Number: 5,341,076
[45] Date of Patent: Aug. 23, 1994

[54] HIGH-SPEED RELUCTANCE TYPE MOTOR

[75] Inventor: Itsuki Bahn, Tokyo, Japan

[73] Assignee: Kabushikigaisha Sekogiken, Tokyo, Japan

[21] Appl. No.: 934,739

[22] PCT Filed: Feb. 12, 1992

[86] PCT No.: PCT/JP92/00140

§ 371 Date: Oct. 9, 1992

§ 102(e) Date: Oct. 9, 1992

[87] PCT Pub. No.: WO92/14297

PCT Pub. Date: Aug. 20, 1992

[30] Foreign Application Priority Data

Feb. 12, 1991 [JP] Japan ................... 3-104036

[51] Int. Cl.[5] .................................. H02P 7/06
[52] U.S. Cl. ....................... 318/254; 318/701; 310/68 B; 310/166
[58] Field of Search ............. 318/701, 254, 696, 685, 318/757, 759, 138; 310/168, 193, 216, 68 B, 68 R, 77, 166

[56] References Cited

U.S. PATENT DOCUMENTS

| | | | |
|---|---|---|---|
| 4,368,414 | 1/1983 | Watanabe et al. | 318/696 |
| 4,387,326 | 6/1983 | Ray et al. | 318/701 X |
| 5,075,610 | 12/1991 | Harris | 318/701 |
| 5,097,191 | 3/1992 | Bahn | 318/701 |
| 5,111,091 | 5/1992 | Bahn | 318/701 |
| 5,168,190 | 12/1992 | Bahn | 310/166 |
| 5,214,365 | 5/1993 | Bahn | 318/701 |

FOREIGN PATENT DOCUMENTS

| | | |
|---|---|---|
| 0422226 | 4/1991 | European Pat. Off. . |
| 54-73223 | 6/1979 | Japan . |
| 4-21391 | 1/1992 | Japan . |

Primary Examiner—William M. Shoop, Jr.
Assistant Examiner—David Martin
Attorney, Agent, or Firm—Staas & Halsey

[57] ABSTRACT

A reluctance type motor capable of rotating at a high speed with a large output torque has transistors ($20a$–$20f$) connected to both ends of phase exciting coils ($39a$–$39c$), a current supply control circuit for successively activating the exciting coils in response to position detecting signals, which represent rotor rotational positions to be detected by position detecting elements, and diodes ($21a$–$21f$) connecting the exciting coils and capacitors ($47a$–$47c$). When a current supply to the exciting coil is stopped, the capacitor is promptly charged by a magnetic energy stored in the exciting coil to extinguish the magnetic energy and also to rapidly build up an exciting current supplied to a subsequently activated exciting coil by use of a charged voltage in the capacitor. The position detecting elements are fixed at predetermined positions on an armature so that the current supply operation for the exciting coil can be initiated within an electric angle of 30 degrees after the salient poles begin to enter the magnetic poles.

13 Claims, 24 Drawing Sheets

HIGH-SPEED RELUCTANCE TYPE MOTOR

TECHNICAL FIELD

The present invention relates to a reluctance type motor, and more particularly to a high speed reluctance type motor capable of being used for various purposes in place of a conventional brushless motor and an inverter-equipped inductance motor.

BACKGROUND ART

A reluctance type motor comprising a stator having a plurality of magnetic poles and a rotor coaxially and rotatably disposed with respect to the stator and having a plurality of salient poles, is known so that the rotor can be rotated by magnetic attraction force interacting between successively excited stator magnetic poles and their associated rotor salient poles.

The reluctance type motor is advantageous in that its output torque is relatively large and it does not require a magnet rotor. On the other hand, a conventional reluctance type motor has a disadvantage in that its application field is limited due to a difficulty in operating at a high speed.

That is, an exciting coil of the reluctance type motor has a large inductance and, therefore, a magnetic energy stored in the exciting coil becomes very large. Accordingly, it requires a considerably long time for storing or discharging the magnetic energy. In other words, a building-up and a trailing-edge of the exciting current are undesirably delayed.

Furthermore, since the rotor has many salient poles, a storage and discharge of the magnetic energy in a magnetic pole are numerously repeated during one complete revolution of the rotor. Therefore, a torque reduction is generated due to the delay in its building-up of the exciting current, and a counter torque is also generated due to the delay in its trailing-edge of the exciting current.

As a result, an efficiency of the motor is lowered and its rotational speed is markedly reduced. Even if the numbers of the disposed salient poles and magnetic poles are increased to enlarge the output torque of the motor, the stored magnetic energy is further increased. This results in the increase in the building-up time and the trailing-edge time of the exciting current, thereby largely decreasing the rotational speed. Thus, the motor is not only required to become complicated in its constitution but also required to becomes large in its size.

Especially, in the case of a three-phase full-wave reluctance motor requiring numerous salient poles and magnetic poles, the numbers of the salient poles and magnetic poles have to be increased by more than twice, respectively (compared with other types of motors), thereby making a high-speed driving and a reduction of size difficult.

Moreover, if a high-voltage electric power source is used in order to make steep the building-up of the current supplied to the exciting coil, the exciting current steeply builds up and generates vibrations and electric noises when the magnetic pole has reached its magnetic saturation point.

Still further, where an electric power voltage has to be raised to increase the output torque, an electric power voltage of more than 1000 volts is required to obtain a generally utilized rotational speed (i.e., a several thousands rpm). Thus, the motor loses its practical merit.

SUMMARY OF THE INVENTION

One of objects of the present invention is to provide a reluctance type motor capable of rotating at a high speed and generating a large output torque.

Another object of the present invention is to provide a compact-sized reluctance type motor.

Furthermore, another object of the present invention is to provide a reluctance type motor capable of suppressing vibrations.

In order to accomplish the above objects, one aspect of the present invention provides a reluctance motor having a motor main body including a rotor equipped with a plurality of salient poles and an armature equipped with a plurality of magnetic poles respectively associated with a plurality of exciting coils.

A reluctance type motor according to the present invention comprising: a rotor having an outer surface formed with a plurality of salient poles having the same circumferential width and equally spaced with each other in a circumferential direction and rotatably supported on an outer casing;

an armature having an inner surface formed with 6 n (n: a positive integer) pieces of magnetic pole respectively having a circumferential width of a 120- or 180-degree electric angle and equally spaced with each other in a circumferential direction to face said plurality of salient poles over slight gaps, including No. 1-phase, No. 2-phase and No. 3-phase exciting coils respectively associated with said magnetic poles, said armature being fixed on an inner surface of the outer casing;

a position detecting device, which has a predetermined number of position detecting elements spaced from each other so as to correspond to said exciting coils and successively outputs a No. 1-phase position detecting signal having a rectangular waveform generating a signal of a predetermined signal level having a 120-degree width at regular intervals of a 360-degree electric angle, a No. 2-phase position detecting signal having the same rectangular waveform but delayed by an electric angle of 120 degrees with respect to the No. 1-phase position detecting signal, and a No. 3-phase position detecting signal having the same rectangular waveform but delayed by an electric angle of 120 degrees with respect to the No. 2-phase position detecting signal in accordance with a rotational position of said rotor;

a current supply control circuit including switching elements respectively interposed between a DC electric power source and said No. 1-, No. 2- and No. 3-phase exciting coils for successively activating or deactivating said No. 1-, No. 2- and No. 3-phase exciting coils by successively turning on or off said switching elements in response to said No. 1-, No.2- and No. 3-phase position detecting signals;

a circuit means including diodes respectively connected inversely to joint units comprising said switching elements and said exciting coils, first, second and third back-flow preventing diodes respectively provided in a forward direction with respect to the DC electric power source and respectively relating to said No. 1-, No. 2- and No. 3-exciting coils, and first, second and third capacitors respectively connected in parallel with said first, second and third back-flow preventing diodes, said circuit means not only promptly discharging a magnetic energy stored in one exciting coil into a corresponding one of said first, second and third capacitors through a corresponding one of said inversely connected diodes to charge said one capacitor and extinguish the magnetic energy stored in said one exciting coil when a current supply to said one exciting coil is stopped, but also steeply building up an exciting current supplied to a subsequently activated exciting coil by use of a charged voltage in said one capacitor, wherein said respective position detecting elements are disposed in a manner such that said position detecting device outputs position detecting signals within a 30-degree electric angle section after any one of said salient poles begins to enter any one of said magnetic poles, so that the current supply is initiated to supply an exciting current to an exciting coil associated with said any one of magnetic poles. And, this reluctance type motor is controlled by a three-phase half-wave current supply mode.

And further, it is desirable for said current supply control circuit to include first, second and third inductance coils which are supplied with currents corresponding to said first-, second- and third-phase position detecting signals, respectively, and an electric circuit for converting the magnetic energies stored in said first, second and third inductance coils into electrostatic energies of said corresponding first, second and third capacitors respectively when said first, second and third inductance coils are deactivated.

Furthermore, another aspect of the present invention provides a reluctance type motor comprising: an armature having 12 n (n: a positive integer) pieces of magnetic pole and including No. 1-phase, No. 2-phase and No. 3-phase exciting coils and No. 1-phase, No. 2-phase and No. 3-phase exciting coils respectively associated with said magnetic poles;

a position detecting device for successively generating No. 1-phase, No. 2-phase and No. 3-phase position detecting signals, which are delayed by a 180-degree electric angle from said No. 1-phase, No. 2-phase and No. 3-phase position detecting signals, together with said No. 1-phase, No. 2-phase and No. 3-phase position detecting signals in accordance with a rotational position of said rotor;

a current supply control circuit including switching elements respectively interposed between the DC electric power source and said No. 1-, No. 2-, No. 3-, No. 1-, No. 2- and No. 3-phase exciting coils for successively activating or deactivating said No. 1-, No. 2-, No. 3-, No. 1-, No. 2- and No. 3-phase exciting coils by successively turning on or off said switching elements in response to said No. 1-, No. 2-, No. 3-, No. 1-, No. 2- and No. 3-phase position detecting signals;

a circuit means including diodes respectively connected inversely with joint units comprising said switching elements and said exciting coils; first, a second and third back-flow preventing diodes respectively provided in a forward direction with respect to the DC electric power source and respectively relating to said No. 1- and No. 1-phase exciting coils, No. 2- and No. 2-phase exciting coils, and No. 3- and No. 3-phase exciting coils, and first, second, and third capacitors respectively connected in parallel with said first, second and third back-flow preventing diodes said circuit means not only promptly discharging a magnetic energy stored in one exciting coil into a corresponding one of said first, second and third capacitors through a corresponding one of said inversely connected diodes to charge said one capacitor and extinguish the magnetic energy stored in said one exciting coil when a current supply to said one exciting coil is stopped, but also steeply building up an exciting current supplied to a subsequently activated exciting coil by use of a charged voltage in said one capacitor wherein said respective position detecting elements are disposed in a manner such that said position detecting device outputs position detecting signals within a 30-degree electric angle section after any one of said salient poles begins to enter any one of said magnetic poles, so that the current supply is initiated to supply an exciting current to an exciting coil associated with said any one of magnetic poles. And, this reluctance type motor is controlled by a three-phase full-wave current supply mode.

And further, it is desirable for said current supply control circuit to include first, second and third inductance coils, which are supplied with currents corresponding to said No. 1- and No. 1-phase position detecting signals, No. 2- and No. 2-phase position detecting signals, and No. 3- and No. 3-phase position detecting signals respectively, and an electric circuit for converting the magnetic energies stored in said first, second and third inductance coils into electrostatic energies of said corresponding first, second and third capacitors respectively, when said first, second and third inductance coils are deactivated.

Still further, another aspect of the present invention provides a reluctance type motor controlled by the above-described three-phase half-wave current supply mode and comprising:

a position detecting device, which successively outputs first position detecting signal comprising No. 1-, a No. 2- and a No. 3-phase rectangular waveforms respectively having the same electric angle width of 120 degrees and continuously disposed with each other; and a second position detecting signal comprising No. 1-, No. 2- and No. 3-phase rectangular waveforms respectively having the same electric angle width of 60 degrees corresponding to first-halves of the rectangular waveforms of said first position detecting signal and spaced apart from each other by a 60-degree electric angle in accordance with a rotational position of said rotor; and a current supply control circuit for activating respective exciting coils by successively turning on and off said switching elements in accordance with said first position detecting signal when a rotational speed is not more than a predetermined speed, and further by successively turning on and off said switching elements in accordance with said second position detecting signal when a rotational speed exceeds the predetermined speed. And this reluctance type motor is controlled by a three-phase half-wave current supply mode of 60 degrees.

Similarly, it is desirable in this reluctance type motor that said current supply control circuit includes one inductance coil, which is supplied with a current in response to the No. 1-, No. 2- and No. 3-phase second position detecting signal, and an electric circuit for converting the magnetic energy stored in said inductance coil into an electrostatic energy of said corresponding capacitor, when said inductance coil is deactivated.

Moreover, another aspect of the present invention provides a reluctance type motor comprising: a rotor having an outer surface formed with a plurality of salient poles having the same circumferential width and equally spaced with each other in a circumferential direction and rotatably supported on an outer casing;

an armature having an inner surface formed with 12 n (n: a positive integer) pieces of magnetic pole respectively having a circumferential width of a 120- or 180-degree electric angle and equally spaced apart from each other in a circumferential direction so as to face said plurality of salient poles over slight gaps, and including No. 1-phase, No. 2-phase and No. 3-phase exciting coils and No. 1-phase, No. 2-phase and No. 3-phase exciting coils respectively associated with said magnetic poles, said armature being fixed on an inner surface of the outer casing;

a position detecting device, which has a predetermined number of position detecting elements spaced from each other corresponding to said exciting coils and successively outputs No. 1-phase position detecting signal having a rectangular waveform generating a signal of a predetermined signal level having a 60-degree width at regular intervals of a 360-degree electric angle, No. 2-phase position detecting signal having the same rectangular waveform but delayed by an electric angle of 120 degrees with respect to the No. 1-phase position detecting signal, and No. 3-phase position detecting signal having the same rectangular waveform but delayed by an electric angle of 120 degrees with respect to the No. 2-phase position detecting signal and also No. 1-phase, No. 2-phase and No. 3-phase position detecting signals having a similar rectangular waveform and disposed between said No. 1-phase, No. 2-phase and No. 3-phase position detecting signals in accordance with a rotational position of said rotor;

a current supply control circuit including switching elements respectively interposed between a DC electric power source and said No. 1-, No. 2-, No. 3-, No. 1-, No. 2- and No. 3-phase exciting coils for successively activating or deactivating said No. 1-, No. 2-, No. 3-, No. 1-, No. 2- and No. 3-phase exciting coils by successively turning on or off said switching elements in response to said No. 1-, No. 2-, No. 3-, No. 1-, No. 2- and No. 3-phase position detecting signals;

circuit means including diodes respectively connected inversely with joint units comprising said switching elements and said exciting coils, first and second back-flow preventing diodes respectively provided in a forward direction with respect to the DC electric power source and relating to said No. 1-, No. 2- and No. 3-phase exciting coils and No. 1-, No. 2- and No. 3-phase exciting coils respectively, and first and second capacitors connected in parallel with said first and second back-flow preventing diodes respectively; said circuit means not only promptly discharging a magnetic energy stored in one exciting coil into a corresponding one of said first and second capacitors through a corresponding one of said inversely connected diodes to charge said one capacitor and extinguish the magnetic energy stored in said one exciting coil when a current supply to said one exciting coil is stopped, but also steeply building up an exciting current supplied to a subsequently activated exciting coil by use of a charged voltage in said one capacitor;

said respective position detecting elements being disposed in a manner such that said position detecting device outputs position detecting signals within 30-degree electric angle section after any one of said salient poles begins to enter any one of said magnetic poles, so that the current supply is initiated to supply an exciting current to an exciting coil associated with said any one of magnetic poles. And, this reluctance type motor is controlled by a three-phase full-wave current supply mode.

And further, it is desirable for said current supply control circuit to include first inductance coil which is supplied with currents corresponding to said No. 1-, No. 2- and No. 3-phase position detecting signals second inductance coil which is supplied with currents corresponding to said No. 1-, No. 2- and No. 3-phase position detecting signals; and an electric circuit for converting the magnetic energies stored in said first and second inductance coils into electrostatic energies of said corresponding first and second capacitors respectively, when said first and second inductance coils are deactivated.

Yet further, another aspect of the present invention provides a two-phase full-wave current supply mode high-speed reluctance type motor. This two-phase full-wave current supply mode reluctance type motor comprises:

a rotor having an outer surface formed with a plurality of salient poles having the same circumferential width and equally spaced from each other in a circumferential direction and rotatably supported on an outer casing;

an armature having an inner surface formed with 8 n (n: a positive integer) pieces of magnetic pole respectively having a circumferential width of a 120- or 180-degree electric angle and equally spaced from each other in a circumferential direction to face said plurality of salient poles over slight gaps, including No. 1-phase and No. 2-phase exciting coils and No. 1-phase and No. 2-phase exciting coils respectively associated with said magnetic poles, said armature being fixed on an inner surface of the outer casing;

a position detecting device, which has a predetermined number of position detecting elements spaced from each other so as to correspond to said exciting coils and successively outputs No. 1-phase position detecting signal having a rectangular waveform generating a signal of a predetermined signal level having a 90–150-degree width at regular intervals of a 360-degree electric angle and No. 2-phase position detecting signal having the same rectangular waveform but delayed by an electric angle of 90 degrees with respect to the No. 1-phase position detecting signal and also No. 1-phase and No. 2-phase position detecting signals delayed by an electric angle of 180 degrees with respect to said No. 1-phase and No. 2-phase position detecting signals respectively in accordance with a rotational position of said rotor;

a current supply control circuit including switching elements respectively interposed between a DC electric power source and said No. 1, No. 2-, No. 1- and No. 2-phase exciting coils for successively activating or deactivating said No. 1-, No. 2-, No. 1- and No. 2-phase exciting coils by successively turning on or off said switching elements in response to said No. 1, No. 2-, No. 1- and No. 2-phase position detecting signals;

circuit means including diodes respectively connected inversely with joint units comprising said switching elements and said exciting coils; first and second back-flow preventing diodes respectively provided in a forward direction with respect to the DC electric power source and relating to said No. 1- and No. 1-phase exciting coils, and No. 2- and No. 2-phase exciting coils respectively; and first and second capacitors connected in parallel with said first and second back-flow preventing diodes respectively; said circuit means not only promptly discharging a magnetic energy stored in one exciting coil into a corresponding one of said first and second capacitors through a corresponding one of said inversely connected diodes to charge said one capacitor and extinguish the magnetic energy stored in said one exciting coil when a current supply to said one exciting coil is stopped, but also steeply building up an exciting current supplied to a subsequently activated exciting coil by use of a charged voltage in said one capacitor;

said respective position detecting elements disposed in a manner such that said position detecting device outputs position detecting signals within a 45-degree electric angle section after any one of said salient poles begins to enter any one of said magnetic poles, so that the current supply is initiated to supply an exciting current to an exciting coil associated with said any one of magnetic poles.

And further, it is desirable for said current supply control circuit to include first inductance coil which is supplied with currents corresponding to said No. 1- and No. 1-phase position detecting signals; a second inductance coil which is supplied with currents corresponding to said No. 2- and No. 2-phase position detecting signals; and an electric circuit for converting the magnetic energies stored in said first and second inductance coils into electrostatic energies of said corresponding first and second capacitors respectively, when said first and second inductance coils are deactivated.

Furthermore, another aspect of the present invention provides a two-phase full-wave current supply mode high-speed reluctance type motor. This high-speed reluctance type motor comprises:

a rotor having an outer surface formed with a plurality of salient poles having the same circumferential width and equally spaced with each other in a circumferential direction and rotatably supported on an outer casing;

an armature having an inner surface formed with 8 n (n: a positive integer) pieces of magnetic pole respectively having a circumferential width of a 120- or 180-degree electric angle and equally spaced from each other in a circumferential direction so as to face said plurality of salient poles over slight gaps, including No. 1-phase and No. 2-phase exciting coils and No. 1-phase and No. 2-phase exciting coils respectively associated with said magnetic poles; said armature being fixed on an inner surface of the outer casing;

a position detecting device, which has a predetermined number of position detecting elements spaced from each other so as to correspond to said exciting coils and successively outputs No. 1-phase position detecting signal having a rectangular waveform generating a signal of a predetermined signal level having a 90–150-degree width at regular intervals of a 360-degree electric angle and No. 2-phase position detecting signal having the same rectangular waveform but delayed by an electric angle of 90 degrees with respect to the No. 1-phase position detecting signal and also No. 1-phase and No. 2-phase position detecting signals delayed by an electric angle of 180 degrees with respect to said No. 1-phase and No. 2-phase position detecting signals respectively, in accordance with a rotational position of said rotor;

a current supply control circuit including switching elements respectively interposed between a DC electric power source and said No. 1-, No. 2-, No. 1- and No. 2-phase exciting coils for successively activating or deactivating said No. 1-, No. 2-, No. 1- and No. 2-phase exciting coils by successively turning on or off said switching elements in response to said No. 1-, No. 2-, No. 1- and No. 2-phase position detecting signals;

circuit means including diodes respectively connected inversely with joint units comprising said switching elements and said exciting coils; first, second, third and fourth back-flow preventing diodes respectively provided in a forward direction with respect to the DC electric power source and relating to said No. 1-, No. 1-, No. 2- and No. 2-phase exciting coils respectively; and first, second, third and fourth capacitors connected in parallel with said first, second, third and fourth back-flow preventing diodes; said circuit means not only promptly discharging a magnetic energy stored in one exciting coil into a corresponding one of said first, second, third and fourth capacitors through a corresponding one of said inversely connected diodes so as to charge said one capacitor and extinguish the magnetic energy stored in said one exciting coil when a current supply to said one exciting coil is stopped, but also steeply building up an exciting current supplied to a subsequently activated exciting coil by use of a charged voltage in said one capacitor; said respective position detecting elements being disposed in a manner such that said position detecting device outputs position detecting signals within a 45-degree electric angle section after any one of said salient poles begins to enter any one of said magnetic poles, so that the current supply is initiated to supply an exciting current to an exciting coil associated with said any one of magnetic poles.

And further, it is desirable for said current supply control circuit to include first, second, third and fourth inductance coils which are supplied with currents corresponding to said No. 1-, No. 1-, No. 2- and No. 2-phase position detecting signals, and an electric circuit for converting the magnetic energies stored in said first, second, third and fourth inductance coils into electrostatic energies of said corresponding first, second, third and fourth capacitors respectively, when said first, second, third and fourth inductance coils are deactivated.

Still further, it is desirable to dispose the same-phase magnetic poles opposite to with each other in a diametrical direction of the armature to suppress vibrations.

As is described above, according to the present invention, a current supply is initiated within 30 degrees after the salient poles begin to enter the magnetic poles, and further a magnetic energy stored in an exciting coil is converted into an electrostatic energy of a capacitor when the exciting coil is deactivated, whereby the electrostatic energy can be converted into a magnetic energy of a subsequently activated exciting coil to make a building-up and a trailing-edge of the exciting current steep.

Thus, torque reduction and occurrence of counter torque can be suppressed, whereby not only a high output torque can be obtained but a motor can be driven at a high speed (up to approximately 100 thousand rpm). Especially, the copper losses of the exciting coils and iron losses of the magnetic cores occurring during the transfer of the magnetic energies between the exciting coils can be compensated by utilizing the magnetic energies stored in the inductance coils, so that the building-up and trailing-off of the exciting current in the exciting coil can be made steep. Hence, a motor with a large output torque and capable of operating at a high speed can be obtained.

Still further, by using a full-wave current supply operation, torque ripple components can be reduced.

BEST MODE FOR CARRYING OUT THE INVENTION

Figure 1:
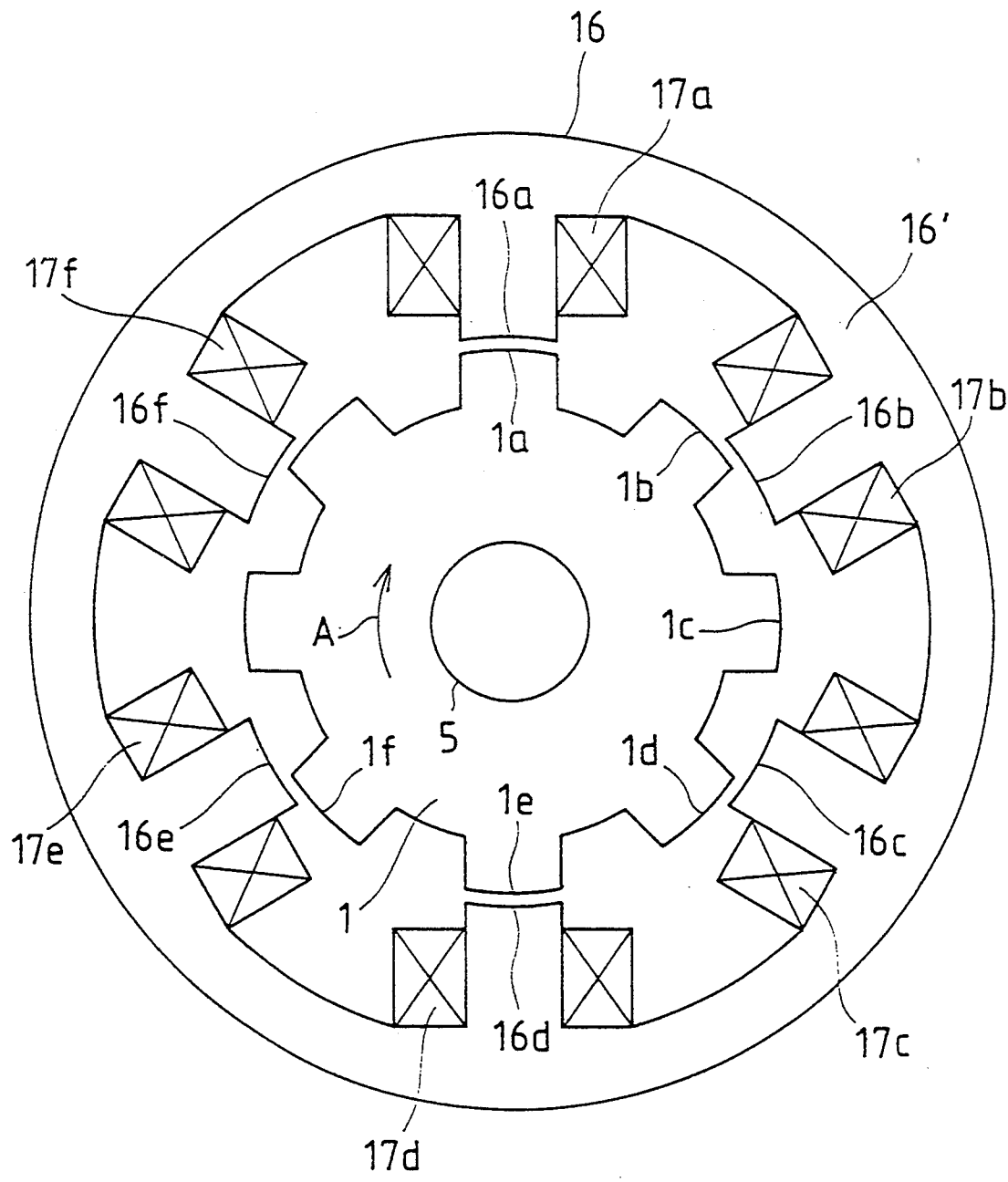
FIG. 1 is a schematic side view showing a rotor and an armature of a three-phase half-wave reluctance type motor in accordance with first embodiment of the present invention.
Figure 2:
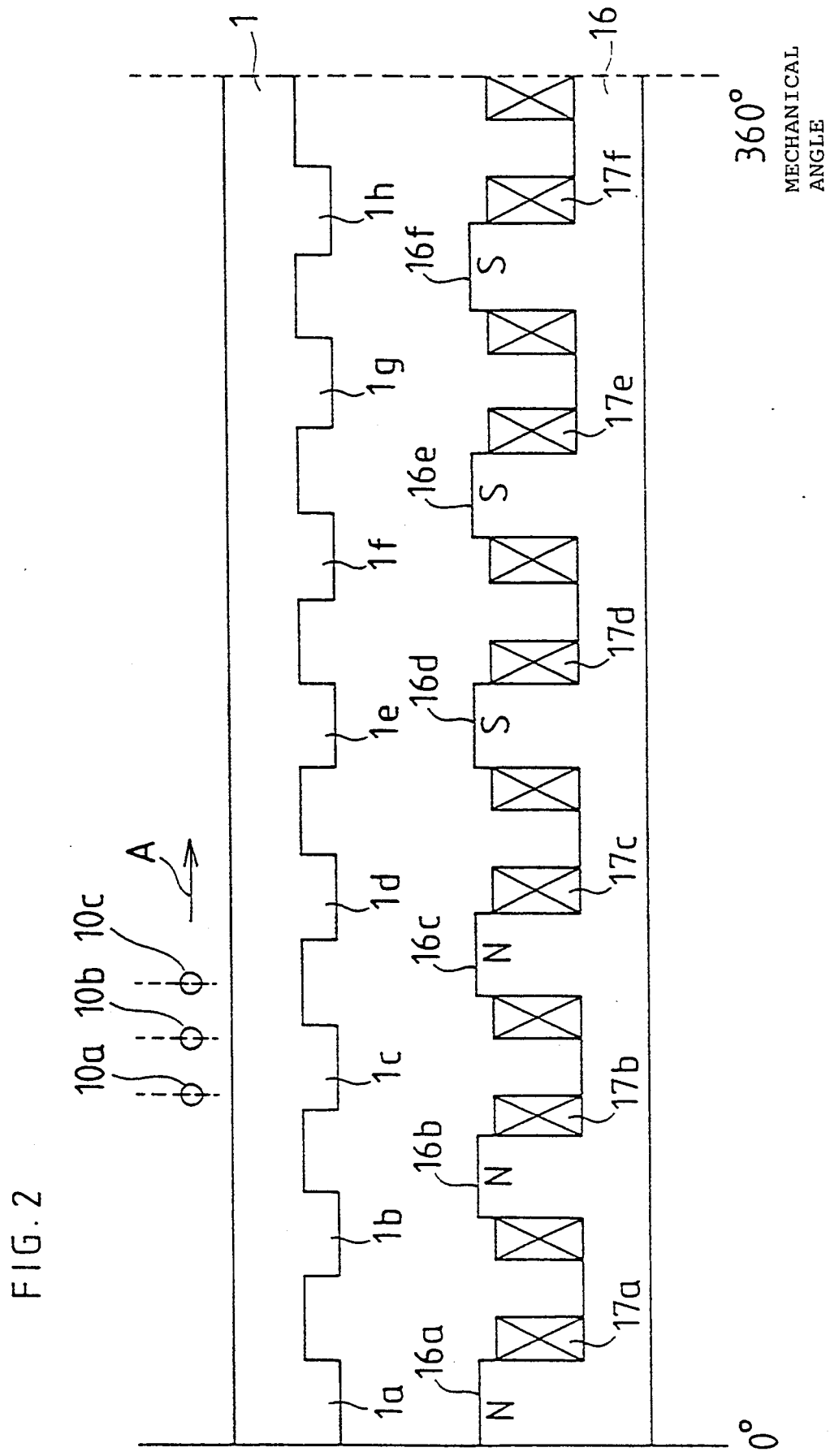
FIG. 2 is a schematic development showing the rotor and the armature of FIG. 1.

A three-phase half-wave reluctance type motor in accordance with first embodiment of the present invention comprises a motor main body shown in FIGS. 1 and 2. The motor main body comprises a rotor 1 coupled with a rotor shaft 5 rotatably supported on bearings provided on an outer casing (not shown but corresponding to a component indicated by a reference numeral 64b in FIG. 14) and an armature (i.e., a stator) 16 fixed on the outer casing disposed coaxially with the rotor 1. The rotor 1 and the armature 18 are respectively made of a well-known lamination-structure of silicon steel sheets.

On an outer peripheral surface of the rotor 1, eight salient poles 1a to 1h, each having the same circumferential width of 180-degree electric angle (hereinafter, various angular parameters are defined by the electrical angle), are formed uniformly at regular intervals of a 360-degree phase-difference in a circumferential direction. Moreover, the armature 16 has a circular magnetic core 16′ capable of freely forming a magnetic path, and six magnetic poles 16a to 16f each having the same circumferential width of 180 degrees are formed at regular intervals in a circumferential direction on an inner peripheral surface of the magnetic core, as well as facing salient pole 1a to 1h over an air gap of 0.1 to 0.2 mm; e.g., approximately 0.15 mm.

These magnetic poles 16a to 16f are associated with exciting coils 17a to 17f, respectively. The exciting coils 17a and 17d are connected with each other in series or in parallel. Hereinafter, this connected unit is referred to as first phase exciting coil pair 39a. The exciting coils 17b and 17e and the exciting coils 17c and 17f are connected in the same fashion as the first phase exciting coil pair 39a. These connected units are referred to as second phase exciting coil pair 39b and a third phase exciting coil pair 39c, respectively.

Figure 3:
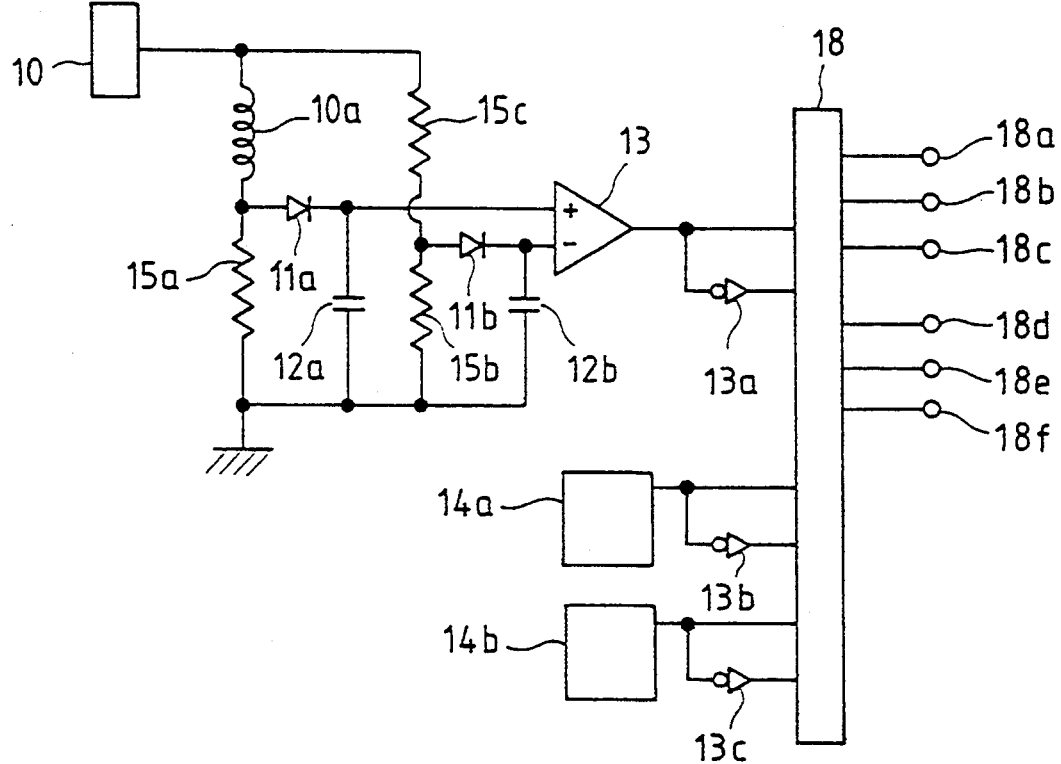
FIG. 3 is a schematic circuit diagram showing a position detecting device of the first embodiment.

The motor comprises a position detecting device shown in FIG. 3. This position detecting device includes three detecting coils 10a to 10c (FIG. 2) each comprising an air-core coil of approximately 100 turns having a 5 mm diameter for detecting rotational positions of salient poles 1a to 1h of the rotor 1. These detecting coils are respectively spaced by an amount of 120 degrees with each other, and respective coil surfaces are fixed on the armature 16 to face the side surfaces of the salient poles 1a to 1h through an air gap. Furthermore, the position detecting device includes an oscillator 10 having an oscillation frequency of approximately 1 MHz and bridge circuits respectively relating to the detecting coils 10a to 10c.

A bridge circuit relating to the detecting coil 10a comprises detecting coil 10a and resistances 15a to 15c. This bridge circuit is adjusted to balance in a condition where the detecting coil 10a does not face any of the salient poles 1a to 1h. This bridge circuit is connected to two low-pass filters respectively comprises diodes 11a and 11b and capacitors 12a and 12b, an operational amplifier 13, and a logic circuit 18.

The logic circuit 18 is constituted by a conventional control circuit for a three-phase Y-type semiconductor motor, and provided with six output terminals 18a to 18g. In more detail, the diode 11a has its anode connected to the connecting point of the coil 10a and also to the resistance 15a, whereas its cathode connected to one end of the capacitor 12a whose the other end is grounded and also to the positive input terminal of the operational amplifier 13. And, the diode 11b has its anode connected to the connecting point of the resistances 15b and 15c, whereas its cathode is connected to both one end of the capacitor 12b whose the other end grounded and also to the negative input terminal of the operational amplifier 13. An output terminal of the operational amplifier 13 is connected not only to an input terminal of the logic circuit 18 but also to an input terminal of an inversion circuit 13a interposed between them.

In FIG. 3, reference numerals 14a and 14b denote circuits relating to coils 10b and 10c respectively. Each circuit comprises circuit components corresponding to those of the coil 10a such as a bridge circuit, low-pass filters and an operational amplifier. These circuits 14a and 14b are connected to the oscillator 10 which is commonly provided for all the three detecting coils 10a, 10b, and 10c.

As shown above, the bridge circuit of the position detecting device is adjusted to be balanced when the detecting coils 10a to 10c do not face any one of the salient poles 1a to 1h of the rotor 1. Accordingly, when the detecting coil 10a does not face any one of the salient poles 1a to 1h, an output of the low-pass filter comprising the diode 11a and the capacitor 12a becomes equal to an output of the low-pass filter comprising the diode 11b and the capacitor 12b. Therefore, an output of the operational amplifier 13 becomes a LOW-level. Actually, however, when the motor is stopped, any one of the detecting coils faces any one of the salient poles.

Accordingly, for example, in the case where the detecting coil 10a faces any one of the salient poles, an impedance of the detecting coil 10a decreases due to core loss (i.e., eddy loss and hysteresis loss). Therefore, a voltage drop in the resistance 15a becomes large, and an applied voltage to the positive input terminal of the operational amplifier 13 increases to turn the output of the operational amplifier 13 into a HIGH-level as is indicated by the reference numerals 33a and 33b in FIG. 6. That is, as the rotor 1 rotates, rectangular waveform signals 33 are sent out from the operational amplifier 13. On the other hand, the inversion circuit 13a sends out rectangular-waveform signals (not shown) corresponding to the inverted signal of the rectangular-waveform signals 33.

In the same way, when each of the detecting coils 10b and 10c faces the side surface of any one of salient poles 1a to 1h, the output of the operational amplifiers in the respective blocks 14a and 14b are turned into a HIGH-level (as indicated by the reference numerals 34a, 34b, 35a and 35b). And, in accordance with the rotation of the rotor 1, rectangular waveform signals 34 and 35 are sent out from both operational amplifiers. Furthermore, the inversion circuits 13b and 13c send out rectangular waveform signals (not shown) corresponding to the inverted signals of the rectangular waveform signals 34 and 35. These rectangular waveform signals 33, 34 and 35 have a phase-difference of 120 degrees with each other.

Output terminals 18a to 18f, of the logic circuit 18 which inputs the rectangular waveform signals 33 to 35 and the rectangular waveform signals corresponding to their inverted signals, output rectangular-waveform position detecting signals 36–38 and 43–45 (FIG. 6) representing rotational positions of the rotor 1. The signal 36 and the signal 43 have a 180-degree phase difference with each other. The signal 37 and signal 44 have a 180-degree phase difference with each other, and the signal 38 and signal 45 have a 180-degree phase difference, whereas the signals 36–38 have a 120-degree phase difference with each other, and the signals 43–45 have a 120-degree phase difference.

Figure 4:
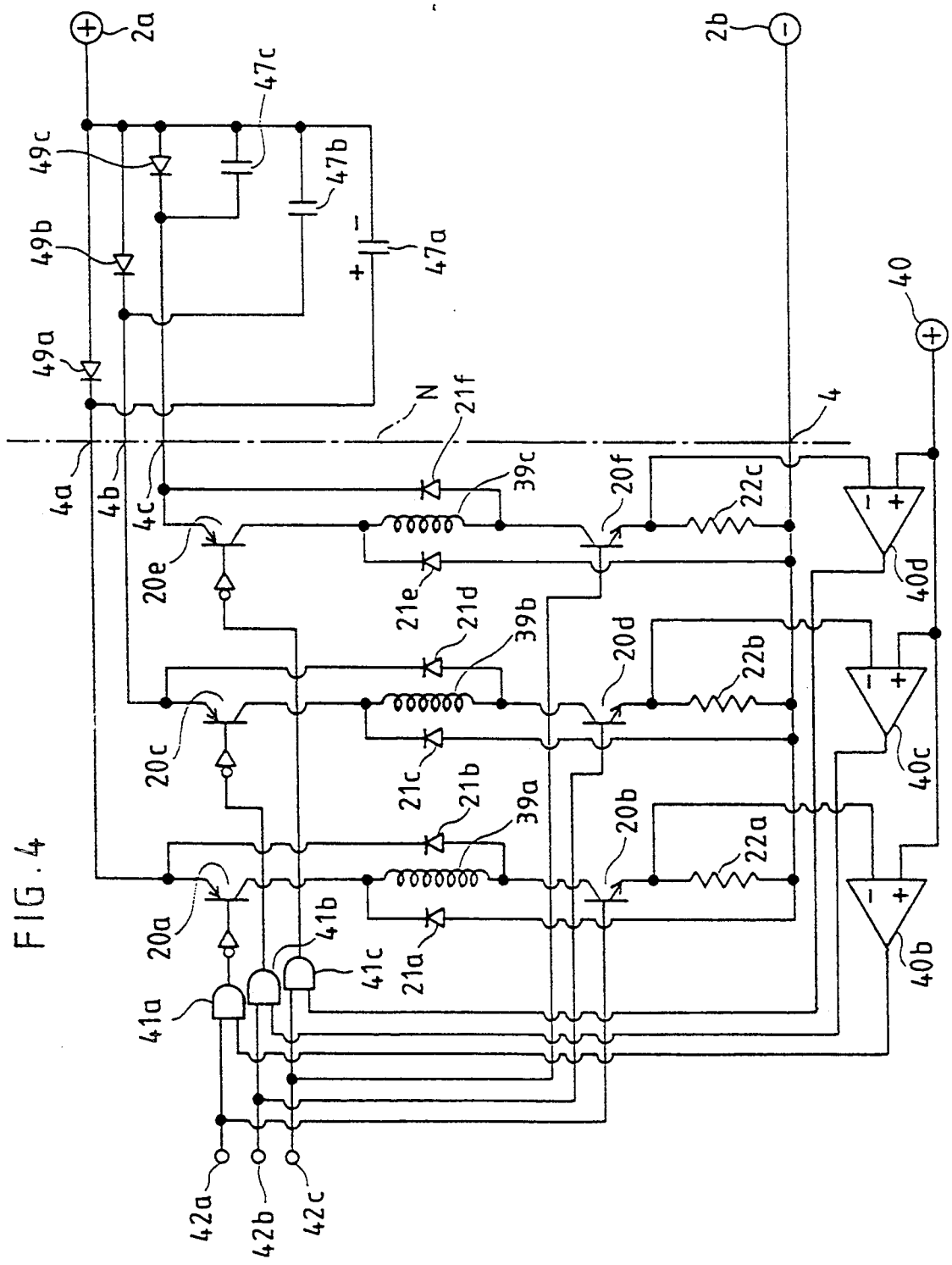
FIG. 4 is a circuit diagram showing a current supply control circuit used in the first embodiment.

The motor further comprises a current supply control circuit shown in FIG. 4 to supply or stop exciting currents to the exciting coils 17a to 17f i.e. the No. 1- to No. 3-phase exciting coil pairs 39a to 39c.

Input terminals 42a to 42c of the current supply control circuit are connected, on one hand, to output terminals 18a to 18c of the above-described position detecting device, and connected, on the other hand, to one side of input terminals of AND circuits 41a, 41b and 41c of the current supply control circuit respectively. And, the other side of the input terminals of the AND circuits 41a to 41c are connected to a standard voltage input terminal 40, to which a standard voltage is applied in order to vary an output torque of the motor, through operational amplifiers 40b, 40c and 40d, which constitutes later-described chopper circuits together with the AND circuits.

Further, output terminals of the AND circuits 41a to 41c are connected, through inversion circuits, to the bases of transistors (i.e., switching elements) 20a, 20c, and 20e, respectively which are interposed between back-flow preventing diodes 49a, 49b and 49c, respectively which are respectively connected to a positive terminal 2a of the DC electric power source, and one end of each of the No. 1- to the No. 3-phase exciting coil pairs 39a to 39c. These diodes 49a to 49c are connected to the DC electric power source in a forward direction, and capacitors 47a, 47b and 47c are connected in parallel with diodes 49a to 49c, respectively.

The other ends of the No. 1- to No. 3-phase exciting coil pairs 39a to 39c are connected to collectors of the transistors 20b, 20d and 20f. Emitters of the respective transistors are connected to negative input terminals of the operational amplifiers 40b, 40c and 40d. Bases of the transistors 20b, 20d and 20f are connected to the input terminals 42a, 42b and 42c, respectively. And, the emitters of the transistors 20b, 20d and 20f are connected to the negative input terminal of the DC electric power source through resistances 22a, 22b and 22c provided for detecting exciting current values flowing in the No. 1- to No. 3-phase exciting coil pairs, respectively.

Anodes of diodes 21a, 21c and 21e are connected to the connecting points between the negative terminal 2b and respective resistances 22a, 22b and 22c. Cathodes of these diodes 21a, 21c, and 21f are connected to one end of the No. 1- to the respectively No. 3-phase exciting coil pairs 39a to 39c.

And further, diodes 21b, 21d and 21f are interposed between the other ends of the No. 1- to the No. 3-phase exciting coil pairs 39a to 39c and the positive terminal 2a of the DC electric power source.

Hereinafter, an operation of the reluctance type motor, constituted as described above, is explained.

When the motor is turned on, an electric current is supplied from the positive and negative terminals 2a and 2b of the DC electric power source to the current supply circuit (FIG. 4). Furthermore, negative input terminals of the operational amplifiers 40b to 40d are applied with voltages lower than the voltages applied to their positive input terminals. HIGH-level signals are applied from the operational amplifiers 40b–40d to the AND circuits 41a to 41c to open the gates of these AND circuits. When the motor is started, any one of the detecting coils 10a to 10c of the position detecting device faces any one of the salient poles 1a to 1h of the rotor 1 of the motor.

In such a condition, for example, when the second phase position detecting signal 37a of a HIGH-level is applied from the position detecting device to an input terminal 42b of the current supply control circuit (FIG. 4), a HIGH-level signal 37a is applied to the base of the transistor 20d. And, this HIGH-level output sent out from the AND circuit 41b, whose gate is in an open condition, is converted into a LOW-level output through the inversion circuit and, in turn, applied to the base of the transistor 20c. Accordingly, the transistor 20c is turned on, and the transistor 20d is also turned on by a HIGH-level signal inputted through the input terminal 42b to activate the exciting coils 17b and 17e (the second phase exciting coil pair 39b).

As a result, magnetic poles 16b and 16f of the armature 16 are magnetized. Accordingly, the salient poles 1b and 1f are attracted by a magnetic force to cause the rotor 1 to rotate in a direction A of FIG. 1. After that, if the rotor 1 rotates 120 degrees, the second phase position detecting signal 37 becomes a LOW-level and, at the same time, the third phase position detecting signal 38a of a HIGH-level is applied to the input terminal 42c of the current supply control circuit. Thus, the transistors 20c and 20d are turned off to deactivate the exciting coil pair 39b, whereas the transistors 20e and 20f are turned on to activate the exciting coil pair 39c.

If, the rotor i further rotates 120 degrees, the transistors 20e and 20f are turned off to deactivate the exciting coil pair 39c, whereas the transistors 20a and 20b are turned on to activate the exciting coil pair 39a.

In such a manner, a current supply mode is cyclically alternated at intervals of a 120-degree revolution as follows; the exciting coil pair 39a→ the exciting coil pair 39b→ the exciting coil pair 39c. As a result, the exciting coil pairs 39a to 39c are successively and continuously supplied with exciting current to cause the motor to generate output torque.

In this case, a pair of magnetic poles being symmetrically positioned are magnetized oppositely to be an N-pole and an S-pole respectively as shown in FIG. 2. Accordingly, leaking magnetic fluxes passing non-excited magnetic poles will have directions opposite to each other, since excited two magnetic poles always have opposite polarities, whereby it becomes possible to prevent a counter torque from being generated.

As long as each phase exciting coil is energized, for example, as long as the first phase exciting coil pair 39a is activated by a HIGH-level first phase position detecting signal 36a, if a voltage applied between the resistance 22a representing an exciting current flowing in the exciting coil pair 39a exceeds a set value corresponding to the variable standard voltage, which is applied to the positive input terminal of the operational amplifier 40b through the standard voltage input terminal 40 in the current supply control circuit of FIG. 4, an output of the operational amplifier becomes a LOW-level output, and the gate of AND circuit 41a closes to deactivate the transistor 20a.

Subsequently, when the exciting current reduces down to a predetermined value based on a hysteresis characteristic of the operational amplifier 40b, the output of the operational amplifier returns to a HIGH-level to activate the transistor 20a again, thereby further causing exciting current to flow.

In this manner, the operational amplifier 40b cooperates with the AND circuit 41a to activate or deactivate the transistor 20a by comparing the exciting current and the above set value in controlling the exciting current depending on the voltage applied to the standard voltage terminal 40, thereby controlling the output torque of the motor. Besides, the exciting current becomes a rectangular waveform, and thus a large output torque can be obtained. The same principle applies to the No. 2- and No. 3-phase circuit portions. Thus, the operational amplifiers 40b to 40d function as chopper circuits together with the AND circuits 41a to 41c.

Next, referring to FIG. 7, the operational characteristics of the motor according to the present embodiment will be described.

Figure 7:
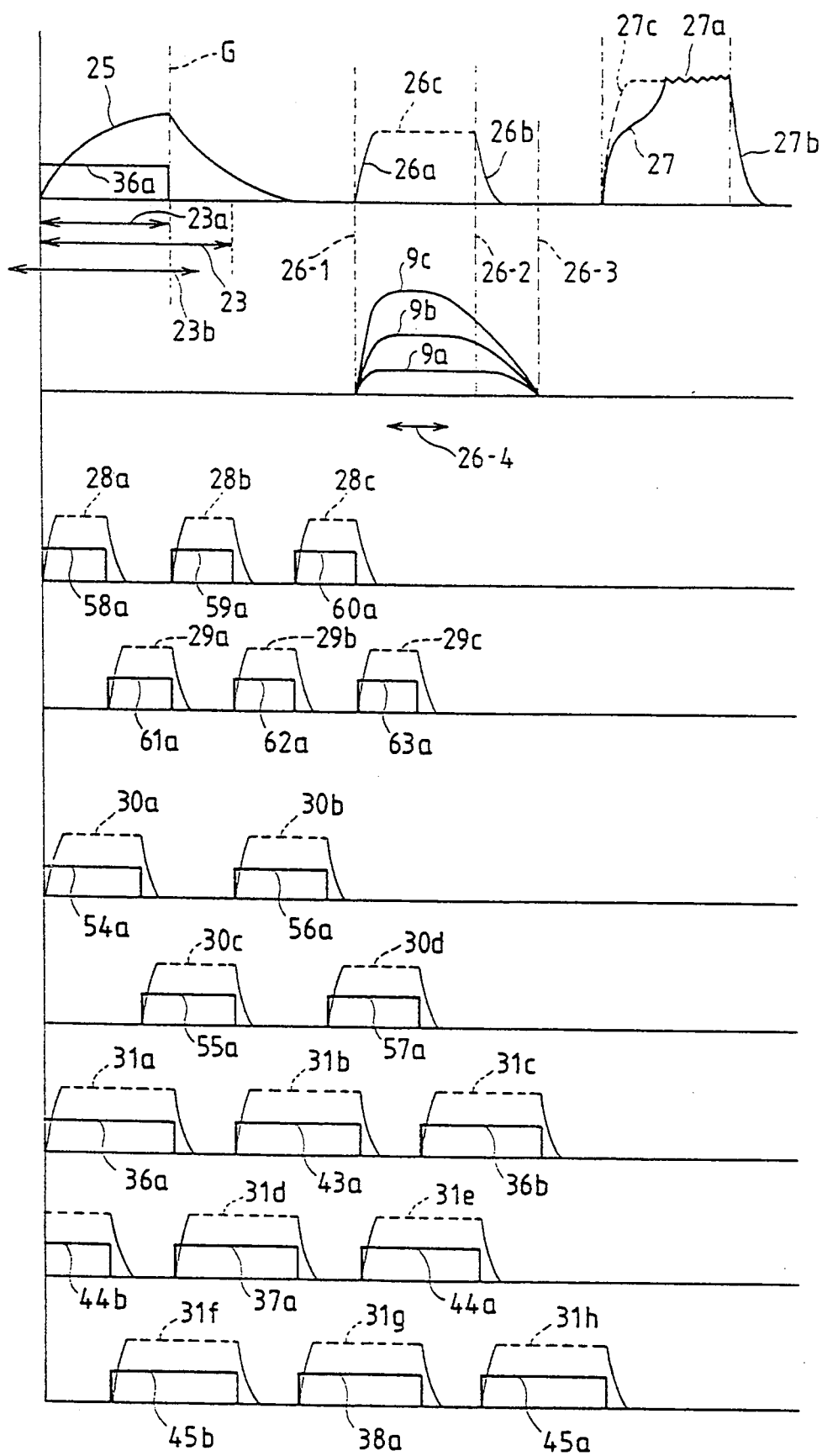
FIG. 7 is a timing chart showing currents supplied to the exciting coils.

In a conventional motor not including back-flow preventing diodes 49a–49c and capacitors 47a–47c, if the No. 1-phase exciting coil pair 39a is supplied with an exciting current with respect to a section corresponding to a 120-degree width of the No. 1-phase position detecting signal 36a indicated by an arrow 23a in FIG. 7, a large inductance will be generated, since the salient poles start to enter the magnetic poles to close a magnetic path between the salient poles and magnetic poles simultaneously with the initiation of the current supply operation. Thus, there is the rise of exciting current delays as shown by first half of the curve 25. For this reason, an output torque of the motor decreases. In other words, a torque reduction occurs.

Furthermore, when the current supply is discontinued, a magnetic energy stored in the exciting coil pair 39a is returned to the DC electric power source, and so the exciting current trails off gradually beyond the 180-degree positive torque generating section 23 as shown by second half of the curve 25 to generate the counter torque. Thus, the conventional motor is poor in operational efficiency, which entails poor output torque. This phenomenon becomes conspicuous to spoil the utility of the motor, especially during high-speed operation of the motor, since, during the high-speed operation, the time width of the overall positive torque generating section is inversely proportional to the operating speed of the motor, though the time width of counter torque generating section remains constant. The same phenomenon is recognized as to the No. 2-phase exciting coil pair 39b and the No. 3-phase exciting coil pair 39c.

In the case of the above conventional motor, if a so-called advanced phase current supply operation is executed causing the current supply to the exciting coil to be initiated before the salient poles enter the magnetic poles, the exciting current builds up sharply since the magnetic path of the magnetic pole is not closed at an initial stage of the current supply. Then, when the salient poles enter the magnetic poles, the inductance increases, and thus the exciting current decreases steeply to cause the decline of the output torque, a disadvantage of the motor.

Thus, according to this embodiment of the present invention, the above-described disadvantage is removed by providing back-flow preventing diodes 49a to 49c and capacitors 47a to 47c. In this case, when the HIGH-level position detecting signal 36a is extinguished to turn off the transistors 20a and 20b and deactivate the No. 1-phase exciting coil pair 39a, the magnetic energy stored in the exciting coil pair 39a is prevented from returning to the DC electric power source by the back-flow preventing diode 49a, and this magnetic energy charges the capacitor 47a to have polarities shown in FIG. 4. As a result, the magnetic energy extinguishes rapidly, thereby correspondingly causing the exciting current to trail off sharply.

In the time chart of FIG. 7, curves 27, 27a and 27b are representative of current flowing in the exciting coil 39a, and both dotted lines are spaced by 120 degrees. The supplied current decreases steeply as shown by the curve 27b, and thus no counter torque is generated. The capacitor 47a is charged up to a high voltage and held at this value.

After that, in response to the position detecting signal 36b (FIG. 6), the transistors 20a and 20b are turned on to activate the No. 1-phase exciting coil pair 39a. At this moment, a large voltage equal to the sum of the voltage of the DC electric power source (a voltage between the terminals 2a and 2b) and the charged voltage of the capacitor 47a is applied to the exciting coil pair 39a. Consequently, the exciting current builds up rapidly as shown by the curve 27.

The build-up portion of the current 27 becomes slow at its intermediate portion, since the magnetic energy is transformed into thermal energy due to copper losses of the coils and iron losses of the magnetic cores when the magnetic energy is transferred between exciting coils. Measures for removing such a disadvantage will be discussed later. As explained above, the torque reduction and the counter torque are suppressed. And an output torque is increased since the exciting current becomes substantially the rectangular waveform.

When the exciting current of the exciting coil pair 39a increases, and therefore the voltage between two terminals of the resistance 22a increases to exceed a voltage of the standard voltage terminal 40 (i.e. an input voltage of the positive terminal of the operational amplifier 40b), a downside input of the AND circuit 41a becomes a LOW-level. Therefore, the transistor 20a is turned off, and the exciting current decreases.

Then, if the input voltage of the negative terminal decreases down to a predetermined value due to the hysteresis characteristic of the operational amplifier, the output of the operational amplifier 40b returns to a HIGH-level to turn on the transistors 20a and 20b, thereby increasing the exciting current. By repeating such a cycle, the exciting current is held at a predetermined value. A section indicated by the curve 27a of FIG. 7 shows a chopper controlled section. A height of the curve 27a is restricted by the voltage of the standard voltage terminal 40.

The same explanation is applied to the No. 2-phase and No. 3-phase exciting coil pairs 39b and 39c. The current supply section to the respective exciting coil can be initiated from any point within a 30-degree section after the salient poles enter into the magnetic poles. An adjustment is made by changing the fixing positions of the detecting coils 10a, 10b and 10c, which serve as position detecting elements, and by fixing them on the armature side in consideration of a rotational speed, an efficiency, and an output torque.

In the above-described embodiment, the building-ups of the exciting coils 39a to 39c become slow at their intermediate portions (refer to the reference numeral 27 in FIG. 7), and an embodiment including a circuit for correcting this phenomenon will be explained hereinafter.

Figure 5:
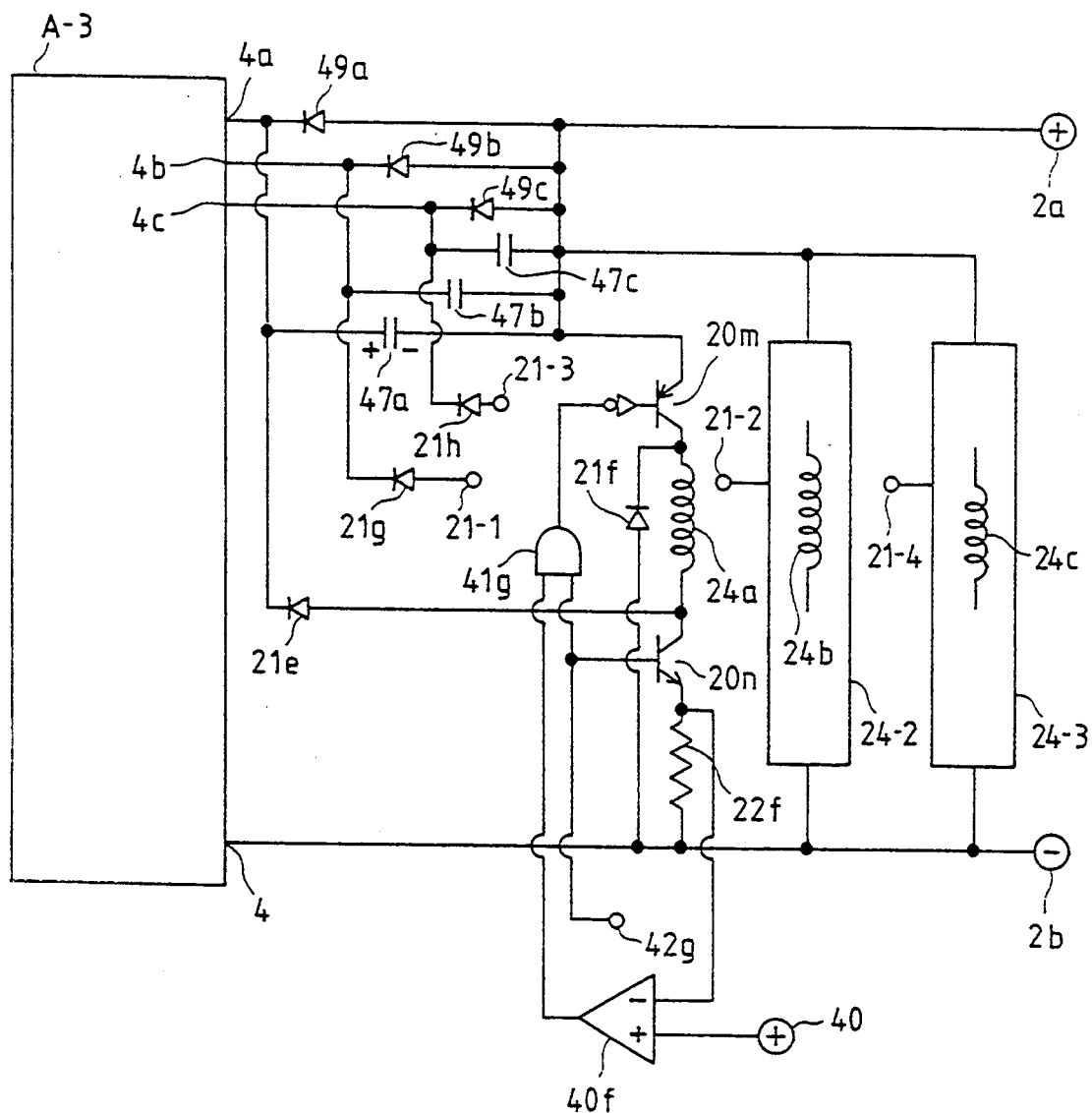
FIG. 5 is a circuit diagram of the circuit shown in FIG. 4 modified by adding inductance coils for making steep a building-up and a trailing-edge of the exciting current.

The present embodiment includes a current supply control circuit shown in FIG. 5.

In FIG. 5, a circuit indicated by a reference numeral A-3 shows the whole of an electric circuit shown on the left side of an alternate-long-and-short dash line N of FIG. 4. Lead lines indicated by reference numerals 4a, 4b, 4c and 4 in FIG. 4 are shown by the same reference numerals in FIG. 5. Furthermore, diodes 49a to 49c and capacitors 47a to 47c shown in FIG. 5 are the same as the diodes 49a to 49c and the capacitors 47a to 47c shown in FIG. 4.

Inductance coils 24a, 24b and 24c are the coils wound around closed magnetic cores, and their inductances are substantially the same as those of the exciting coil pairs 39a, 39b and 39c, respectively.

The inductance coil 24a has both ends connected to the collectors of transistors 20m and 20n respectively. An emitter of the transistor 20m is connected to a positive terminal 2a of the DC electric power source, whereas its base is connected through an inverter to an output terminal of an AND circuit 41g. Furthermore, an emitter of the transistor 20n is connected through a resistance 22f to a negative terminal 2b of the DC electric power source, whereas its base is connected to a terminal 42g, which is one of input terminals of the AND circuit 41g. The other input terminal of the AND circuit 41g is connected to an output terminal of an operational amplifier 40f. A minus input terminal of the operational amplifier 40f is connected to a connecting point of the transistor 20n and the resistance 22f, whereas its plus input terminal is connected to the standard voltage terminal 40.

Moreover, a connecting point of the inductance coil 24a and the transistor 20n is connected through a diode 21e to the lead line 4a i.e. the emitter of the transistor 20a. A diode 21f is inversely connected between the negative terminal 2b and the connecting point of the inductance coil 24a and the transistor 20m. A substantially same circuit as the above-described circuit for the inductance coil 24a is provided for the inductance coils 24b and 24c.

That is, there is provided a similar circuit equivalent to the circuit comprising the transistors 20m, 20n, the diode 21f, the operational amplifier 40f, the AND circuit 41g, the inverter and the like. These circuits are suffixed by reference numerals 24-2 and 24-3, though the detailed description of these circuits are omitted. Further, terminals 21-2 and 21-4 (i.e. the connecting points between the inductance coils 24b, 24c and downside transistors corresponding to the transistor 20ng) are connected to terminals 21-1 and, respectively, and further connected to the lead lines 4b and 4c through diodes 21g and 21h, respectively.

In FIG. 5, the terminal 42g is supplied with the same input as the terminal 42g of FIG. 4 i.e. the position detecting signal 36. An output of the operational amplifier 40f is a HIGH-level at an initial stage. If a HIGH-level position detecting signal 38 is input, an output of the AND circuit 41g becomes a HIGH-level. Therefore, the transistors 20m and 20n are turned on to activate the inductance coil 24a.

If the exciting current increases, the voltage drop across the resistance 22f increases. If this voltage drop exceeds an input value of the plus terminal of the operational amplifier 40f, i.e., the voltage of the standard voltage terminal 40, the output of the operational amplifier 40f is inverted to a LOW-level. Therefore, an output of the AND circuit 41g also becomes a LOW-level, and the transistor 20m is deactivated.

A magnetic energy stored in the inductance coil 24a is discharged as a current flowing in the transistor 20n, the resistance 22f and the diode 21f, and the current decreases. When the current value is decreased down to a predetermined value, the output of the operational amplifier 40f becomes a HIGH-level due to its hysteresis characteristics to turn on the transistor 20m. This causes the current flowing in the inductance coil 24a to increase. By repeating such a current supply, a chopper circuit is constituted to restrict the current supply in accordance with the voltage of the standard voltage terminal 40.

Since an input signal of the terminal 42g is extinguished at a terminal end of the position detecting signal, the transistors 20m and 20n are turned off. Then, a magnetic energy stored in the inductance coil 24a is discharged through the diodes 21e and 21f to charge the capacitor 47a.

At the same time, as previously explained, the magnetic energy stored in the exciting coil pair 39a shown in FIG. 4 is also discharged into the capacitor 47a to charge it. Thus, the capacitor 47a can be charged by an electrostatic energy twice as large as the case wherein the inductance coil 24a is not added. Thus, the exciting current decreases more steeply.

In response to a next arriving position detecting signal (a curve 36b), the exciting coil 39a is supplied with current. In this case, since a large voltage equal to a summation of the high voltage of the capacitor 47a and the DC electric power source voltage is applied, the exciting current builds up so sharply. That is, as indicated by a dotted curve 27c in FIG. 7, the delay having occurred in the building-up curve 27 is now eliminated. Thus, the exciting current builds up rapidly and, subsequently, becomes flat by the chopper function.

Accordingly, by virtue of this virtually rectangular waveform current, it becomes possible to increase the output torque and to reduce ripple components of the output torque.

The inductance coils 24b and 24c in FIG. 5 are of the same constitution as the inductance coil 24a. Block circuits 24-2 and 24-3 are electric circuits, which execute the current supply control of the inductance coils 24b and 24c in the same fashion as the inductance coil 24a.

The inductance coils 24b and 24c are supplied with currents corresponding to the position detecting signals 37 and 38 which become inputs to the terminals 42b and 42c in FIG. 4, respectively. When the currents are terminated, magnetic energies stored in these inductance coils 24b and 24c are discharged to charge the capacitors 47b and 47c respectively, through the terminal 21-2, the terminal 21-1, which is connected to the terminal 21-2, the diode 21g, the terminal 21-4, the terminal 21-3, which is connected to the terminal 21-4, and the diode 21h. Accordingly, their functions and effects are the same as in the case of the inductance coil 24a.

Curves 26a, 26b and 26c of FIG. 7 show a current supply curve for the exciting coil. A gap between a dotted line 26-1 and a dotted line 26-2 is a 120-degree width of the position detecting signal, whereas a gap between the dotted line 26-1 and a dotted line 26-3 is a 180-degree width of the output torque generating section.

Curves 9a, 9b and 9c represent output torque curves. At the point of the dotted line 26-1, the current supply is initiated, and the salient poles begin entering the magnetic poles at the same time. The curve 9a corresponds to the case wherein a current supplied to the exciting coil is small, and the torque is relatively flat; however, as shown by the curves 9b and 9c, a peak value of the torque tends to shift toward a left side as the current value increases, and also a width of the peak value becomes narrower.

In consideration of above-described torque characteristics and the supplied current value, it is preferable to set an initiation point of the current supply at an intermediate point of a 30-degree section after the salient poles begin entering the magnetic poles by adjusting the fixing points of the position detecting coils 10a, 10b and 10c.

Capacitors 47a, 47b and 47c are preferable if they are of small capacitances, since their charged values become high. In this case, a building-up and a trailing-edge of the supplied current curve can be made sharp, so that the motor can be driven at a high speed. Thus, the disadvantage of the reluctance type motor can be removed. It is recommended to select small capacitances for the above-described capacitors so that the charged voltages of the capacitors do not damage the transistors in the circuit.

The above embodiments can be modified variously. For example, in order to reduce the leaking magnetic flux, each of the magnetic poles 16a–16f can be constituted of paired magnetic poles so that each paired magnetic poles can be magnetized to be an N-pole and an S-pole respectively. With this arrangement, the leaking magnetic flux of respective paired magnetic poles can be canceled by each other. Thus, the leaking magnetic flux can be eliminated almost completely. In this case, the rotor 1 is provided with 16 salient poles. A motor modified in this manner can output twice as large an output torque as the previous embodiments.

Furthermore, in order to detect the position of the rotor 1, an aluminum plate having the same configuration as the salient poles portion of the rotor 1 and capable of rotating synchronously with rotor 1 may be used.

Moreover, the transistors 20a to 20f, 20m and 20n can be replaced with other semiconductor elements having the same effect, since they are to function as switching elements.

Next, with reference to FIGS. 8 to 11, a three-phase half-wave motor and a three-phase full-wave reluctance type motor in accordance with second embodiment of the present invention will be explained.

In the above-described first embodiment, three diodes 49a, 49b and 49c, three capacitors 47a, 47b and 47c, and three inductance coils 24a, 24b and 24c are used, whereas, the second embodiment is concerned with a case of the three-phase half-wave reluctance type motor with a simplified circuit having one diode and one capacitor. Furthermore, the three-phase full-wave reluctance type motor is constituted by combining two sets of three-phase half-wave systems.

Figure 8:
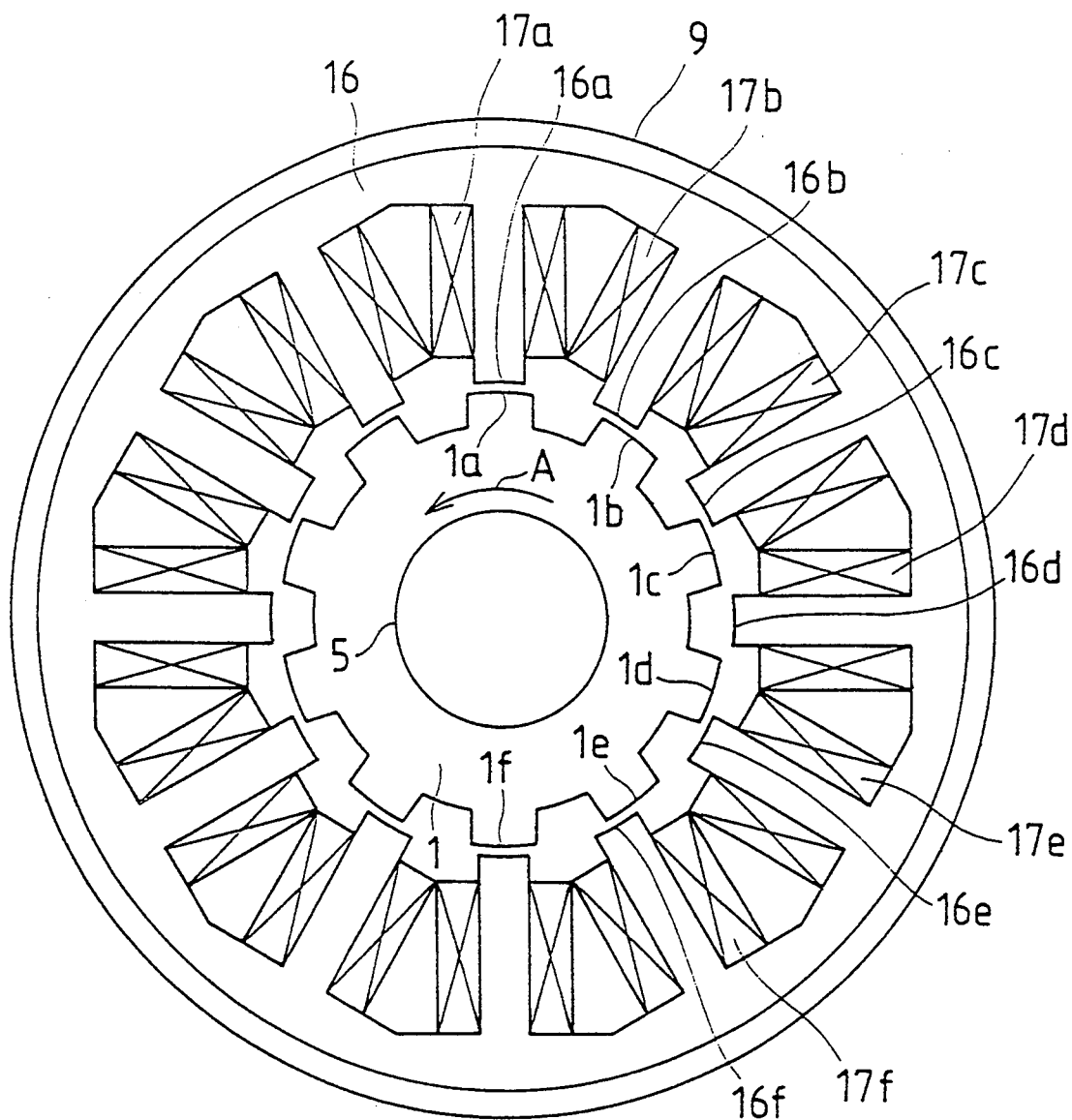
FIG. 8 is a schematic side view showing a rotor and an armature of a three-phase half-wave reluctance type motor in accordance with second embodiment of the present invention.
Figure 9:
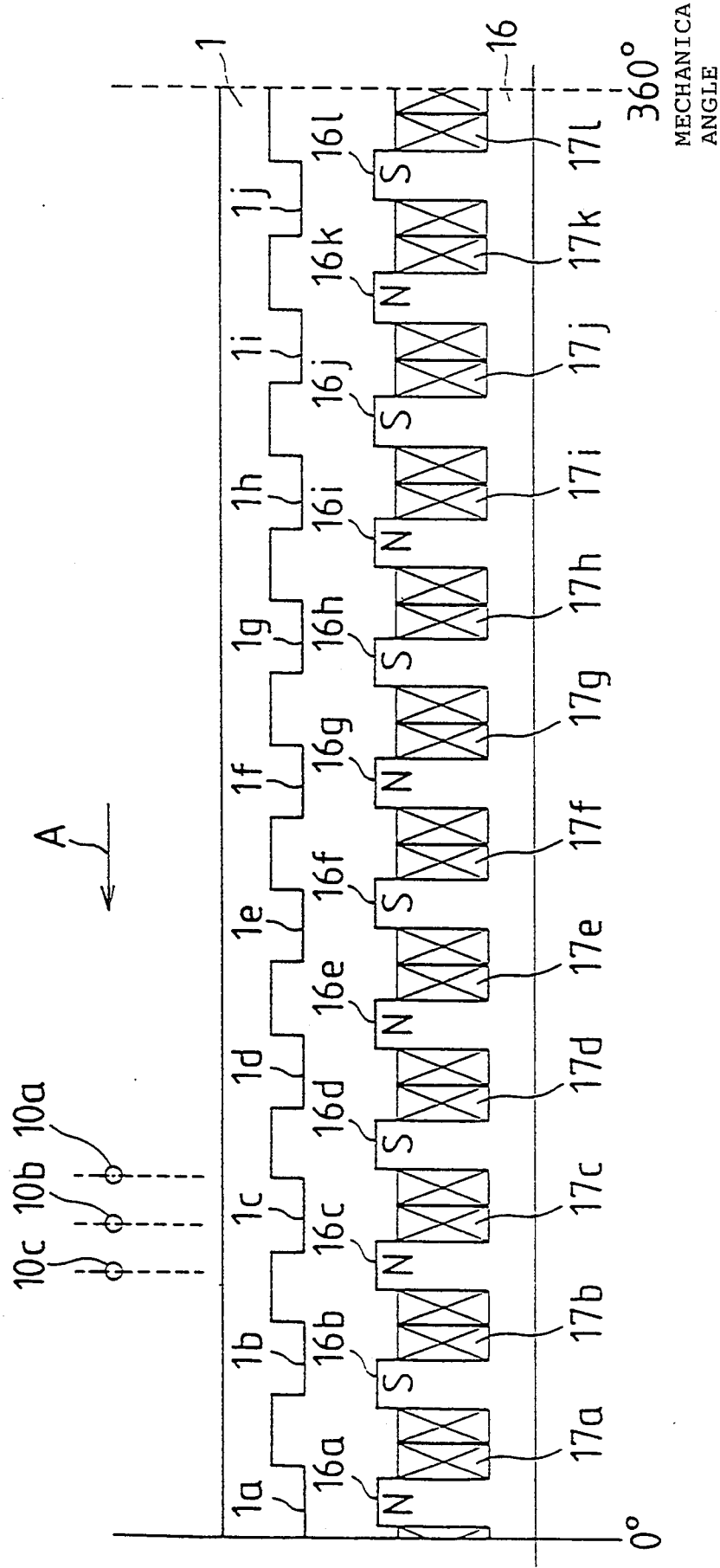
FIG. 9 is a schematic development showing the rotor and the armature of FIG. 8.

As shown in FIGS. 8 and 9, the rotational shaft 5 is supported rotatably on the bearings provided on both side plates of the outer casing 9. A magnetic rotor 1 is fixed on the rotational shaft 5. Ten salient poles 1a–1j of a 180-degree width are formed on the rotor 1 at equal intervals. A fixed armature 16 inserted in the outer casing 9 is equipped with 12 magnetic poles 16a–16l with a 120-degree width and associated with exciting coils 17a–17l.

The magnetic poles 16a–16l are magnetized by the exciting coils 17a–17l to have polarities shown in FIG. 9. The exciting coils 17a and 17g are connected in series or in parallel to each other to constitute an exciting coil pair 32a. In the similar manner, the exciting coils 17b and 17h an exciting coil pair 32b; and the exciting coils 17c and 17i an exciting coil pair 32c; and the exciting coils 17d and 17j an exciting coil pair 32d. Furthermore, the exciting coils 17e and 17k constitute an exciting coil pair 32e; and the exciting coils 17f and 17l an exciting coil pair 32f.

In the following description, the exciting coil pairs 32a, 32c and 32e are referred to as No. 1-, a No. 2- and No. 3-phase exciting coil pairs, respectively. And, the exciting coil pairs 32d, 32b and 32f are referred to as No. 1, No. 2-, and No. 3-phase exciting coil pairs respectively.

Position detecting coils 10a–10c are fixed to the armature 16 at the positions shown in FIG. 9 facing salient poles 1a–1j. An electric circuit constituting the position detecting device together with the coils 10a–10c has the same constitution as the one shown in FIG. 3, and generates the position detecting signals 36–38 and 43–45 shown in FIG. 6.

In the following description, the position detecting signals 36, 37 and 38 are referred to as No. 1, No. 2-and a No. 3-phase position detecting signals, respectively, whereas the position detecting signals 43, 44 and 45 are referred to as No. 1-, No. 2-, and a No. 3-phase position detecting signals respectively.

Figure 10:
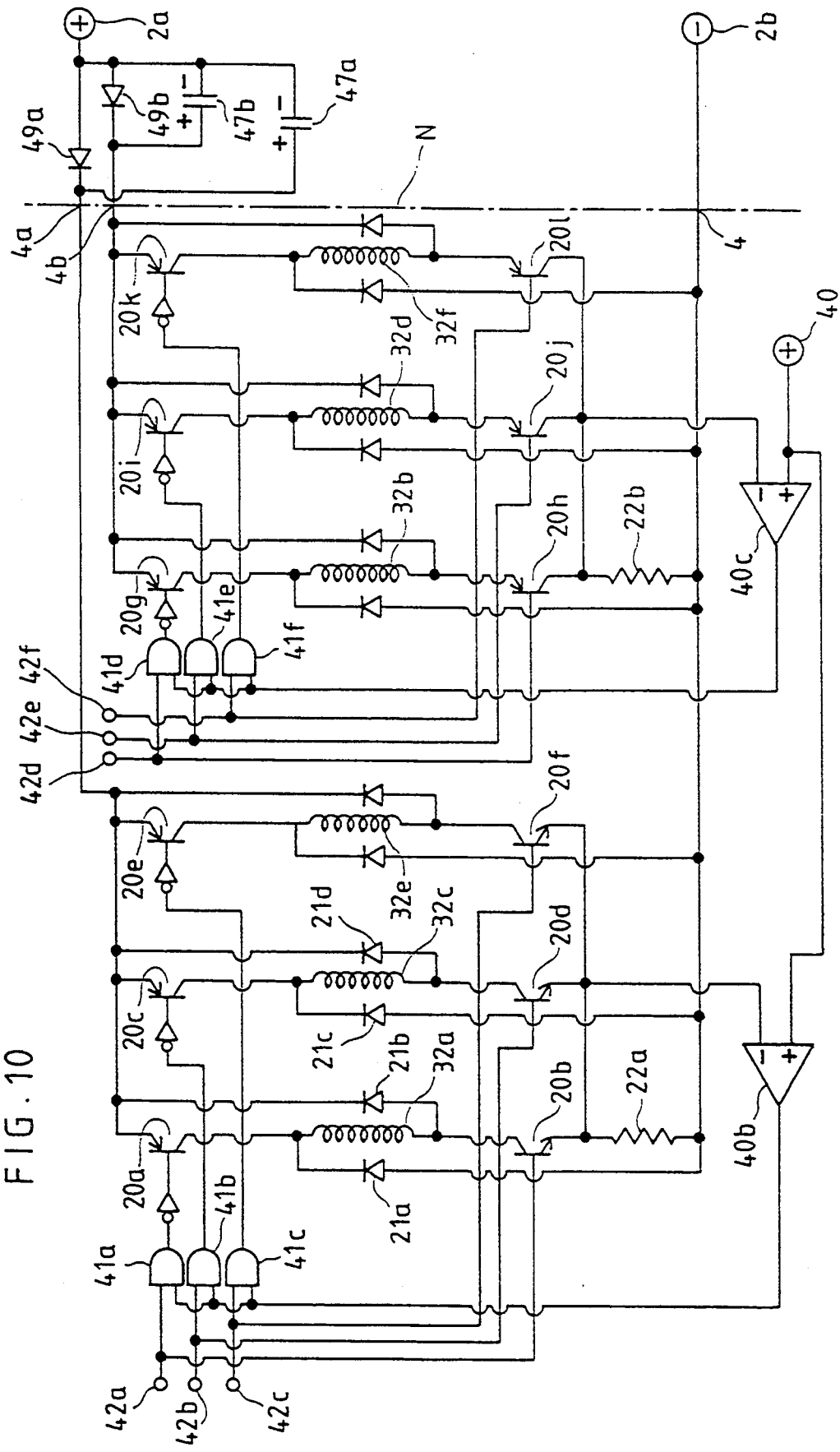
FIG. 10 is a circuit diagram showing a current supply control circuit of the second embodiment.

The position detecting signals 36–38 are applied to the input terminals 42a, 42b and 42c of the current supply control circuit shown in FIG. 10. The position detecting signals 43–45 are applied to the input terminals 42d, 42e and 42f of the current supply control circuit. And, the exciting coil pairs 32a, 32c and 32e are activated in response to HIGH-level position detecting signals 36a, 36b, - - - , 37a, 37b, - - - and 38a, 38b, - - - . The exciting coil pairs 32b, 32d and 32f are activated in response to HIGH-level position detecting signals 45a, 45b, - - - , 43a, 43b, and 44a, 44b , - - - . Then, the rotor 1 rotates in a direction of an arrow A.

That is, the current supply to the No. 1, No. 2- and No. 3-phase exciting coil pairs and the current supply to the No. 1, No. 2- and No. 3-phase exciting coil pairs are respectively made by the half-wave current supply mode. Thus, by activating the No. 1-, No. 1-, No. 2-, No. 2-, No.3-and No. 3-phase exciting coils, the three-phase full-wave reluctance type motor can be obtained.

In more detail, since an input value of the negative terminal of the operational amplifier 40b is lower than that of the positive terminal of the operational amplifier 40b, if the electric power switch (not shown) is turned on, an output of the operational amplifier 40b becomes a HIGH-level. And therefore, a downside input of the AND circuit 41a becomes a HIGH-level.

In this case, if the HIGH-level electric signal 36 is inputted from the terminal 42a, the transistors 20a and 20b are turned on to activate the exciting coil pair 32a. In the same way, if the HIGH-level electric signals 37 and 38 are inputted from the terminals 42b and 42c, the transistors 20c and 20d and transistors 20e and 20f are turned on to activate the exciting coil pairs 32c and 32e.

The exciting coil pair 32a is supplied with a current corresponding to the width of the position detecting signal 36a. When the current is terminated at the terminal end of the curve 36a, a magnetic energy stored in the exciting coil 32a is prevented from returning to the DC electric power source side by the back-flow preventing diode 49a, and, therefore, the current is discharged through the diodes 21b and 21a into the capacitor 47a to charge the capacitor 47a to a high voltage.

Accordingly, the magnetic energy extinguishes rapidly, and the exciting current decreases sharply. Since the transistors 20c and 20d are already turned on by the position detecting signal curve 37a at this moment, the charged voltage of the capacitor 47a is applied to the exciting coil pair 32c, causing exciting current to build up sharply.

For the same reason, when the exciting coil pair 32c is deactivated, whereas the exciting coil pair 32e is activated, both a building-up curve and a trailing-edge curve of the exciting current become sharp.

Next, the chopper circuit will be explained.

The resistance 22a is a resistance for detecting exciting currents flowing in the exciting coil pairs 32a, 32c and 32e. A voltage corresponding to the exciting current detected by the resistance 22a is inputted to the negative terminal of the operational amplifier 40b, whereas the standard voltage is applied from the terminal 40 to the positive terminal of the operational amplifier 40b.

The output torque can be changed by the standard voltage inputted from the terminal 40.

When the exciting current of the exciting coil pair 32a increases, and the voltage drop in its detecting resistance 22a increases to exceed the voltage of the standard voltage terminal 40 (the input voltage of the positive terminal of the operational amplifier 40b), the downside input of the AND circuit 41a becomes a LOW-level to turn off the transistor 20a. Thus, the exciting current is decreased.

By virtue of the hysteresis characteristics of the operational amplifier 40b, the output of the operational amplifier 40b returns to a HIGH-level to turn on the transistors 20a and 20b, thereby causing the exciting current to increase. The same operation is carried out with respect to other exciting coil pairs 32b and 32c. By repeating such a cycle the exciting current can be maintained at a predetermined value.

Furthermore, exciting operations of the No. 1-, No. 2-and No. 3-phase exciting coil pairs are carried out in the same manner as the No. 1-phase exciting coil pair. By inputting the position detecting signals 43, 44 and 45 into the terminals 42e, 42f and 42d, the exciting coil pairs 32d, 32f and 32e are activated.

At the end of the exciting operation, the magnetic energies stored in the exciting coils are converted into an electrostatic energy of the capacitor 47b so that the exciting current builds up sharply. Also, the charged voltage of the capacitor 47b is applied to a next activated exciting coil so as to make the exciting current steep. The chopper function is provided by the resistance 22b and the operational amplifier 40c.

Next, third embodiment constituted by modifying the exciting current width of the exciting coil in the second embodiment to 60 degrees will be explained.

Figure 6:
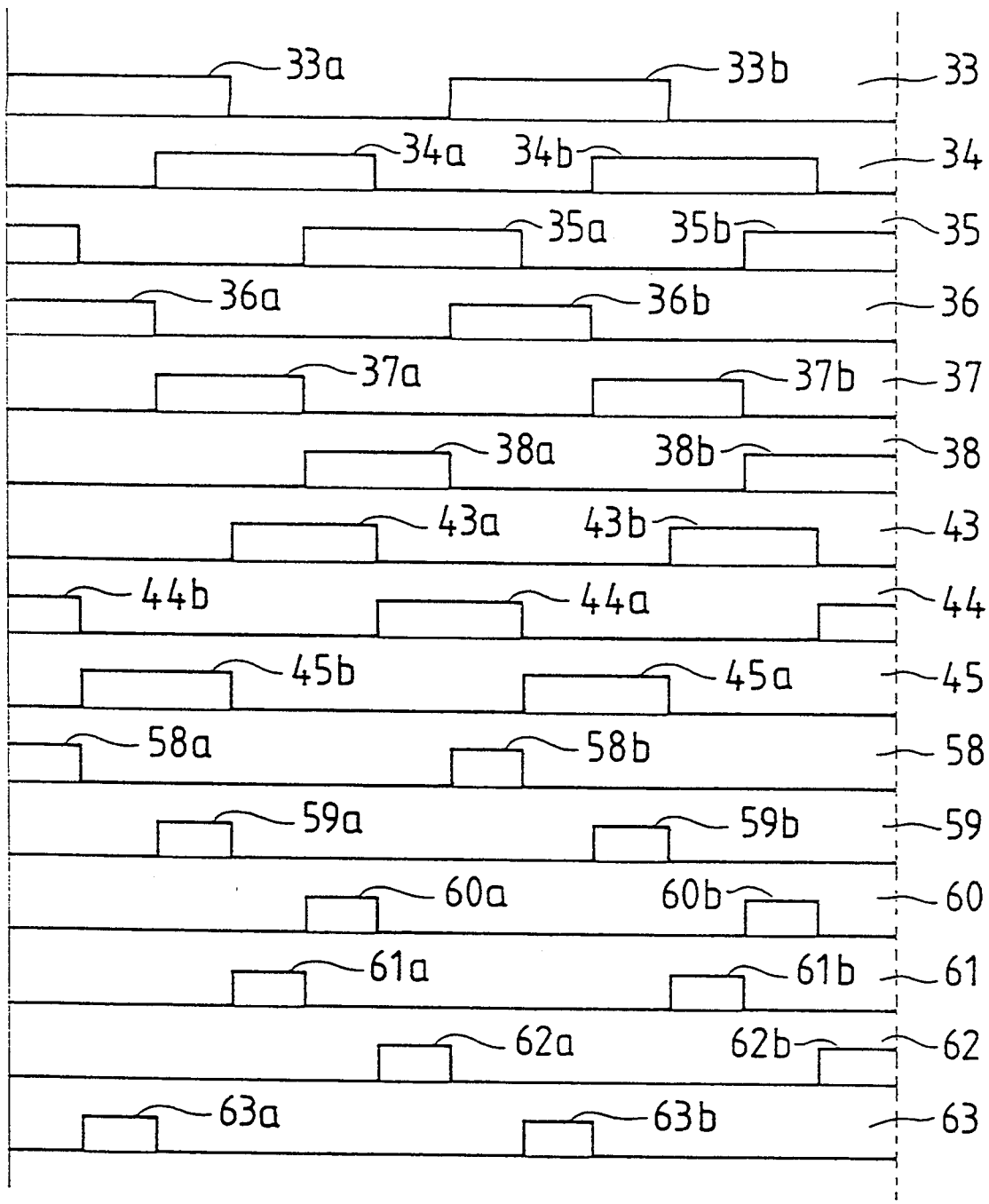
FIG. 6 is a timing chart showing outputs of the detecting coils and position detecting signals supplied from the position detecting device.

In the case where respective exciting coils are activated by 60 degrees in the three-phase half-wave reluctance motor, position detecting signals input from the terminals 42a, 42b and 42c become signals 58, 59 and 60 respectively shown in FIG. 6. The position detecting signal 58 can be obtained as an output from an AND circuit to which the signals 44 and 36 are inputted. The position detecting signal 59 can be obtained as an output from an AND circuit to which the signals 45 and 37 are inputted, whereas the position detecting signal 60 can be obtained as an output from an AND circuit to which the signals 43 and 38 are inputted.

Respective position detecting signals have 60-degree width and are spaced apart from each other by 60 degrees. The electric signals 58, 59 and 60 are inputted from the terminals 42a, 42b and 42c of FIG. 10. Curves 58a, 59b and 59c, shown at third step of FIG. 7, show position detecting signals inputted as described above.

Curves 28a, 28b and 28c show exciting currents of the exciting coils 32a, 32c and 32e. In this case, by utilizing means described later with reference to FIG. 11, building-ups and trailing-edges of the exciting currents become sharp, as shown in the drawing. The currents represented by dotted lines can be made almost flat and proportional to the difference between the DC electric power voltage and the reverse electromotive force.

The above-described means can be used in the case where the DC electric power source is of a low voltage such as a battery. However, in the case where the DC electric power source is of a high voltage, a current needs to be restricted to a predetermined value. For this purpose the chopper circuit is added.

When the motor is started, the exciting coils are not activated in portions between the signals 58, 59 and 60. Therefore, no torque is generated. That is, these portions become dead points. Accordingly, the motor cannot be driven. Next, actuating means will be explained.

Figure 12:
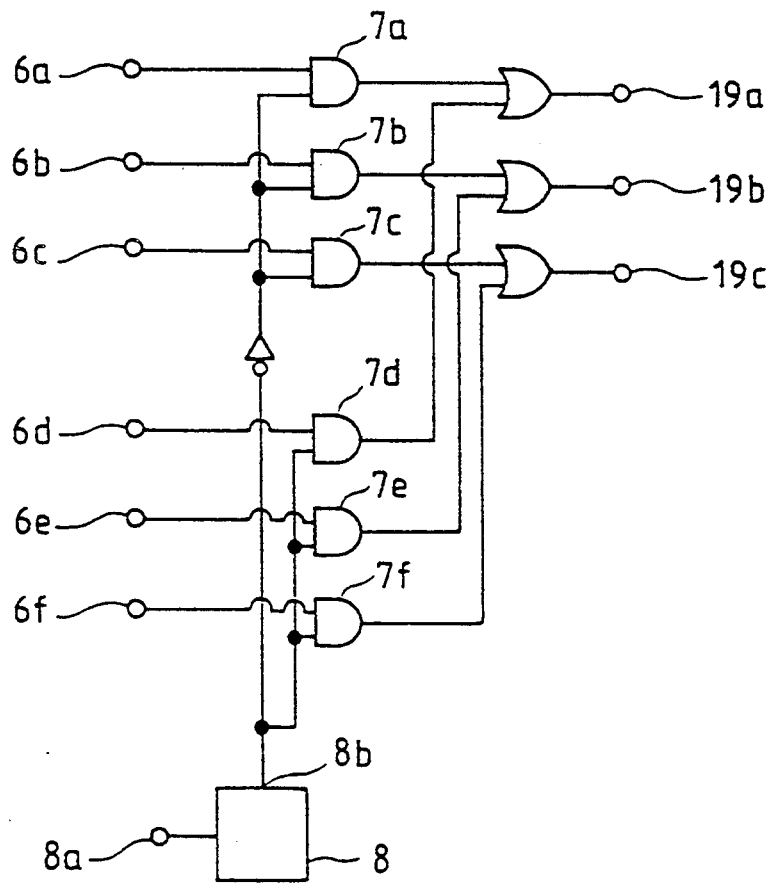
FIG. 12 is a circuit diagram showing a switching circuit for position detecting signals in the three-phase half-wave current supply mode.

In FIG. 12, previously explained position detecting signal curves 58a, 58b, - - - , 59a, 59b, - - - , 60a, 60b, - - having 60-degree width are inputted from terminals 6d, 6e and 6f, whereas position detecting signal curves 36a, 36b, - - - , 37a, 37b, - - - , 38a, 38b, - - - having 120-degree width are inputted from terminals 6a, 6b and 6c.

A reference numeral 8 denotes a rotational speed detecting device, which is, for example designed to input an output from a speed generator through a terminal 8a, as well as to produce a LOW-level output from its output terminal 8b until the rotational speed of the motor reaches a predetermined speed and produces a HIGH-level output after the rotational speed of the motor has exceeded a predetermined speed.

Thus, when the motor is started, downside inputs of the AND circuits 7a, 7b and 7c become HIGH-levels by inversion circuits. Position detecting signals of 120-degree width are outputted from the terminals 19a, 19b and 19c. Then, by inputting these outputs to terminals 42a, 42b and 42c, shown in FIG. 10, the three-phase half-wave current supply, having no dead point, can be started.

When the rotational speed has reached a predetermined speed, the output of the terminal 8b is turned to a HIGH-level. Therefore, downside inputs of the AND circuits 7d, 7e and 7f become a HIGH-level. And, the current supply control of the exciting coils is controlled by the 60-degree width position detecting signals, as shown by curves 28a, 28b and 28c of FIG. 7.

Building-ups of the curves 28a and 28b, - - - become steep by the back-flow preventing diode 49a and the capacitor 47a of FIG. 10. A diode 49a and a capacitor 47a correspond to the diode 49a and the capacitor 47a previously described with reference to FIG. 4, and thus they have the same functions and effects. There are 60-degree portions having no signal between the position detecting signal curves 58a, 59a and 60a of FIG. 7. Thus, the capacitor 47a is an element necessary for temporarily storing the magnetic energy when the exciting coil is deactivated. Furthermore, a building-up of the exciting current of the next activated exciting coil can be made steep by the high voltage charged in the capacitor 47a. Moreover, the exciting current of the previously activated exciting coil is reduced steeply. Consequently, the torque reduction and the counter torque can be suppressed even in a high speed operational region.

Though the above-described three-phase half-wave reluctance motor is explained by referring to only the magnetic poles 16a, 16c, 16e, - - - of FIG. 9, the same method can be applied to the motor having the constitution of FIG. 1.

Next, with reference to FIG. 10, the three-phase full-wave current supply operation will be discussed. By supplying the exciting coils 32a, 32c and 32e with currents corresponding to the position detecting signal curves 58a, 58b, - - - , 59a, 59b, - - - , 60a, 60b, - - - of FIG. 6, and also by supplying the exciting coils 32b, 32d and 32f with currents corresponding to the position detecting signal curves 61a, 61b, - - - , 62a, 62b, - - - , 63a, 63b, - - - of FIG. 6, the rotor 1 rotates toward a direction of an arrow A as the three-phase full-wave type motor.

The above-described current supply mode can be expressed as follows. The exciting coils 32a, 32b, 32c,- - - , 32e are supplied with currents of 60-degree width in response to the position detecting signal curves 58a, 63a, 59a, 61a, 60a and 62a.

Next, with reference to FIG. 10, the above-described current supply is explained in more detail.

When the position detecting signal curves 58a, 58b,- - - , 59a, 59b, - - - 60a, 60b, - - - are inputted from the terminals 42a, and 42c, the current supply curves of the exciting coils 32a, 32c and 32e become curves 28a, 28b and 28c shown at third step of FIG. 7, as is described previously. When the position detecting signal curves 61a, 62a and 63a are inputted from the terminals 42d, 42e and 42f, the current supply curves of the exciting coils 32b, 32d and 32f become curves 29a, 29b and 29c shown at a fourth step of FIG. 7. These curves 29a, 29b and 29c are delayed 60 degrees from the curves 28a, 28b and 28c, respectively. The characteristic features of both curves are completely the same.

The exciting coils 32a, 32c and 32e and the exciting coils 32b, 32d and 32f are independently supplied with currents from the electric power source through the back-flow preventing diodes 49a and 49b. The current flows to the former coils are made in the same manner as the three-phase half-wave type motor having 60-degree current width. The current flows through diode 49b to the latter coils having 60-degree current width also made in the same way.

Chopper circuits are provided in two sets. The chopper functions by the operational amplifiers 40b and 40c and resistances 22a and 22b are performed independently in the above-described current supply control for the two sets of exciting coils.

Since the current supply control of the exciting coils 32a, 32c and 32e is carried out in response to the position detecting signal curves 58a, 59a and 60a of FIG. 6, the exciting current curves become curves 28a, 28b and 28c, - - - of FIG. 7. Respective transistors are turned off in intermediate 60-degree sections of the curves 58a, 59a and 60a. Accordingly, the magnetic energy stored in the exciting coil is stored as an electrostatic energy in the capacitor 47a shown in FIG. 10. This stored electrostatic energy is discharged into a next activated exciting coil to make its exciting current build up sharply. Furthermore, since the capacitor 47a is charged up to a high voltage, the supplied current decreases steeply when the exciting coil is deactivated. The same functions and the effects can be obtained from the back-flow preventing diode 49b and the capacitor 47b in the case of the current supply operation of the exciting coils 32b, 32d and 32f, too.

In general, this kind of motor begins the current supply from the point at which the salient poles start to enter the magnetic poles. However, the third embodiment has a relatively small current supply angle of 60 degrees. Therefore, an initiation point of the current supply can be shifted to select a section which corresponds to the maximum value of the torque curve. Accordingly, the efficiency of the motor can be further improved. For example, the efficiency becomes a maximum when a section indicated by an arrow 26-4 is selected for the current supply operation.

When one of the exciting coils is deactivated, the magnetic energy stored in its exciting coil is prevented from returning to the DC electric power source by the back-flow preventing diode and is, therefore, discharged into the capacitor to be stored therein.

A high voltage equal to the summation of the charged voltage in the capacitor and the DC electric power source voltage is applied to a subsequently activated exciting coil. Accordingly, a building-up and a trailing-edge of the exciting current become sharp to realize a high-speed driving operation. Furthermore, the ripple torque can be reduced, since the three-phase full-wave current supply operation is possible.

However, when the magnetic energy is transferred between the exciting coils, the magnetic energy is reduced due to copper losses and iron losses. For this reason, the building-up characteristic of the exciting coil is deteriorated as shown by the curve 27 of FIG. 7. Next, means for improving the building-up characteristics as shown by the curve 27c will be explained.

Figure 11:
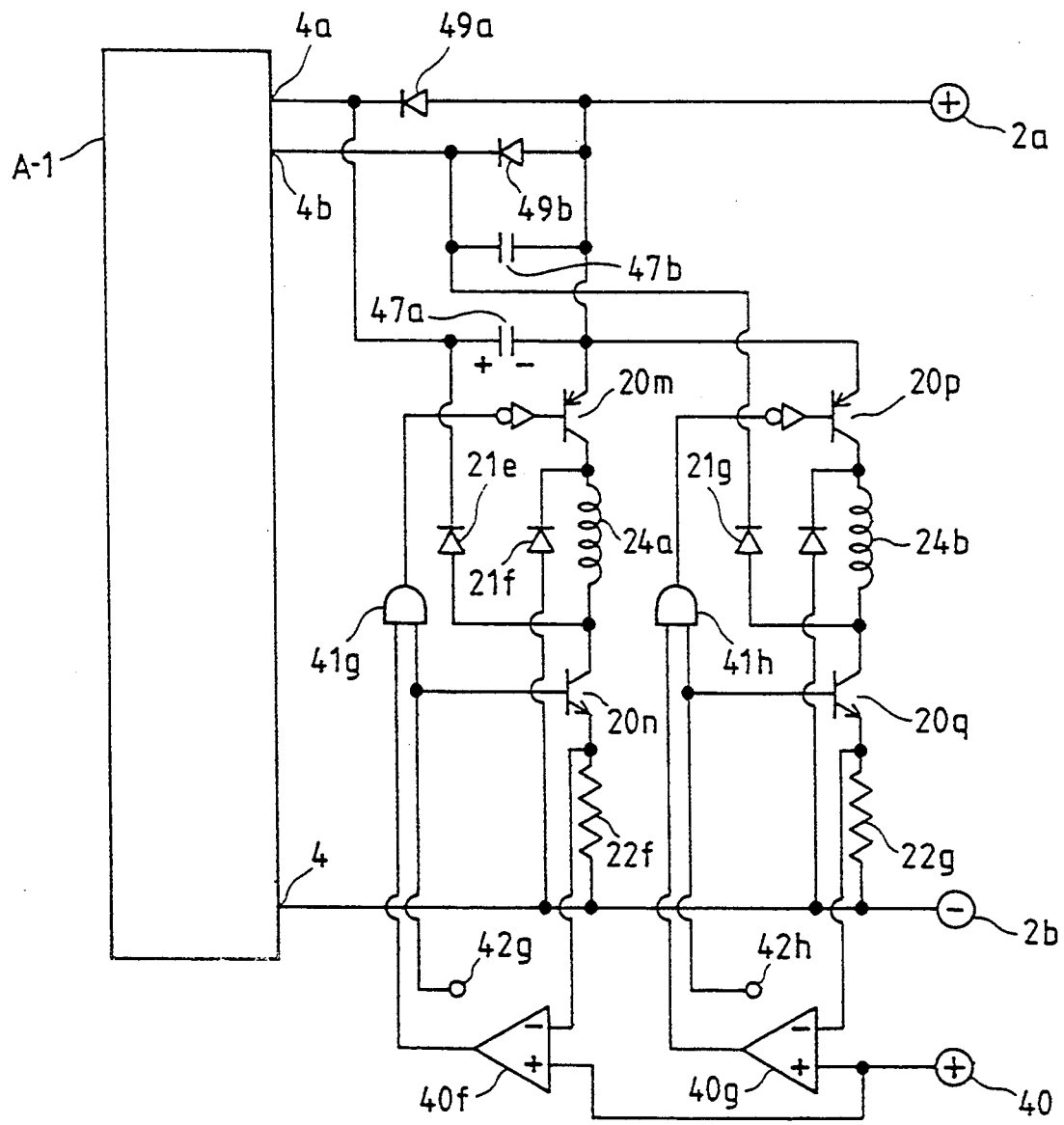
FIG. 11 is a circuit diagram of the circuit shown in FIG. 10 modified by adding inductance coils for making steep a building-up and a trailing-edge of the exciting current.

An electric circuit located at a left side of an alternate long and short dash line N of FIG. 10 is expressed by a block circuit A-1 in FIG. 11. End portions of lead lines are indicated by reference numerals 4, 4a and 4b. Inductance coils 24a and 24b have the same constitution as the previously described components suffixed by the same reference numerals in FIG. 5.

The electric circuit comprising the diode 49a, the capacitor 47a, the transistors 20m and 20n, the resistance 22f, the AND circuit 41g, the operational amplifier 40f, and the standard voltage terminal 40 functions in the same manner as the electric circuit constituted by the same components of FIG. 5.

Accordingly, the following function and effect can be obtained by successively inputting the position detecting signals having a 60-degree width, which are inputted from the terminals 42a, 42b and 42c of FIG. 10, into the terminal 42g by use of an OR circuit.

For example, when the curve 58a of FIG. 6 is inputted, the exciting coil 32a is activated. Simultaneously, the inductance coil 24a is supplied with a current of a predetermined value. When the current is terminated at the terminal end of the curve 58a, the magnetic energies stored in the exciting coil 32a and the inductance coil 24a are discharged through the diodes 21a and 21b and the diodes 21e and 21f to charge the capacitor 47a to maintain a high voltage.

Next, if the position detecting signal curve 59a is inputted to the terminal 42b of FIG. 10 and the terminal 42g of FIG. 11, the current supply to the exciting coil 32c and the inductance coil 24a is initiated. In this case, since the applied voltage of the exciting coil 32c is the high voltage of the capacitor 47a, the exciting current builds up sharply.

That is, the energy loss due to the copper losses and the iron losses is compensated by the magnetic energy stored in the inductance coil. For this reason, the building-up characteristic is improved and the delay in the intermediate portion of the building-up curve can be removed.

As is apparent from the foregoing description, the exciting current curves of respective exciting coils become substantially the rectangular waveforms in the case of the three-phase half-wave current supply operation, thereby increasing the output torque. In the case of the three-phase half-wave type embodiment having a 60-degree current width, a motor having a good efficiency at a high-speed region can be obtained due to the reason described above.

Next, the three-phase full-wave current supply mode having a 60-degree current width, which includes the inductance coil 24b, will be explained. An electric circuit including the inductance coil 24b, the diode 49b, the capacitor 47b, the transistors 20p and 20q, the resistance 22g, the AND circuit 41h, and the operational amplifier 40g has the same function as the current supply control circuit for the inductance coil 24a.

The position detecting signals 61, 62 and 63 of FIG. 6 are inputted through an OR circuit to the terminal 42h. For example, when the position detecting signal curve 61a of FIG. 7 is inputted into the terminal 42d of FIG.

10 and the terminal 42h of FIG. 11, the exciting coil 32b and the inductance coil 24b are activated. And, when the current is stopped at the terminal end of the curve 61a, the magnetic energies stored in the coils 32b and 24b are discharged to charge the capacitor 47b to a high voltage.

Next, if the position detecting signal curve 62a is inputted into the terminals 42e and 42h, the current supply to the exciting coil 32d and the inductance coil 24b is initiated. A voltage applied to the exciting coil 32d becomes a high voltage at the summation of the charged voltage of the capacitor 47b and the DC electric power source. Thus, the exciting current builds up sharply. Since thus stored magnetic energies compensate for the copper losses and the iron losses occurring when the magnetic energies are transferred in the circuit, the building-up characteristics of the exciting current is improved. As explained above, in the case of the three-phase full-wave current supply mode, the currents supplied to respective exciting coils become substantially the rectangular waveform, and, thus, the output torque and the efficiency of the motor can be improved.

Figure 13:
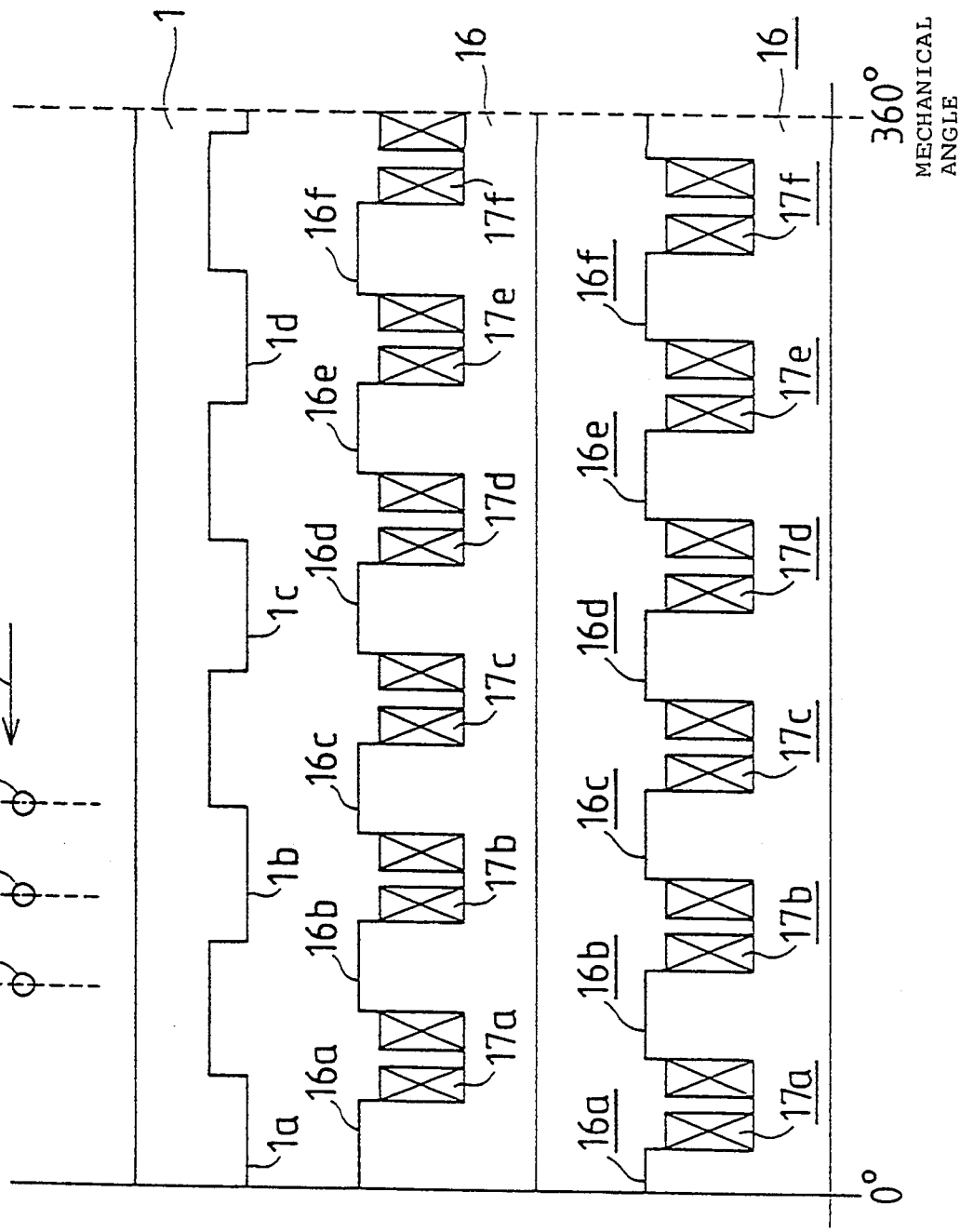
FIG. 13 is a schematic side view showing a rotor and an armature of a three-phase half-wave reluctance type motor in accordance with fourth embodiment of the present invention.
Figure 14:
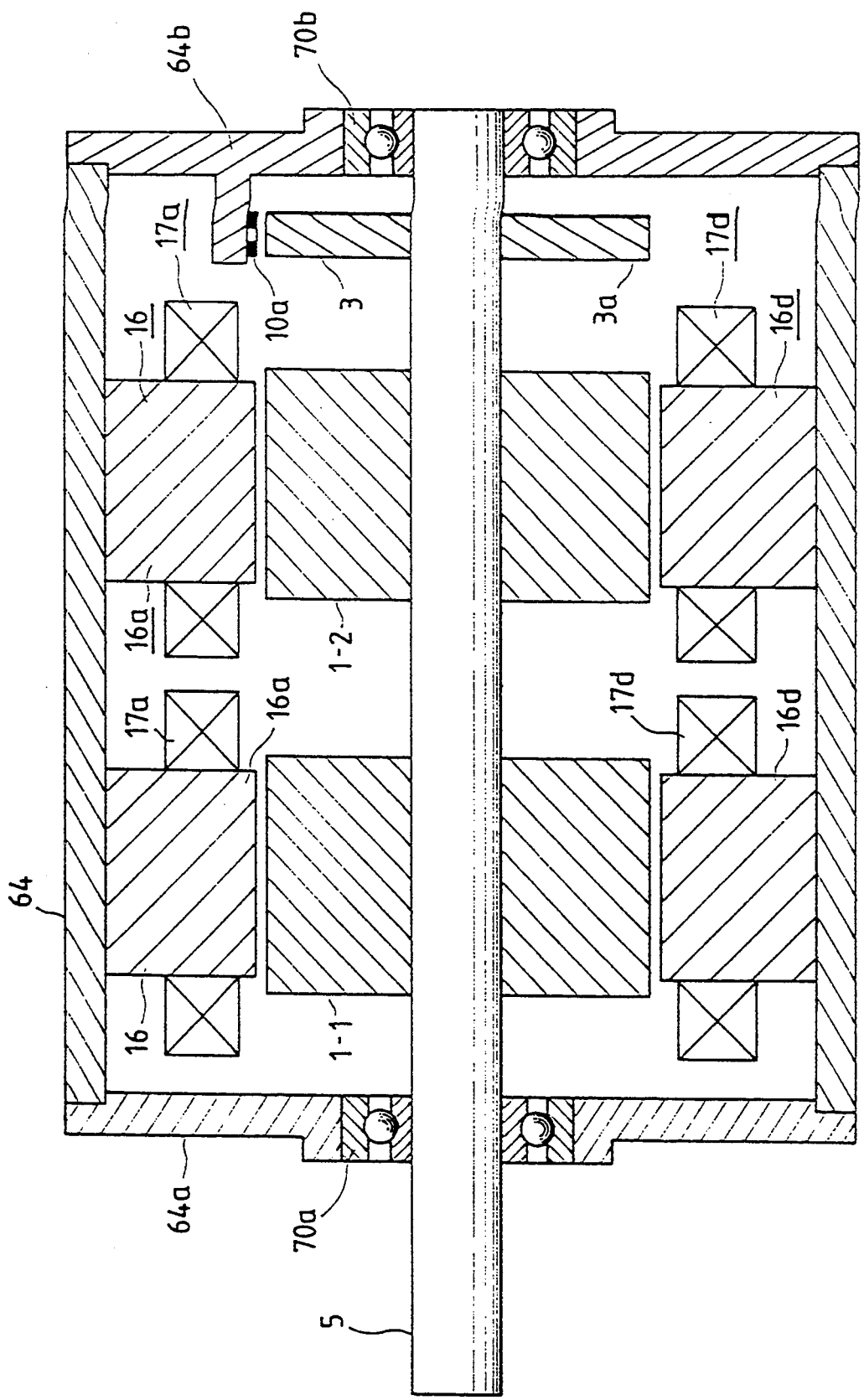
FIG. 14 is a schematic longitudinal cross-sectional view showing a main body of a three-phase full-wave reluctance type motor in accordance with fourth embodiment of the present invention.

Next, fourth embodiment of the three-phase full-wave current supply mode having a 120-degree current width will be explained. FIG. 13 is a development of a fixed armature and a rotor of the fourth embodiment. FIG. 14 is a cross-sectional view showing its constitution.

This motor comprises a cylindrical outer casing 64. Both end surfaces of the outer casing 64 are closed by the outer casing side plates 64a and 64b, which are respectively provided with ball bearings 70a and 70b at their central portions for supporting a rotational shaft 5. The rotational shaft 5 is coupled to rotors 1-1 and 1-2. Four salient poles 1a, 1b, - - - are provided by means similar to the rotor 1 shown in FIG. 1. Further, an outer peripheral surface of the fixed armature 16 is coupled to the outer casing. Magnetic poles face the salient poles on the rotor 1-1 over an air gap. Only the magnetic poles 16a and 16d and the exciting coils 17a and 17d are shown in the drawing. Aluminum disk plate 3 is fixed to the rotational shaft 5, and an outer periphery of the disk plate 3 provides four protruding portions 3a, 3b, - - - having the same configuration as the salient poles 1a, 1b, - - - . Coils 10a, 10b and 10c serving as position detecting elements, which are fixed on a part of the side plate 64b, are positioned to face the outer peripheral surface of the protruding portions 3a, 3b, - - - . Only the coil 10a is shown in FIG. 14.

Position detecting signals obtained from the coils 10a, 10b and 10c are the same as the position detecting signals obtained by the means explained with reference to FIG. 3. FIG. 13 is a development showing fixed armatures 16 and 16, and a rotor of the above-described motor.

Six magnetic poles 16a, 16b, - - - protrude on the fixed armature 16, and exciting coils 17a, 17b, - - - are associated with these magnetic poles 16a, 16b, - - - . Though the rotor is shown by a reference numeral 1 in FIG. 13, it is separated into two parts shown by reference numerals 1-1, 1-2. Four salient poles 1a, 1b, - - -of the rotor 1-1 and the same salient poles of the rotor 1-2 face to the fixed armatures 16 and 16, respectively.

Six magnetic poles 16a, 16b, - - - protrude on the fixed armature 16. These magnetic poles are associated with exciting coils 17a, 17b, - - - . The magnetic poles 16a, 16b, - - - face the salient poles having the same phase as the salient poles 1a, 1b, - - - over a slight air gap. The magnetic poles 16a, 16b, - - - are offset 60 degrees toward a left direction with respect to the magnetic poles 16a, 16b, - - - . A width of the magnetic pole is 120 degrees, and a width of the salient pole is 180 degrees.

A pair of exciting coils 16a and 16d, which are connected in series or in parallel, are referred to as an exciting coil pair 32a. A pair of exciting coils 16b and 16e and that of exciting coils 16c and 16f, are connected in the same manner as the exciting coil pair 32a, and are referred to as exciting coil pairs 32c and 32e, respectively. In the same way, the pairs of exciting coils 16a and 16d, 16b and 16e, and 16c and 16f are referred to as exciting coil pairs 32b, 32d and 32f, respectively.

Supplying 120-degree currents to the exciting coil pairs 32a, 32c and 32e in response to the position detecting signal curves 36a and 36b, - - - , 37a, 37b, - - - , 38a and 38b, - - - shown in FIG. 6 and further supplying 120-degree currents to the exciting coil pairs 32b, 32d and 32f in response to the position detecting signal curves 43a, 43b, - - - , 44a, 44b, - - - , 45a and 45b will enable the rotor 1 to rotate in a direction of an arrow A to function as a three-phase full-wave type motor.

Figure 15:
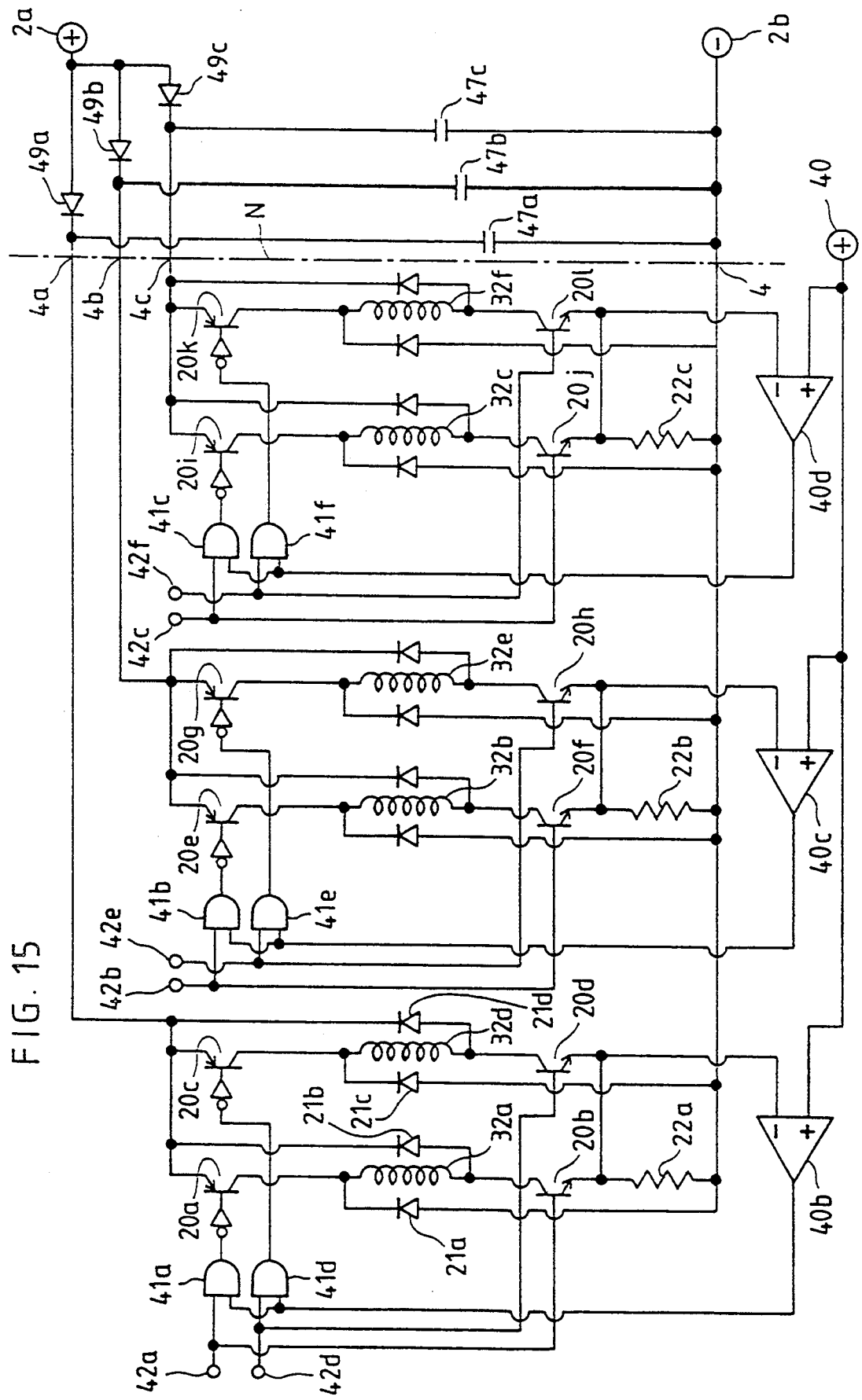
FIG. 15 is a circuit diagram showing a current supply control circuit in accordance with the fourth embodiment.

Next, with reference to FIG. 15, the current supply operation to respective exciting coils will be explained in more detail. In FIG. 15, the position detecting signals input from the terminals 42a, 42b and 42c are the position detecting signals 36, 37 and 38 of FIG. 6, whereas the position detecting signals inputted from the terminals 42d, 42e and 42f are the position detecting signals 43, 44 and 45 of FIG. 6. An output torque is the same as the case of the three-phase full-wave mode, and thus dead points and torque ripples are reduced. Accordingly, a thin and long motor can be made.

In this embodiment, the phases of the salient poles on the rotors 1-1 and 1-2 are adjusted to be the same phases. The phases of the magnetic poles on the fixed armatures 16 and 18 are offset from each other by 60 degrees. The rotor may be used as a common single rotor not for separation. The same function and effect can be obtained even if the phases of the fixed armatures 16 and 16 are adjusted to be the same phases, and the rotor 1 is separated into two (the reference numerals 1-1, 1-2) to offset the phases of respective salient poles by 60 degrees.

In FIG. 15, the position detecting signals input from the terminals 42a, 42b and 42c are referred to as No. 1-, No. 2-, and No. 3-position detecting signals respectively. The position detecting signals input from the terminals 42d, 42e and 42f are referred to as No. 1-, No. 2-, and No. 3-position detecting signals respectively.

Furthermore, the exciting coil pairs 32a and 32d are referred to as No. 1- and No. 1-exciting coils of No. 1-phase; the exciting coil pairs 32b and 32e are referred to as No. 2- and No. 2-exciting coils of No. 2-phase; and further the exciting coil pairs 32c and 32f are referred to as No. 3- and No. 3-exciting coils of No. 3-phase.

When the terminal 42a receives an input signal, the transistors 20a and 20b are turned on to activate the exciting coil 32a through the diode 49a connected in a forward direction, and, at an end of the input signal (the curve 36a), the transistors 20a and 20b are turned off.

The magnetic energy stored in the exciting coil pair 32a is prevented from returning through the diodes 21a and 21b to the DC electric power source (terminals 2a, 2b) by the back-flow preventing diode 49a. Thus, the magnetic energy is stored in the capacitor 47a. Thus, a discharge current due to the magnetic energy is promptly extinguished.

By being appropriately adjusted, a small capacitance of the capacitor 47a can be selected so that the discharge current extinguishes during a 60-degree rotation of the salient pole, i.e., during a width between a right edge of the curve 36a and a left edge of the curve 43a, shown in FIG. 6.

If the capacitance is too small, the charged voltage becomes so high that the charged voltage is feared to exceed the withstanding voltage of the transistors 20a, 20b, 20c and 20d. Thus, the counter torque can be suppressed.

When the salient poles rotate 60 degrees, the position detecting signal curve 43a is inputted into the terminal 42d. Therefore, the transistors 20c and 20d are turned on to activate the exciting coil pair 32d. In this case, since a high voltage of the capacitor 47a is applied, the exciting current builds up sharply as shown by the curve 31b of FIG. 7. Subsequently, the current value becomes a predetermined value set by a later-described chopper circuit. And, at a terminal end of the curve 43a, the transistors 20c and 20d are turned off. The magnetic energy stored in the exciting coil is prevented from returning to the DC electric power source by the backflow preventing diode 49a. Thus, the magnetic energy is discharged into the capacitor 47a to charge it up to a high voltage. Next, in response to the signal curve 36a inputted from the terminal 42a, the supplied current of the exciting coil pair 32a builds up sharply.

As apparent from the foregoing description, magnetic energies stored in the exciting coils 32a and 32d are discharged into the capacitor 47a upon the termination of current supply. Thus, the discharge current extinguishes promptly to prevent the generation of counter torque.

Moreover, a stage of building-up of the exciting currents in the exciting coils 32a and 32d and the stage of subsequent current supply operations, the supplied current can be suppressed decreasingly against the magnetomotive force due to the increase of magnetic fluxes of the magnetic poles. Accordingly, the torque reduction can be prevented. When the exciting coil pair 32d is deactivated, its magnetic energy stored in the exciting coil pair 32d is promptly discharged to charge the capacitor 47a, so that the discharge current decreases immediately to be extinguished within 60 degrees even when the motor is driven at a high speed.

After a predetermined time has elapsed, the current supply to the exciting coil pair 32a is initiated, and the exciting current increases sharply due to the high voltage of the capacitor 47a. Its time width becomes smaller than a time width of 60-degree rotation of the salient pole in the case where the copper losses and the iron losses are neglected.

After that, a voltage value obtained by subtracting a voltage drop due to the resistance of the exciting coil from the voltage of the DC electric power source balances with a reverse electromotive force due to an increase in inductance (derived from an increase in opposing areas between the salient poles and the magnetic poles). As a result, an output corresponding to the reverse electromotive force can be obtained.

Moreover, a time period required for processing the stored magnetic energy through the capacitor 47a can be estimated, since a frequency of a series LC oscillation circuit is inversely proportional to a square root of LC.

Next explained is the case wherein a chopper control is included. A chopper function for turning on-off the transistors 20a and 20b by the AND circuits 41a and 41d, the operational amplifier 40b, the standard voltage terminal 40, and the resistance 22a is the same as the previous embodiment.

By such a chopper function, the current curves 31a, 31b and 31c shown in FIG. 7 become nearly rectangular curves. A dotted line indicates a section in which the value of current is determined by the chopper function. A function for controlling the current of the exciting coil pairs 32b and 32e by the input signals of the terminals 42b and 42e, the diode 49b, the capacitor 47b, the AND circuits 41b and 41e, the transistors 20e, 20f, - - -, the resistance 22b, and the operational amplifier 40c is the same as that for the previously described exciting coil pairs 32a and 32d. Furthermore, a function for controlling the current of the exciting coil pairs 32c and 32f by the input signals of the terminals 42c and 42f, the diode 49c, the capacitor 47c, the AND circuits 41c and 41f, the transistors 20i and 20j, - - -, the resistance 22c, and the operational amplifier 40d is the same as the previously described case.

Accordingly, the three-phase full-wave current supply mode reluctance type motor can be obtained. In this motor, the problem of too low a rotational speed, the primary weakness of the conventional motor, has been solved, while maintaining its advantage, a high output torque. Moreover, the torque ripple components can be suppressed. This embodiment is different from the embodiment of FIG. 10 in that the capacitors 47a, 47b and 47c are connected in parallel with the diodes 49a, 49b and 49c, and the DC electric power source; however, almost the same function and effect can be obtained.

Curves 31d and 31e of FIG. 7 show the exciting currents of the exciting coils 32b and 32e by the position detecting signals 37a and 44a respectively. Curves 31g, 31h and 31f of FIG. 7 show the exciting currents of the exciting coils 32c and 32f by the position detecting signals 38a, 45a and 45b respectively. The capacitors 47a, 47b and 47c are connected in parallel with the diodes 49a, 49b and 49c and the DC electric power source; however, the present invention can be realized even if the capacitors 47a, 47b and 47c are connected in parallel with the diodes 49a, 49b and 49c.

The current width is set to be 120 degrees. If the current width is made smaller than 120 degrees by cutting the terminal end portion of the position detecting signal, no counter torque is generated, even if the trailing-edge width of the exciting current exceeds 60 degrees. Thus, the motor capable of being driven at a higher speed can be realized.

If the armature magnetic core, the rotor and the inductance coil core are respectively formed from the mixture of powder magnetic core by plastic by hardening it with a press and a heat treatment to obtain a large specific resistance, the eddy losses are reduced, and thus the efficiency of the motor can be maintained at a satisfactory level even in a high-speed driving condition. The means in accordance with this embodiment can also be applied to the three-phase full-wave type motor which is previously described with reference to FIG. 9.

Figure 16:
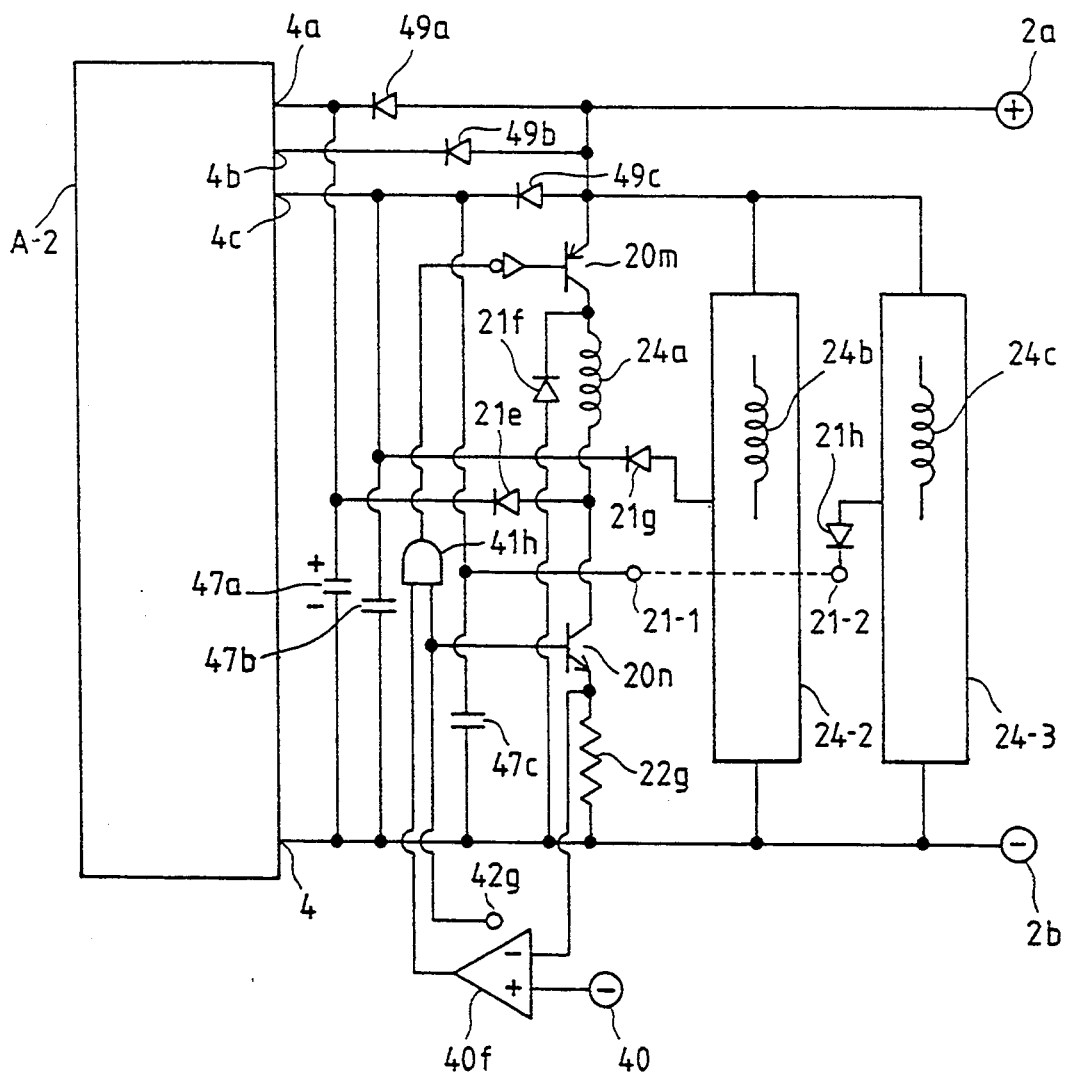
FIG. 16 is a circuit diagram of the circuit shown in FIG. 15 modified by adding inductance coils for making steep a building-up and a trailing-edge of the exciting current.

A circuit located on the left side of an alternate long and short dash line N of FIG. 15 is shown as a block circuit A-2 in FIG. 16. Reference numerals 4, 4a, 4b and 4c denote connecting points of respective lead lines. The circuit on the right is modified to have a constitution as is shown in FIG. 16. In FIG. 16, inductance coils 24a, 24b and 24c and their control circuits are constituted in the same manner as those with the same reference numerals shown in FIG. 5. A terminal 21-1 is connected to a terminal 21-2. Magnetic energies stored in the inductance coils 24a, 24b and 24c are discharged through the diodes 21e, 21g and 21h to charge the capacitors 47a, 47b and 47c.

The position detecting signals, input from the terminals 42a and 42d of FIG. 15 are input through an OR circuit to the terminal 42g. In the block circuit 24-2, the position detecting signals inputted from the terminals 42b and 42e are input through an OR circuit to a terminal corresponding to the terminal 42g. In the block circuit 24-3, the position detecting signals inputted from the terminals 42c and 42f are inputted through an OR circuit to a terminal corresponding to the terminal 42g.

With these arrangements, when the exciting coils are deactivated, the inductance coils are simultaneously deactivated. Thus, magnetic energies of both coils charge the capacitor to increase its electrostatic energy. Accordingly, when a next exciting coil is activated, an exciting current builds up sharply by virtue of this electrostatic energy. Thus, the reduction of the output torque can be avoided even if the motor is driven at a high speed. The above function is the same as the case of FIG. 5.

Next, a fifth embodiment of the present invention applied to a two-phase full-wave type motor will be explained hereinafter.

Figure 17:
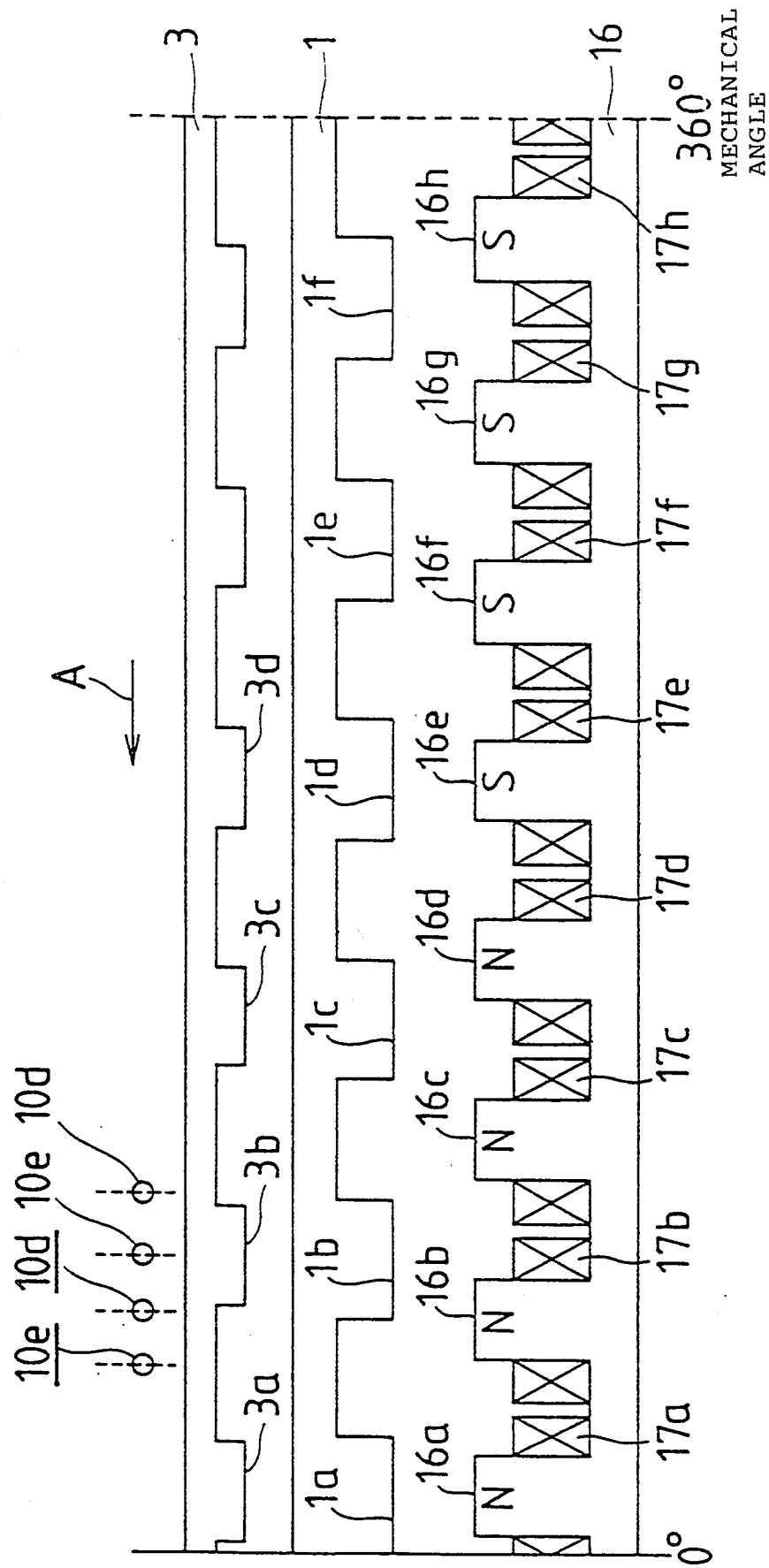
FIG. 17 is a schematic development showing a rotor and an armature of a two-phase full-wave reluctance type motor in accordance with a fifth embodiment of the present invention.

Though no plane view is given in this embodiment, FIG. 17 shows a development. In FIG. 17, a circular ring portion 16 and magnetic poles 16a, 16b, - - - are made of the well-known lamination-structure of silicon steel sheets and fixed on an outer case (not shown) to form an armature. A reference numeral 16 denotes a magnetic core, which serve as a magnetic path. Magnetic poles 16a, 18b, - - - are associated with exciting coils 17a, 17b, - - - . The rotor i has an outer peripheral portion provided with salient-poles 1a, 1b, - - -, which face the magnetic poles 16a, 16b, - - - over an air gap of approximately 0.1–0.2 mm.

The rotor 1 is formed in the same manner as the armature 18. The rotor 1 includes 8 salient poles being uniformly spaced from each other. Tip ends of the magnetic poles 16a, 16b, - - - have a 120-degree width, and 8 magnetic poles are uniformly disposed.

When the exciting coils 17b and 17f are activated, the salient poles 1b and 1e are magnetically attracted to rotate the rotor 1 in the direction of an arrow A. When the rotor 1 rotates 90 degrees, the exciting coils 17b and 17f are deactivated, whereas the exciting coils 17c and 17g are activated to magnetically attract the salient poles 1c, 1f. Thus, the torque is generated by salient poles 1e and 1f. The magnetic poles 16b and 16c are respectively magnetized to have an N-polarity, whereas magnetic poles 16f and 16g are respectively magnetized to have an S-polarity. Thus, the counter torque due to a leaking magnetic flux is prevented from occurring, due to the effect of such magnetic polarization.

At a subsequent 90-degree rotation, the magnetic poles 16d and 16h are magnetized to be the N-pole and S-pole respectively, as shown in the drawing. Further, every time the rotor 1 rotates 90 degrees, respective magnetic poles are magnetized in the order of the polarities shown in the drawing.

By the above-described magnetization, the rotor 1 rotates in a direction of the arrow A to function as a two-phase full-wave type motor. The rotor 1 rotates in the same manner even if the width of current supply section is wider than 90 degrees. Since the width of the magnetic pole around which the exciting coil is wound is 120 degrees, a larger space is required for the winding.

Figure 18:
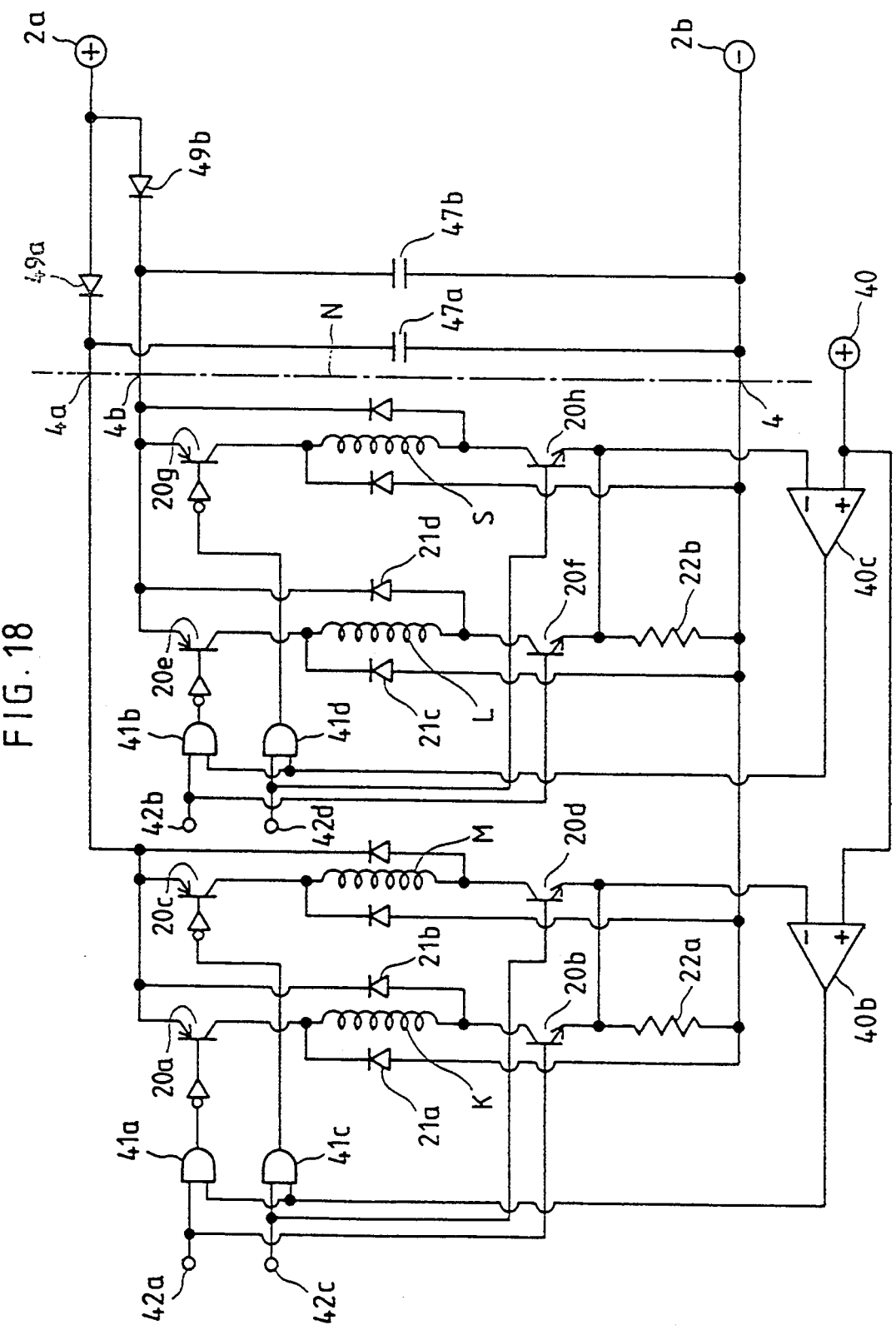
FIG. 18 is a circuit diagram showing a current supply control circuit in accordance with the fifth embodiment.

Next, with reference to FIG. 18, the current supply control of the exciting coil will be explained. In FIG. 18, exciting coil pairs K and M denote exciting coils 17a and 17e, and 17c and 17g, respectively. Two exciting coils are connected in series or in parallel. Both ends of this exciting coil pair K are connected to the transistors 20a and 20b. In the same way, both ends of the exciting coil pair M are connected to the transistors 20c and 20d. The transistors 20a, 20b, 20c and 20d are semiconductor switching elements and can be replaced by other semiconductor elements having the same effect. Electric power is supplied from the positive and negative terminals 2a and 2b of the DC electric power source.

If the HIGH-level position detecting signal is input from the input terminal 42a, the transistors 20a and 20b are turned on to activate the exciting coil pair K. Furthermore, if the HIGH-level position detecting signal is input from the input terminal 42c, the transistors 20c and 20d are turned on to activate the exciting coil pair M.

The rotor 3 of FIG. 17 is made of a conductive plate, which is provided coaxially with the rotor 1 for synchronous rotation. The rotor 3 is provided with protruding portions 3a, 3b, - - -, each having a width of 150 degrees. The coils 10d, 10e, 10d and 10e are constituted in the same manner as the previously described coils 10a, 10b and 10c. The coils 10d, 10e, 10d and 10e are disposed to face the protruding portions 3a, 3b, - - - . The coils 10d and 10e are spaced by 90 degrees, and coils 10d and 10e are offset from the coils 10d and 10e by 180 degrees respectively.

Figure 20:
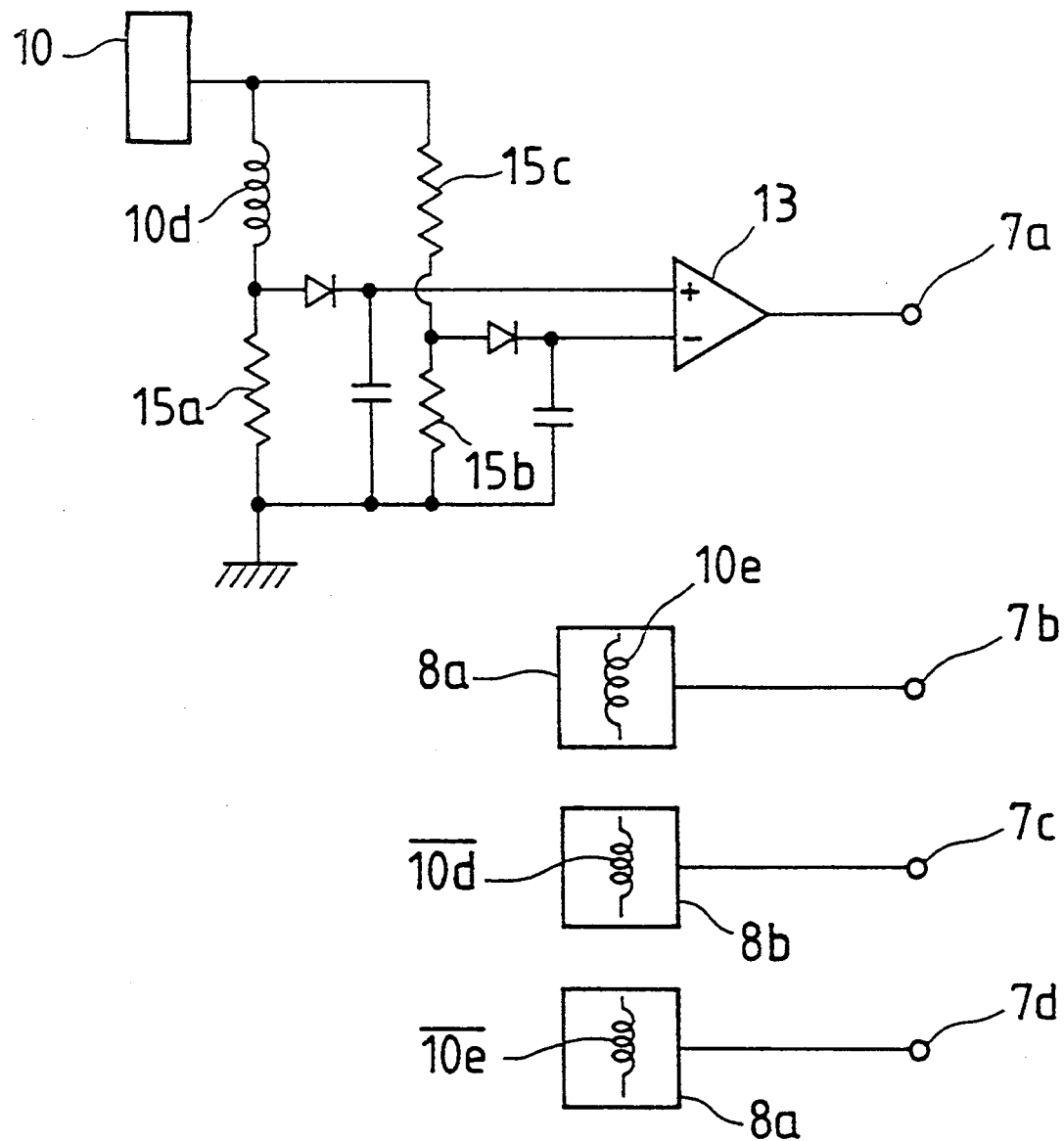
FIG. 20 is a circuit diagram showing a position detecting device in accordance with the fifth embodiment.

FIG. 20 is an electric circuit for obtaining position detecting signals from the above-described coils. The oscillator 10, the coil 10d, the resistances 15a and 15b, - - -, the operational amplifier 13 and so on are the same components as those shown in FIG. 3. Thus, rectangular-waveform electric signals having the same width and phase difference as the protruding portions 3a and 3b, - - - can be obtained from the terminal 7a.

Figure 21:
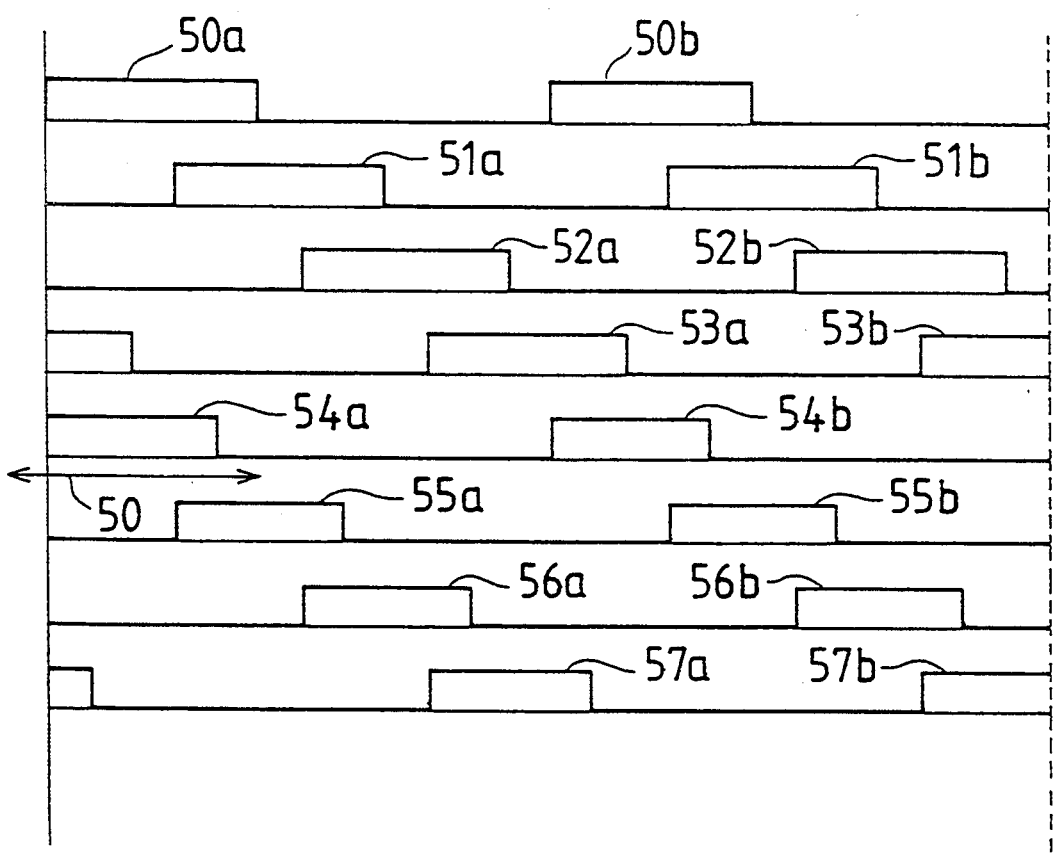
FIG. 21 is a timing chart showing position detecting signals in accordance with the fifth embodiment.

The position detecting signals obtained from the coil 10d are shown as curves 50a and 50b, - - - in the time chart of FIG. 21. Position detecting signals are obtained from each of terminals 7b, 7c and 7d, each corresponding to each of the circuits of the same constitution, namely, circuits 8a, 8b and 8c, of which circuit 8a includes coil 10e; circuit 8b includes coil 10d; and circuit 8c includes coil 10e.

Output signals from the terminal 7b are shown as curves 51a and 51b, - - - in FIG. 21. Output signals from the terminal 7c are shown as curves 52a and 52b, - - -, whereas the same from terminal 7d as curves 53a, 53b, - - - respectively. Respective curves have a 150-degree width, and are successively offset by 90 degrees.

If the width of the protruding portions 3a, 3b, - - - of FIG. 17 are changed to 120 degrees, the position detecting signals obtained from the coils 10d, 10e, 10d and 10e look like curves 54a, 54b, - - -, curves 55a, 55b, - - -, curves 56a, 56b, - - - and curves 57a, 57b, - - -, which are shown in the time chart of FIG. 21. Respective curves have a 120-degree width, and are successively offset by 90 degrees. An arrow 50 denotes a 180-degree section.

No. 1 and No. 1 position detecting signals of No. 1-phase are input from terminals 42a and 42c of FIG. 18, and are shown by curves 50a, 50b, - - - and curves 52a, 52b, - - - respectively. A No. 2 and No. 2 position detecting signals of No. 2-phase are inputted from terminals 42b and 42d, and are shown by curves 51a, 51b, - - - and curves 53a, 53b, - - -, respectively.

Since the No. 1 and No. 1 position detecting signals are input to the terminals 42a and 42c, the current supply control for respective transistors can be executed. The No. 1-phase exciting coils K and M are supplied with 150-degree width currents in response to respective position detecting signals.

In response to the position detecting signal 51a, the exciting coil K is supplied with a current shown by the curve 27a of FIG. 7. A width between dotted lines is 150 degrees. A torque generating condition and its characteristics are the same as the previously described embodiment. A chopper function, to regulate the current at a predetermined value by the operational amplifier 40b, the voltage of the standard voltage terminal 40, the resistance 22a and the AND circuits 41a and 41c, is carried out in the same manner as the previous embodiment. The functions and effects of diode 49a and capacitor 47a are the same as those of the previous embodiment, that is, they make rapid both the rise of curve 27 and fall of curve 27b.

The No. 2 and No. 2 position detecting signals are input to the terminals 42b and 42d, respectively to control the supply of current to transistors, whereby the No. 2-phase exciting coils L and S can be activated or deactivated in response to the width of respective position detecting signals.

Functions and effects of the diode 49b, the capacitor 47b, the operational amplifier 40c, the resistance 22b, and the AND circuits 41b and 41d are the same as those in the case of the previously described current supply to the No. 1-phase exciting coil. With the above arrangement, a two-phase full-wave type motor can be realized.

When the No. 1 and No. 1 position detecting signal curves 54a, 54b, - - - and 56a, 56b, - - - of FIG. 21 are input to the terminals 42a and 42c to cause the No. 2 and No. 2 position detecting signal curves 55a, 55b, - - - and 57a, 57b, - - - to be input in the terminals 42b and 42d, a current width supplied to the exciting coil becomes 120 degrees. An angle from a point where the salient poles enter into the magnetic poles to a point where the current supply is initiated can be varied within a range of 0 to 45 degrees as the occasion demands. With this arrangement, a 2-phase full-wave type motor can be obtained.

Though this embodiment is explained by taking examples of 150-degree and 120-degree-width position detecting signals, this width can be varied in a range of 90–150 degrees. Under these settings, it is characteristic, however, that, when the current supply is set to 90 degrees, the motor can be driven at a high speed such as 100 thousand rpm with 1 kw, though the motor output torque decreases as the operating speed of the motor increases, whereas, when the current supply width is set to a higher level, such as 150 degrees, the motor output torque becomes larger, though the motor speed decreases to a half.

As shown in FIG. 17, it is possible to form the magnetic poles having the pole width of 180 degrees and 10 salient poles. Furthermore, it is also possible to form the 8 n (n: a positive integer) pieces of magnetic pole having a 120-degree width. In this case, the number of the salient poles are increased depending on the number of magnetic poles. As the number of the magnetic pole increases, the output torque also increases; however, the rotational speed decreases.

Curves 30a and 30b of FIG. 7 show currents supplied to the exciting coils K and M, whereas curves 30c and 30d show currents supplied to the exciting coils L and S. Curves 54a, 55a, 56a and 57a show position detecting signal curves. It is characteristic of these curves that their current widths are 90 degrees and continuous with each other without overlapping of respective currents, so that the ripple torque can be suppressed to a small value.

In respective embodiments, by providing teeth on the magnetic poles and salient poles, the output torque can be increased. Since the present invention is intended to drive the motor at a high speed, it is an advantage of the present invention that it provides a useful technical means such as that for increasing only the torque.

In an embodiment of FIG. 1, the invention can be realized even when the 6 n (n: a positive integer) pieces of magnetic poles are provided. The salient poles have to be increased corresponding to the increase of the magnetic poles. It is an advantage of the present invention that the output torque can be increased without decreasing rotational speed. Thus, this technical means is effective for application to a large-diameter motor.

Figure 19:
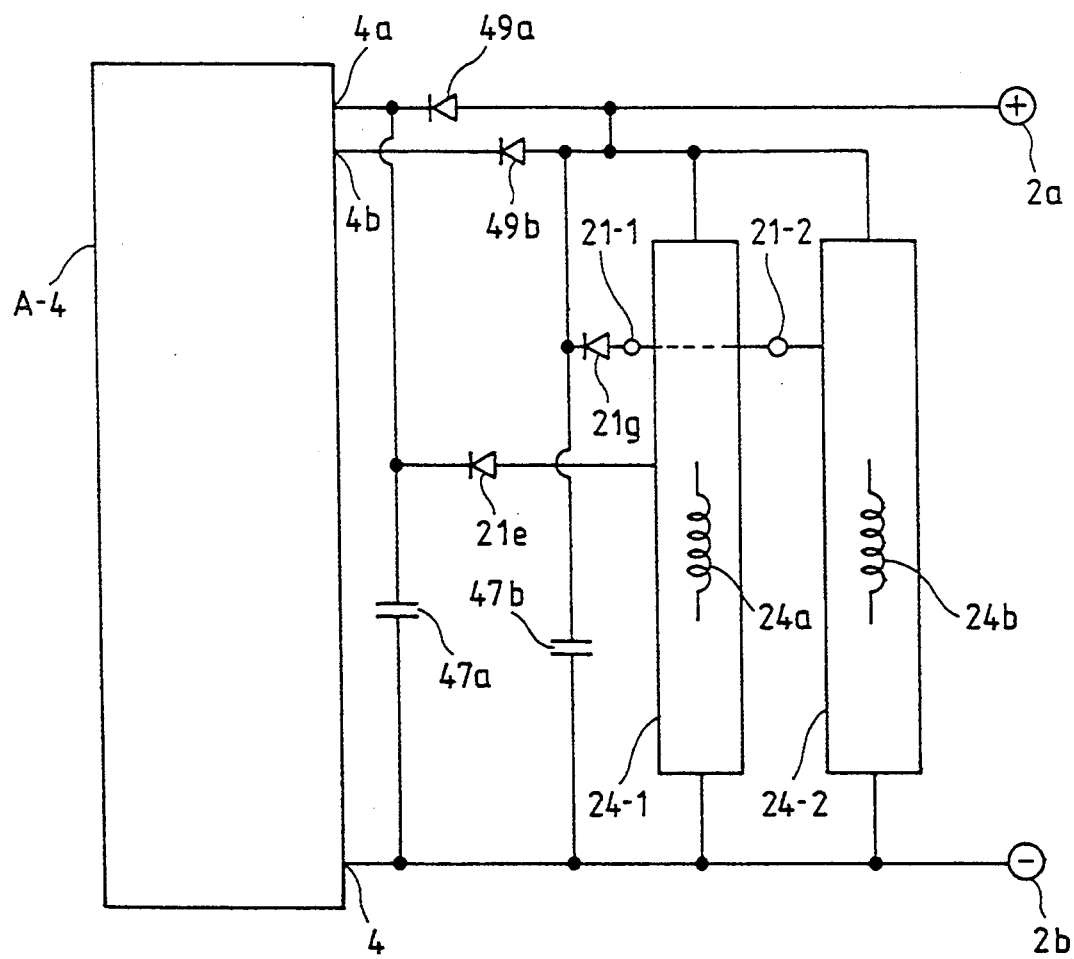
FIG. 19 is a circuit diagram of the circuit shown in FIG. 18 modified by adding inductance coils for making steep a building-up and a trailing-edge of the exciting current.

The circuit located on the left side of the alternate long and short dash line N of FIG. 18 is shown as a block A-4 in FIG. 19. The right-side circuit of FIG. 18 is modified by adding the inductance coils 24a and 24b. In FIG. 19, the inductance coils 24a and 24b have the same constitutions as the previous embodiment. Their current supply control circuits 24-1 and 24-2 have the same constitutions as the current supply control circuits shown in FIG. 11.

The terminal 21-1 and the terminal 21-2 are connected. As long as the exciting coil M is activated, the inductance coil 24a is supplied with a current. When both coils M and 24a are deactivated, the magnetic energies stored in the coils M and 24a are discharged to charge the capacitor 47a to a higher voltage. Accordingly, the supplied current decreases steeply.

When the exciting coil M is activated, the current builds up sharply. This is because the magnetic energy in the inductance coil compensates the copper losses of the exciting coils and iron losses of the magnetic cores. The above-described explanation is applicable to the inductance coil 24b and the exciting coils L and S.

Since the magnetic energies stored in the inductance coils 24a and 24b are for compensating the copper losses and the iron losses, only the amount of current which is large enough for compensation is required. For the current supply means the chopper circuit can be replaced by other means. For example, if means capable of applying a voltage reversely proportional to the rotational speed is adopted, the same effect can be obtained. Further, the same effect can be obtained even if the current width is smaller than the position detecting signal.

Figure 22:
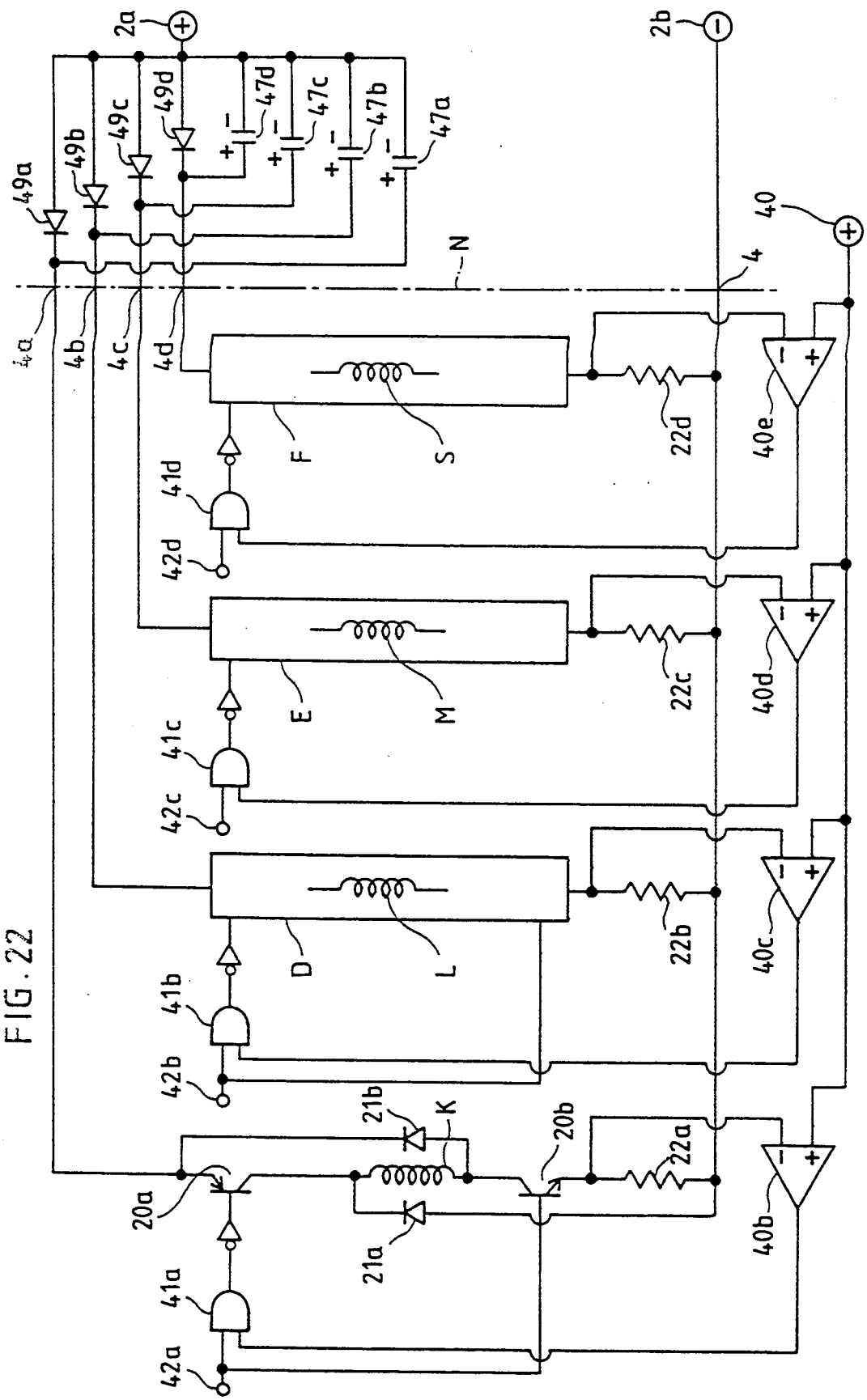
FIG. 22 is a circuit diagram showing a current supply control circuit as a modification of the fifth embodiment of the present invention.

A current supply control circuit of FIG. 22 shows an embodiment relating to a two-phase full-wave reluctance type motor, in which current supply circuit for No. 1-phase and No. 2-phase exciting coils is divided into four independent circuits to supply the current from a DC power source through diodes 49a, 49b, 49c and 49d, and capacitors 47a, 47b, 47c and 47d. In this case, No. 1, No. 2, No. 1 and No. 2 position detecting signals are input through terminals 42a, 42b and 42c, respectively. The width of respective position detecting signals can be changed in a range of 90–150 degrees like the case of the previously described embodiment. Since the similar characteristics can be obtained within this range, this embodiment will be explained by taking an example of 150-degree width position detecting signals shown in FIG. 21.

Electric signals represented by curves 50a, 50b, - - - shown in FIG. 21 are input into the terminal 42a. When the signal of the curve 50a is applied to the input terminal 42a, the transistors 20a and 20b are turned on to activate the No. 1 phase exciting coil K. Then, if the current is stopped, the stored magnetic energy charges capacitor 47a to a high voltage through diodes 21a and 21b, and thus the discharge current extinguishes quickly. The capacitor 47a maintains at the charged voltage until the exciting coil is again activated in response to the next curve 50b.

Subsequently, when the signal of the curve 50b is input, the current builds up sharply due to the application of a large voltage equal to a summation of the charged voltage of the capacitor 47a (which is charged to have the positive and negative polarities shown in the drawing) and the voltage of the DC electric power source. When the current is stopped at the end of the curve 50b, the capacitor 47a is again charged, and thus the stored magnetic energy will be discharged rapidly.

The current supply to the exciting coils L, M and S by the No. 2, No. 1 and No. 2 position detecting signals 51a, 51b, - - -, curves 52a, 52b, - - -, curves 53a, 53b, - - - input from the terminals 42a, 42b and 42c, are controlled by the functions of corresponding diodes 49b 49c, 49d and the capacitors 47b, 47c, 47d in the same way as the exciting coil K.

The block diagrams D, E and F denote the current supply control circuits for the exciting coils L, M and S, which are similar to the current supply control circuit of the exciting coil K, which comprises the same transistor. Furthermore, reference numerals 22a, 22b, 22c and 22d denote resistances for detecting the exciting current flowing in the exciting coils K, L, M and S. The exciting currents of the exciting coils are chopper-controlled in accordance with the AND circuits 41a, 41b, 41c and 41d and the operational amplifiers 40b, 40c, 40d and 40e. The current value is regulated on the basis of an applied voltage of the standard voltage terminal 40. The function and effect by the chopper circuit is the same as the previous embodiment. With above constitution, the two-phase full-wave motor can be obtained to accomplish the object of the present invention.

Figure 24:
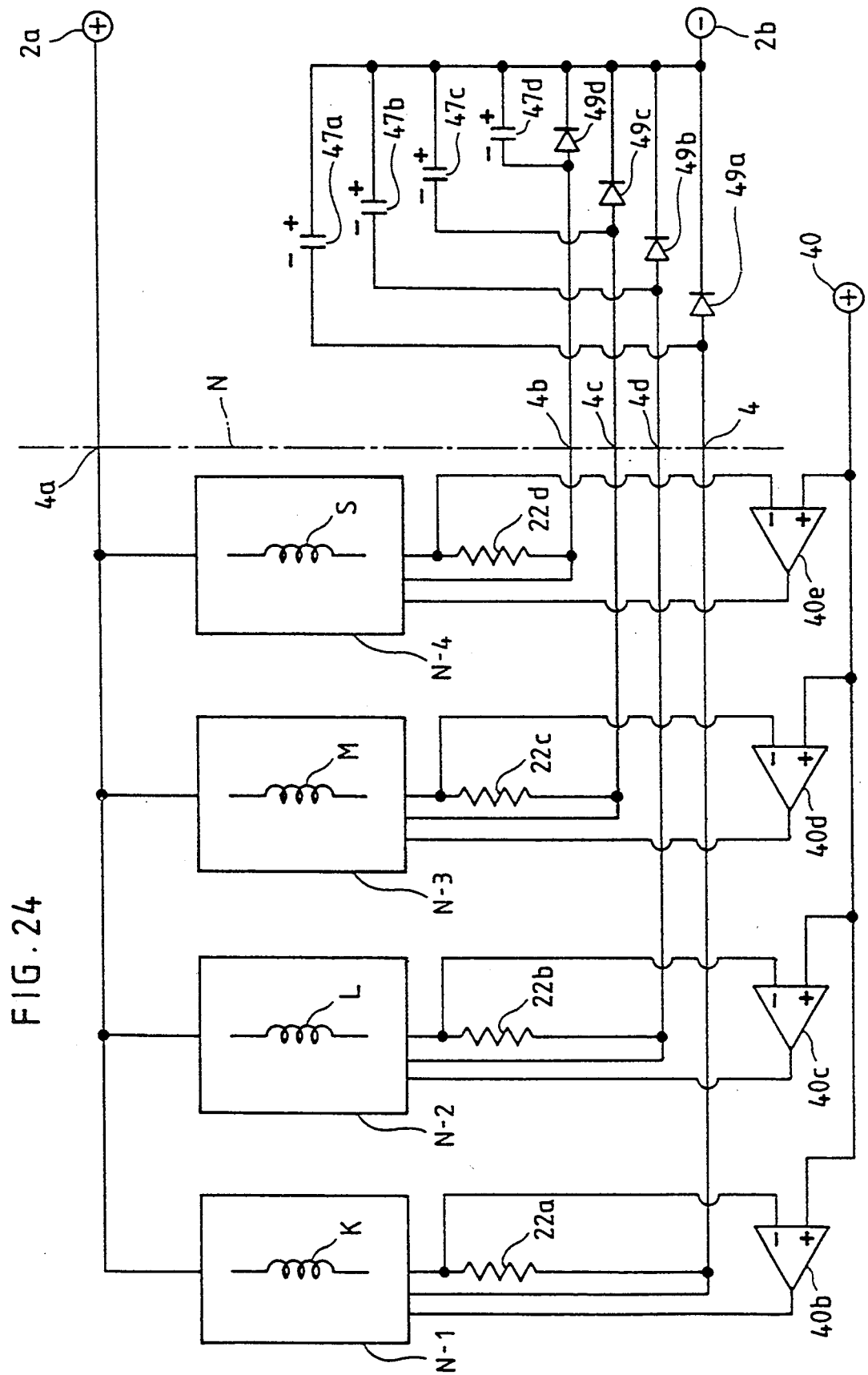
FIG. 24 is a circuit diagram showing a current supply control circuit as an other modification of the fifth embodiment of the present invention.

FIG. 24 shows a modified embodiment of the current supply circuit. This current supply control circuit is characterized in that the diodes 49a, 49b, - - - and the capacitors 47a, 47b, - - - are provided on the side of a negative-terminal 2b of the DC electric power source. In FIG. 24, blocks N-1, N-2, N-3 and N-4 denote the same circuits as the current supply control circuits of the exciting coils K, L, M and S shown in FIG. 22. The resistances 22a, 22b, 22c and 22d and the operational amplifiers 40b, 40c, 40d and 40e perform the same chopper control function as FIG. 22. Downside ends of respective resistances 22a, 22b, - - - are independently separated to be connected to the negative terminal 2b of the DC electric power source through the diodes 49a, 49b, - - - which are interposed in a forward direction.

For example, if the current supply to the exciting coil L is stopped, the corresponding capacitor 47b is charged to a high voltage by the discharge current due to the magnetic energy stored in the exciting coil L, and the current is extinguished rapidly. After a predetermined time has elapsed, the exciting coil L is again supplied with the exciting current. Since the voltage equal to the summation of the voltage of the DC electric power source and the charged voltage of the capacitor 47b is applied to the exciting coil L, the exciting current builds up steeply. Thus, the object of the present invention can be accomplished. The present invention can be carried out by setting the current width of the exciting coil within 90–150 degrees.

Though the above-described various embodiments use coils 10a, 10b, as the means for obtaining the position detecting signals, the well-known means such as one using encoders may be substituted for these coils.

Figure 23:
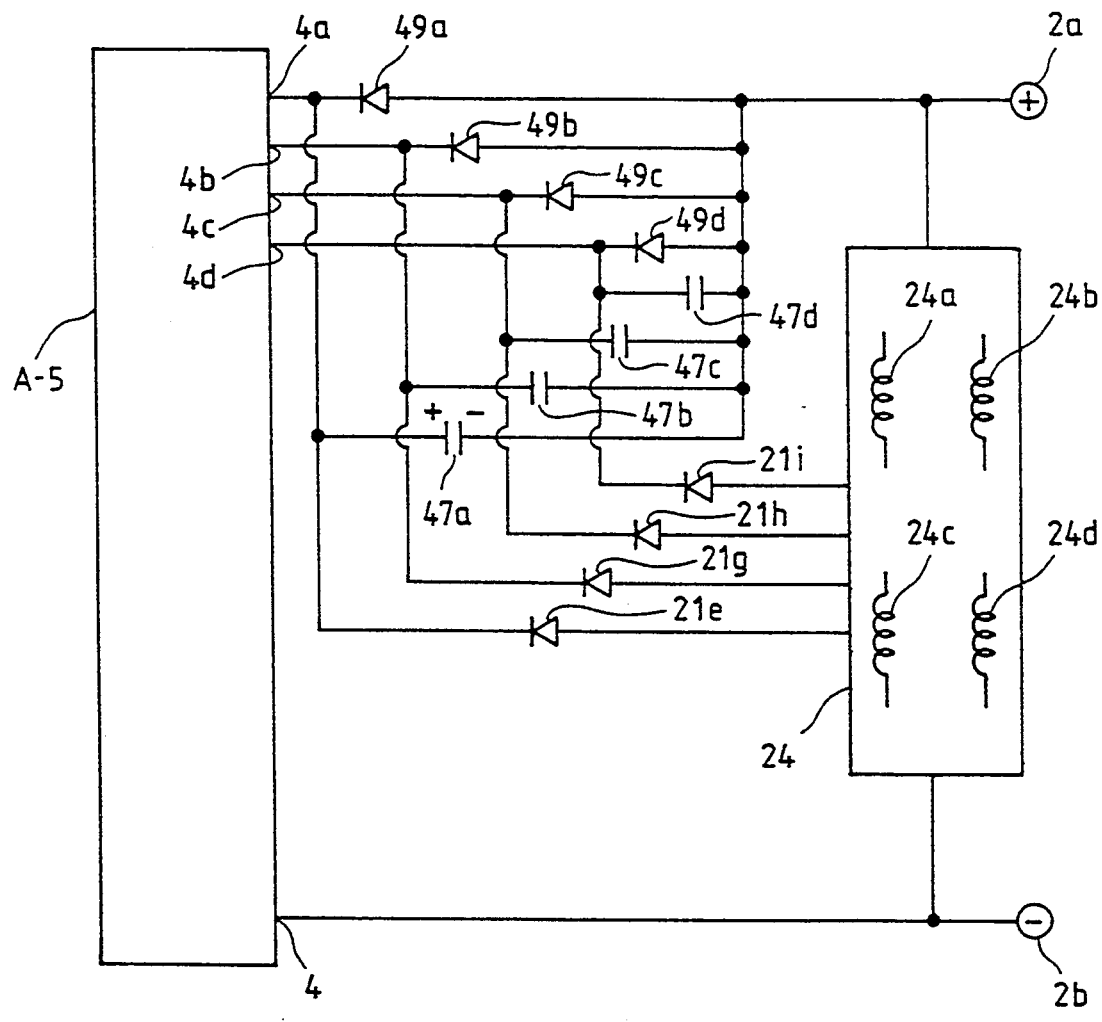
FIG. 23 is a circuit diagram of the circuit shown in FIG. 22 modified by adding inductance coils for making steep a building-up and a trailing-edge of the exciting current.

The circuit located on the left side of the alternate long and short dash line N of FIG. 22 is shown as a block A-5 in FIG. 23. In FIG. 23, current supply control circuits for the inductance coils 24a, 24b, 24c and 24d are summarized as a block circuit 24. Connecting points of lead lines are denoted by reference numerals 4, 4a, 4b, - - - Block 24 comprises four sets of circuits, which are the same as those of the previous embodiment, for controlling the supply of current to inductance coils 24a, 24b - - -.

Here, a current supply operation of the exciting coil will be explained taking the example of the exciting coil K. During the current supply operation of the exciting coil K, the inductance coil 24a is supplied with a current of a predetermined value by the same position detecting signal. When both coils K and 24a are deactivated, the magnetic energies stored in these coils K and 24a are prevented from returning through the diode 49a to the DC electric power source side, thereby charging the capacitor 47a to a high value. Next, the exciting coil K is again activated, its applied voltage becoming large and equal to a summation of the charged voltage of the capacitor 47a and the electric power source voltage. Thus, both the stop and building-up of the current becomes sharp. For example, in the case of the building-up, as shown in FIG. 7, the bend in the middle of curve 27 in the first stage can be prevented to make the current to build up sharply. Thus, the output torque can be prevented from falling. The above-described same principle is also applicable to other exciting coils. Thus, the object of the present invention can also be accomplished in other exciting coils.

Diodes 21e, 21g, 21h and 21i are provided to discharge the magnetic energies stored in the inductance coils 24a, 24b, - - - into the capacitors 47a, 47b, - - - when the inductance coils 24a, 24b, - - - are deactivated.

Figure 25:
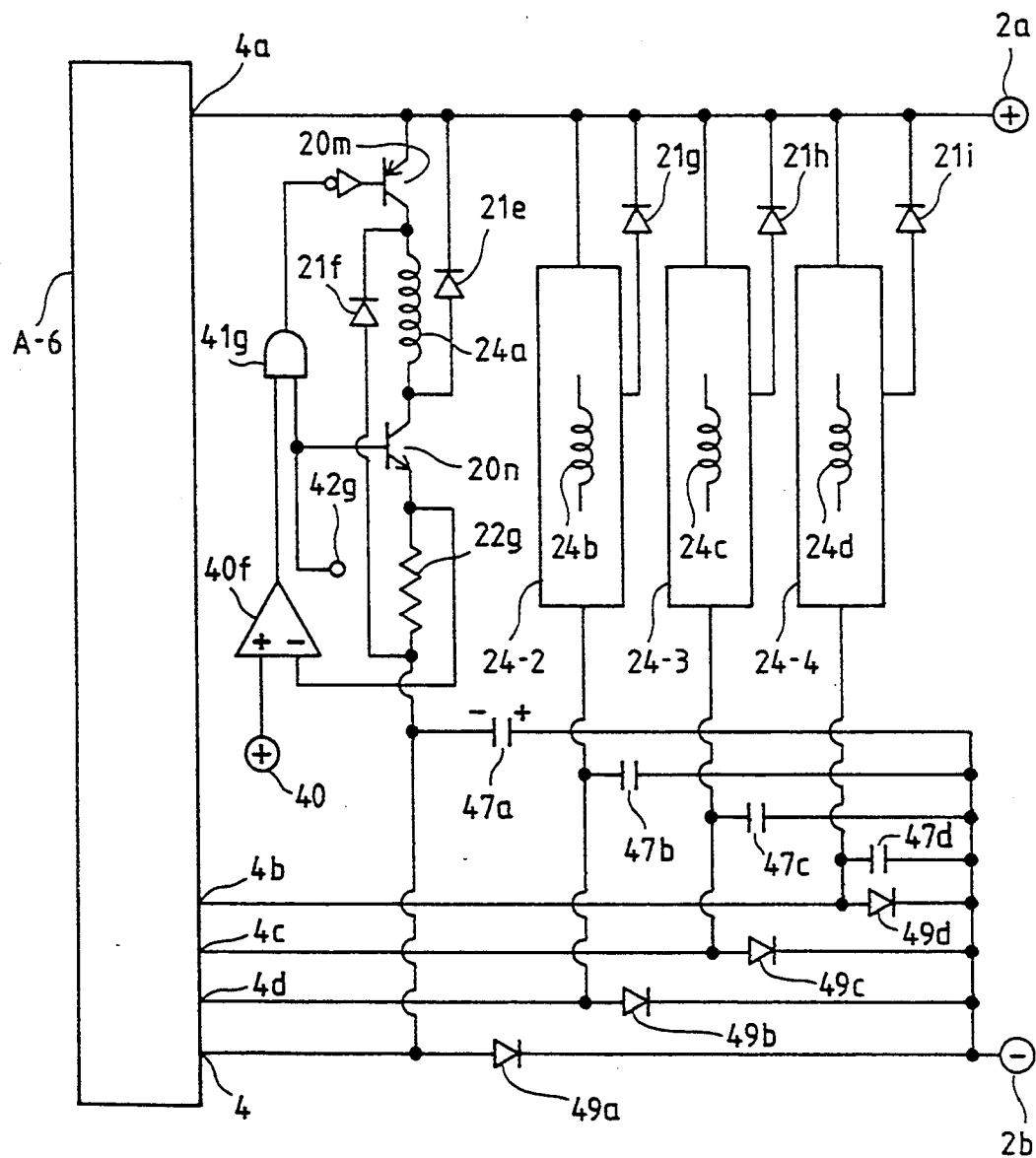
FIG. 25 is a circuit diagram of the circuit shown in FIG. 24 modified by adding inductance coils for making steep a building-up and a trailing-edge of the exciting current.

The circuit located on the left side of the alternate long and short dash line N of FIG. 24 is shown as a block A-6 in FIG. 25. In FIG. 25, current supply control circuits for the inductance coils 24a, 24b, - - - are provided on the right side. Block circuits 24-2, 24-3 and 24-4 have the same function as that of the inductance coil 24a whose function is to control the current supply to the inductance coils 24b, 24c and 24d. Connecting points of lead lines are denoted by reference numerals 4, 4a, 4b, - - -.

A current supply control circuit for the inductance coil 24a functions in the same manner as the circuit suffixed with the same reference numeral as is shown in FIG. 5.

When the inductance coil 24a is deactivated, the magnetic energy stored in the inductance coil 24a is discharged through the diode 21e and the positive and negative poles 2a and 2b of DC electric power source to charge the capacitor 47a to a high voltage. The magnetic energy stored in the exciting coil K also charges the capacitor 47a. Thus, the current decreases quickly.

Subsequently, when the exciting coil K is again activated, a building-up of the current becomes sharp due to the effect of the application of a large voltage equal to a summation of the charged voltage of the capacitor 47a and the DC electric power source voltage. In this case, the magnetic energy in the inductance coil 24a compensates for the copper losses of the exciting coils and iron losses of the magnetic cores occurring during the transfer of the magnetic energy in the circuit. The above-described same principle is also applicable to other exciting coils L, M and S, and inductance coils 24b, 24c and 24d. Thus, the object of the present invention can be accomplished. The inductance coil 24a is activated only within its width in response to the position detecting signal input from the terminal 42g which is the same as the input signal of the terminal 42a of FIG. 24. Other inductance coils are also activated by the current widths of their corresponding exciting coils.

What is claimed is:

1. A three-phase half-wave high-speed reluctance type motor driven by a DC electric power source, said high speed reluctance type motor comprising:

an outer casing having an inner surface;

a rotor having an outer surface formed with a plurality of salient poles having the same circumferential width and equally spaced with each other in a circumferential direction, the rotor rotatably supported on the outer casing;

an armature having an inner surface formed with 6 n (n: a positive integer) pieces of magnetic pole respectively having circumferential widths of one of a 120- and a 180-degree electric angle and equally spaced with each other in the circumferential direction to face said plurality of salient poles over slight gaps, including first, second, and third phase exciting coils respectively associated with said magnetic poles, said armature being fixed on the inner surface of the outer casing;

a position detecting device, having a number of position detecting elements spaced apart from each other so as to correspond to said exciting coils, successively outputting a first phase position detecting signal having a rectangular waveform of a predetermined signal level having a 120-degree width at regular intervals of a 360-degree electric angle, a second phase position detecting signal having the same rectangular waveform but delayed by an electric angle having 120 degrees with respect to the first phase position detecting signal, and a third phase position detecting signal having the same rectangular waveform but delayed by an electric angle of 120 degrees with respect to the second phase position detecting signal, in accordance with a rotational position of said rotor;

a current supply control circuit including a plurality of switching elements, each end of each phase exciting coil serially connected to a respective one of said plurality of switching elements, each of said plurality of switching elements interposed between the DC electric power source and a corresponding one of said first, second and third phase exciting coils, alternately activating and deactivating said first, second and third phase exciting coils by alternately turning on and off said corresponding serially connected switching elements in response to corresponding said first, second and third phase position detecting signals, to control exciting currents flowing through respective said first, second and third phase exciting coils, each switching element and corresponding serially connected exciting coil forming a joint unit;

circuit means including diodes respectively connected inversely to said joint units first, second and third back-flow preventing diodes respectively connected in a forward direction with respect to the DC electric power source and respectively related to said first, second and third phase exciting coils, and first, second, and third capacitors respectively connected in parallel with said first, second and third back-flow preventing diodes, said circuit means promptly discharging a magnetic energy stored in one exciting coil into a corresponding one of said first, second and third capacitors, as a charged voltage, through a corresponding one of said inversely connected diodes to charge said corresponding one capacitor and to extinguish the magnetic energy stored in said one exciting coil when the respective exciting current supplied to said one exciting coil is stopped said circuit means also steeply building up the respective exciting current supplied to a subsequently activated exciting coil by use of the charged voltage in said corresponding one capacitor, wherein said position detecting elements are disposed in a manner such that said position detecting device outputs position detecting signals within a 30 degree electric angle section after any one of said salient poles begins to enter any one of said magnetic poles, so that said current supply control circuit is initiated to supply the exciting current respectively corresponding to the exciting coil associated with said any one of said magnetic poles.

2. The high-speed reluctance type motor according to claim 1, wherein magnetic poles of common phase are disposed opposite to each other in a diametrical direction of the motor.

3. The high speed reluctance type motor according to claim 1, further comprising:

first, second and third inductance coils, supplied with respective inductance currents corresponding to only widths of said first, second and third phase position detecting signals, respectively, to store respective magnetic energies; and an electric circuit converting the respective magnetic energies stored in said first, second and third inductance coils into electrostatic energies of said corresponding first, second and third capacitors, respectively, when the corresponding ones of said first, second and third inductance coils are deactivated.

4. A three-phase half-wave high-speed reluctance type motor driven by a DC electric power source, said high speed reluctance type motor comprising:

an outer casing having an inner surface;

a rotor having an outer surface formed with a plurality of salient poles having the same circumferential width and equally spaced with each other in a circumferential direction, the rotor rotatably supported on the outer casing;

an armature, having an inner surface formed with 12 n (n: a positive integer) pieces of magnetic pole respectively having circumferential widths of one of a 120- and 180-degree electric angle and equally spaced with each other in the circumferential direction to face said plurality of salient poles over slight gaps, including first, second and third phase exciting coils, and fourth, fifth and sixth phase exciting coils respectively associated with said magnetic poles, said armature being fixed on the inner surface of the outer casing;

a position detecting device, having a number of position detecting elements being spaced apart from each other so as to correspond to said exciting coils, successively outputting a first phase position detecting signal having a rectangular waveform of a predetermined signal level having a 120-degree width at regular intervals of a 360-degree electric angle, a second phase position detecting signal having the same rectangular waveform but delayed by an electric angle of 120 degrees switch with respect to the first phase position detecting signal, and a third phase position detecting signal having the same rectangular waveform but delayed by an electric angle of 120 degrees with respect to the second phase position detecting signal, and further outputting fourth, fifth and sixth phase position detecting signals, delayed by a 180-degree electric angle from said first, second and third phase position detecting signals, respectively, depending on a rotational position of said rotor;

a current supply control circuit including a plurality of switching elements, each end of each phase exciting coil serially connected to a respective one of said plurality of switching elements, each of said plurality of switching elements interposed between the DC electric power source and a corresponding one of said first through sixth phase exciting coils, alternately activating and deactivating said first, second and third phase exciting coils and said fourth, fifth and sixth phase exciting coils by alternately turning on and off said corresponding serially connected switching elements in response to corresponding said first, second and third phase position detecting signals and said fourth, fifth and sixth phase position detecting signals, to control exciting currents flowing through respective said first, through sixth phase exciting coils, each switching element and corresponding serially connected exciting coil forming a joint unit;

circuit means including diodes respectively connected inversely to said joint units first, second and third back-flow preventing diodes, respectively connected in a forward direction with respect to the DC electric power source and respectively related to said first and fourth phase exciting coils, second and fifth phase exciting coils, and third and sixth phase exciting coils, and first, second, third capacitors, connected in parallel with said first, second and third back-flow preventing diodes, said circuit means promptly discharging a magnetic energy stored in one exciting coil into a corresponding one of said first, second and third capacitors, as a charged voltage, through a corresponding one of said inversely connected diodes to charge said corresponding one capacitor and to extinguish the magnetic energy stored in said one exciting coil when the respective exciting current supplied to said one exciting coil is stopped, said circuit means also steeply building up the respective exciting current supplied to a subsequently activated exciting coil by use of the charged voltage in said corresponding one capacitor, wherein, said number of position detecting elements are disposed in a manner such that said position detecting device outputs position detecting signals within a 30-degree electric angle section after any one of said salient poles begins to enter any one of said magnetic poles, so that said current supply control circuit is initiated to supply the exciting current respectively corresponding to the exciting coil associated with said any one of said magnetic poles.

5. The high-speed reluctance type motor according to claim 4, further comprising:

first, second and third inductance coils supplied with respective inductance currents corresponding to only widths of said first and fourth phase position detecting signals, said second and fifth phase position detecting signals, and said third and sixth phase position detecting signals, respectively, to store respective magnetic energies; and an electric circuit converting the respective magnetic energies stored in said first, second and third inductance coils into electrostatic energies of said corresponding first, second, and third capacitors respectively, when the corresponding ones of said first, second and third inductance coils are deactivated.

6. A three-phase half-wave high-speed reluctance type motor driven by a DC electric power source, said high speed reluctance type motor comprising:

an outer casing having an inner surface;

a rotor having an outer surface formed with a plurality of salient poles having the same circumferential width and equally spaced with each other in a circumferential direction, the rotor rotatably supported on the outer casing;

an armature having an inner surface formed with 6 n (n: a positive integer) pieces of magnetic pole respectively having circumferential widths of one of a 120- and a 180-degree electric angle and equally spaced from each other in the circumferential direction to face said plurality of salient poles over slight gaps, including first, second and third phase exciting coils respectively associated with said magnetic poles, said armature being fixed on the inner surface of the outer casing;

a position detecting device, having a number of position detecting elements spaced apart from each other so as to correspond to said exciting coils successively outputting first position detecting signal having first, second and third phase rectangular waveforms, which are in succession and of the same electric angle width of 120 degrees, and second position detecting signal having a first, second and third phase rectangular waveforms, which are of the same electric angle width of 60 degrees corresponding to first-halves of the rectangular waveforms of said first position detecting signal and are spaced apart from each other by a 60-degree electric angle, depending on a rotational position of said rotor;

including a plurality of switching elements, each end of each phase exciting coil serially connected to a respective one of said plurality of switching elements, each of said plurality of switching elements interposed between the DC electric power source and a corresponding one of said first, second and third phase exciting coils, alternately activating and deactivating said first, second and third phase exciting coils by alternately turning on and off said plurality of switching elements in response to said first position detecting signal when a rotational speed of said rotor is not more than a predetermined speed, and also for alternately turning on and off said plurality of switching elements in response to said second position detecting signal when the rotational speed exceeds the predetermined speed, to control exciting currents flowing through respective said first, second and third phase exciting coils, each switching element and corresponding serially connected exciting coil forming a joint unit;

circuit means including diodes respectively connected inversely to said joint units, a back-flow preventing diode connected in a forward direction with respect to the DC electric power source, and a capacitor connected in parallel with said back-flow preventing diode, said circuit means promptly discharging a magnetic energy stored in one of the exciting coils into said capacitor, as a charged voltage, through said inversely connected diode to charge said capacitor and to extinguish the magnetic energy stored in said one exciting coil when the respective exciting current supplied to said one exciting coil is stopped, said circuit means also steeply building up the respective exciting current supplied to a subsequently activated exciting coil by use of the charged voltage in said capacitor, wherein said number of position detecting elements are disposed in a manner such that said position detecting device outputs position detecting signals within a 30-degree electric angle section after any one of said salient poles begins to enter any one of said magnetic poles, so that said current supply control circuit is initiated to supply the exciting current respectively corresponding to the exciting coil associated with said any one of said magnetic poles.

7. The high-speed reluctance type motor according to claim 6, further comprising:

one inductance coil supplied with an inductance current in response to the second position detecting signal of said first, second and third phases; and an electric circuit converting the magnetic energy of said capacitor when said inductance coil is deactivated.

8. A three-phase half-wave high-speed reluctance type motor driven by a DC electric power source, said high speed reluctance type motor comprising:

an outer casing having an inner surface;

a rotor having an outer surface formed with a plurality of salient poles having the same circumferential width and equally spaced with each other in a circumferential direction, the rotor rotatably supported on the outer casing;

an armature having an inner surface formed with 6 n (n: a positive integer) pieces of magnetic pole respectively having circumferential widths of one of a 120- and a 180-degree electric angle and equally spaced from each other in the circumferential direction to face said plurality of salient poles over slight gaps, including first, second and third phase exciting coils, and fourth, fifth and sixth phase exciting coils respectively associated with said magnetic poles, said armature being fixed on an inner surface of the outer casing;

a position detecting device, having a number of position detecting elements spaced apart from each other so as to correspond to said exciting coils, successively outputting a first phase position detecting signal having a rectangular waveform of a predetermined signal level having a 60-degree width at regular intervals of a 360-degree electric angle, a second phase position detecting signal having the same rectangular waveform but delayed by an electric angle of 120 degrees with respect to the first phase position detecting signal, and a third phase position detecting signal having the same rectangular waveform but delayed by an electric angle of 120 degrees with respect to the second phase position detecting signal and also outputting fourth, fifth and sixth phase position detecting signals having the same rectangular waveforms and disposed between said first, second and third phase position detecting signals: in accordance with a rotational position of said rotor;

a current supply control circuit including a plurality of switching elements, each end of each phase exciting coil serially connected to a respective one of said plurality of switching elements, each of said plurality of switching elements interposed between the DC electric power source and a corresponding one of said first through sixth phase exciting coils, alternately activating and deactivating said first through sixth phase exciting coils by alternately turning on and off said corresponding serially connected switching elements in response to corresponding said first through sixth phase position detecting signals, to control exciting currents flowing through respective said first through sixth phase exciting coils, each switching element and corresponding serially connected exciting coil forming a joint unit;

circuit means including diodes respectively connected inversely to said joint units, first and second back-flow preventing diodes, respectively connected in a forward direction with respect to the DC electric power source and related to said first, second and third phase exciting coils and fourth, fifth and sixth phase exciting coils, respectively, and first and second capacitors connected in parallel with said first and second back-flow preventing diodes, respectively, said circuit means promptly discharging a magnetic energy stored in one exciting coil into a corresponding one of said first and second capacitors, as a charged voltage, through a corresponding one of said inversely connected diodes to charge said corresponding one capacitor and to extinguish the magnetic energy stored in said one exciting coil when the respective exciting current supplied to said one exciting coil is stopped, said circuit means steeply building up the respective exciting current supplied to a subsequently activated exciting coil by use of the charged voltage in said corresponding one capacitor, wherein said number of position detecting elements are disposed in a manner such that said position detecting device outputs position detecting signals within a 30-degree electric angle section after any one of said salient poles begins to enter any one of said magnetic poles, so that said current supply control circuit is initiated to supply the exciting current respectively corresponding to the exciting coil associated with said any one of said magnetic poles.

9. The high-speed reluctance type motor according to claim 8, further comprising:

first inductance coil supplied with first inductance currents corresponding to said first, second and third phase position detecting signals;

second inductance coil supplied with second inductance currents corresponding to said fourth, fifth and sixth phase position detecting signals; and an electric circuit for converting the magnetic energies stored in said first and second inductance coils into electrostatic energies of said corresponding first and second capacitors respectively, when the corresponding ones of said first and second inductance coils are deactivated.

10. A two-phase full-wave high-speed reluctance type motor driven by a DC electric power source, said high speed reluctance type motor comprising:

an outer casing having an inner surface;

a rotor having an outer surface formed with a plurality of salient poles having the same circumferential width and equally spaced with each other in a circumferential direction, the rotor rotatably supported on the outer casing;

an armature having an inner surface formed with 8 n (n: a positive integer) pieces of magnetic pole respectively having circumferential widths of one of a 120- and a 180-degree electric angle and equally spaced with each other in the circumferential direction to face said plurality of salient poles over slight gaps, including first phase and second phase exciting coils and third phase and fourth phase exciting coils respectively associated with said magnetic poles, said armature being fixed on the inner surface of the outer casing;

a position detecting device, having a number of position detecting elements spaced from each other so as to correspond to said exciting coils, successively outputting a first phase position detecting signal having a rectangular waveform of a predetermined signal level having a 90–150-degree width at regular intervals of a 360-degree electric angle and second phase position detecting signal having the same rectangular waveform but delayed by an electric angle of 90 degrees with respect to the first phase position detecting signal and also outputting a third phase and a fourth phase position detecting signals delayed by an electric angle of 180 degrees with respect to said first phase and second phase position detecting signals, respectively, in accordance with a rotational position of said rotor;

a current supply control circuit including a plurality of switching elements, each end of each phase exciting coil serially connected to a respective one of said plurality of switching elements, each of said plurality of switching elements interposed between the DC electric power source and said first through fourth phase exciting coils, said current supply control circuit alternately activating and deactivating said first through fourth phase exciting coils by alternately turning on and off said corresponding serially connected switching elements in response to said first through fourth phase position detecting signals, to control exciting currents flowing through respective said first through fourth phase exciting coils, each switching element and corresponding serially connected exciting coil forming a joint unit;

circuit means including diodes respectively connected inversely to said joint units, first and second back-flow preventing diodes respectively provided in a forward direction with respect to the DC electric power source and related to said first and third phase exciting coils, and second and fourth phase exciting coils, respectively, and first and second capacitors connected in parallel with said first and second back-flow preventing diodes, respectively, said circuit means promptly discharging a magnetic energy stored in one exciting coil into a corresponding one of said first and second capacitors, as a charged voltage, through a corresponding one of said inversely connected diodes to charge said corresponding one capacitor and to extinguish the magnetic energy stored in said one exciting coil when the respective exciting current supplied to said one exciting coil is stopped, said circuit means also steeply building up the respective exciting current supplied to a subsequently activated exciting coil by use of the charged voltage in said corresponding one capacitor, wherein said number of position detecting elements are disposed in a manner such that said position detecting device outputs position detecting signals within a 45-degree electric angle section after any one of said salient poles begins to enter any one of said magnetic poles, so that said current supply control circuit is initiated to supply the exciting current respectively corresponding to the exciting coil associated with said any one of said magnetic poles.

11. The high-speed reluctance type motor according to claim 10, further comprising:

first inductance coil supplied with first inductance currents corresponding to said first and third phase position detecting signals;

second inductance coil supplied with second inductance currents corresponding to said second and fourth phase position detecting signals; and an electric circuit converting the respective magnetic energies stored in said first and second inductance coils into electrostatic energies of said corresponding first and second capacitors, respectively, when the corresponding ones of said first and second inductance coils are deactivated.

12. A two-phase full-wave high-speed reluctance type motor driven by a DC electric power source, said high speed reluctance type motor comprising:

an outer casing having an inner surface;

a rotor having an outer surface formed with a plurality of salient poles having the same circumferential width and equally spaced with each other in a circumferential direction, the rotor rotatably supported on the outer casing;

an armature having an inner surface formed with 8 n (n: a positive integer) pieces of magnetic pole respectively having circumferential widths of one of a 120- and a 180-degree electric angle and equally spaced with each other in the circumferential direction to face said plurality of salient poles over slight gaps, including first and second phase exciting coils and third and fourth phase exciting coils respectively associated with said magnetic poles, said armature being fixed on the inner surface of the outer casing;

a position detecting device, having a number of position detecting elements spaced apart from each other so as to correspond to said exciting coils, successively outputting a first phase position detecting signal having a rectangular waveform of a predetermined signal level having a 90–150-degree width at regular intervals of a 360-degree electric angle and a second phase position detecting signal having the same rectangular waveform but delayed by an electric angle of 90 degrees with respect to the first phase position detecting signal and also outputting third and fourth phase position detecting signals delayed by an electric angle of 180 degrees with respect to said first and second phase position detecting signals, respectively, in accordance with a rotational position of said rotor;

a current supply control circuit including a plurality of switching elements, each end of each phase exciting coil serially connected to a respective one of said plurality of switching elements, each of said plurality of switching elements interposed between the DC electric power source and said first through fourth phase exciting coils, said current supply control circuit alternately activating and deactivating said first through fourth phase exciting coils by alternately turning on and off said corresponding serially connected switching elements in response to said first through fourth phase position detecting signals, to control exciting currents flowing through respective said first through fourth phase exciting coils, each switching element and corresponding serially connected exciting coil forming a joint unit;

circuit means including diodes respectively connected inversely with said joint units, first, second, third and fourth back-flow preventing diodes respectively connected in a forward direction with respect to the DC electric power source and related to said first through fourth phase exciting coils, respectively, and first, second, third and fourth capacitors connected in parallel with said first, second, third and fourth back-flow preventing diodes, respectively, said circuit means promptly discharging a magnetic energy stored in one exciting coil into a corresponding one of said first, second, third and fourth capacitors, as a charged voltage, through a corresponding one of said inversely connected diodes so as to charge said one capacitor and extinguish the magnetic energy stored in said one exciting coil when the respective magnetic current supplied to said one exciting coil is stopped, said circuit means also steeply building up the respective exciting current supplied to a subsequently activated exciting coil by use of the charged voltage in said corresponding one capacitor, wherein said number of position detecting elements are disposed in a manner such that said position detecting-device outputs position detecting signals within a 45-degree electric angle section after any one of said salient poles begins to enter any one of said magnetic poles, so that said current supply control circuit is initiated to supply the exciting current respectively corresponding to the exciting coil associated with said any one of said magnetic poles.

13. The high-speed reluctance type motor according to claim 11, further comprising:

first, second, third and fourth inductance coils supplied with respective first through fourth inductance currents corresponding to widths of said first through fourth phase position detecting signals, respectively; and an electric circuit converting the respective magnetic energies stored in said first, second, third and fourth inductance coils into electrostatic energies of said corresponding first, second, third and fourth capacitors, respectively, when the corresponding ones of said first, second, third and fourth inductance coils are deactivated.

* * * * *

UNITED STATES PATENT AND TRADEMARK OFFICE
CERTIFICATE OF CORRECTION

PATENT NO. : 5,341,076
DATED : August 23, 1994
INVENTOR(S) : Itsuki Bahn

It is certified that error appears in the above-indentified patent and that said Letters Patent is hereby corrected as shown below:

Col. 1, line 15, after "poles" delete ",", and after "known" insert --,--.

Col. 2, line 20, "comprising" should be --comprises--; and
        line 61, delete "a".

Col. 3, line 52, "No. 1-, No. 2- and No. 3-" should be --No. 1-, No. 2- and No. 3---;
        line 54, "No. 1-, No. 2- and No. 3-" should be --No. 1-, No. 2- and No. 3---;
        line 57, "No. 1, No. 2 and No. 3" should be --No. 1-, No. 2- and No. 3---;
        line 59, at beginning of line delete "a";
        line 65, "No. 1" (second occurrence) should be --No. 1--;
        line 66, "No. 2" (second occurrence) should be --No. 2--; and
        line 67, "No. 3" (second occurrence) should be --No. 3--.

Col. 4, line 2, after "diodes" insert --,--;
        line 13, after "capacitor" insert --,--;
        line 27, "No. 1" (second occurrence) should be --No. 1--;
        line 28, "No. 2" (second occurrence) should be --No. 2--; and
        line 29, "No. 3" (second occurrence) should be --No. 3--.

UNITED STATES PATENT AND TRADEMARK OFFICE
CERTIFICATE OF CORRECTION

PATENT NO. : 5,341,076
DATED : August 23, 1994
INVENTOR(S) : Itsuki Bahn

It is certified that error appears in the above-indentified patent and that said Letters Patent is hereby corrected as shown below:

Col. 5, lines 19-20, "No. 1-phase, No. 2-phase and No. 3-phase" should be --<u>No. 1</u>-phase, <u>No. 2</u>-phase and <u>No. 3</u>-phase--;

lines 38-39, "No. 1-phase, No. 2-phase and No. 3-phase" should be --<u>No. 1</u>-phase, <u>No. 2</u>-phase and <u>No. 3</u>-phase--;

line 47, "No. 1-, No. 2- and No. 3-" should be --<u>No. 1</u>-, <u>No. 2</u>- and <u>No. 3</u>---;

line 49, "No. 1-, No. 2- and No. 3-" should be --<u>No. 1</u>-, <u>No. 2</u>- and <u>No. 3</u>---;

line 52, "No. 1-, No. 2- and No. 3-" should be --<u>No. 1</u>-, <u>No. 2</u>- and <u>No. 3</u>---; and lines 60-61, "No. 1-, No. 2- and No. 3-" should be --<u>No. 1</u>-, <u>No. 2</u>- and <u>No. 3</u>---.

Col. 6, line 9, after "within" insert --a--;

line 20, after "signals" insert --, a--;

line 22, "No. 1-, No. 2- and No. 3-" should be --<u>No. 1</u>-, <u>No. 2</u>- and <u>No. 3</u>---;

line 45, "No. 1-phase and No. 2-phase" should be --<u>No. 1</u>-phase and <u>No. 2</u>-phase--;

line 60, "No. 1" should be <u>No. 1</u>--;

line 61, "No. 2" should be <u>No. 2</u>--; and line 68, "No. 1" (second occurrence) should be --<u>No. 1</u>--.

UNITED STATES PATENT AND TRADEMARK OFFICE
CERTIFICATE OF CORRECTION

PATENT NO. : 5,341,076
DATED : August 23, 1994
INVENTOR(S) : Itsuki Bahn

It is certified that error appears in the above-indentified patent and that said Letters Patent is hereby corrected as shown below:

Col. 7, line 1, "No. 2" should be --No. 2--;
        lines 2-3, "No. 1- and No. 2-" should be --No. 1- and No. 2---;
        line 5, "No. 1- and No. 2-" should be --No. 1- and No. 2---;
        line 13, "No. 1" should be --No. 1--;
        line 14, "No. 2" should be --No. 2--;
        line 37, after "include" insert --a--;
        line 39, "No. 1" should be --No. 1--;
        line 41, "No. 2" (second occurrence) should be --No. 2--; and
        line 63, "No. 1-phase and No. 2-phase" should be --No. 1-phase and No. 2-phase--.

Col. 8, line 11, "No. 2" should be --No. 2--;
        lines 18-19, "No. 1- and No. 2-" should be --No. 1- and No. 2---;
        lines 20-21, "No. 1- and No. 2-" should be --No. 1- and No. 2---;
        line 23, "No. 1- and No. 2-" should be --No. 1- and No. 2---;
        line 31, "No. 1" (second occurrence) should be --No. 1--, and "No. 2" (second occurrence) should be --No. 2--;
        line 59, "No. 1" (second occurrence) should be --No. 1--, and "No. 2" (second occurrence) should be --No. 2--; and
        line 67, delete "with".

UNITED STATES PATENT AND TRADEMARK OFFICE
CERTIFICATE OF CORRECTION

PATENT NO. : 5,341,076
DATED : August 23, 1994
INVENTOR(S) : Itsuki Bahn

It is certified that error appears in the above-indentified patent and that said Letters Patent is hereby corrected as shown below:

```
    Col. 9, line 31, after "with" insert --a--.

Col. 10, line 52, "18" should be --16--.

Col. 11, line 30, "comprises" should be --comprising--;
         line 36, "18g" should be --18f--; and
         line 39, delete "the" (second occurrence).

Col. 12, line 34, after "which" insert --receives as--;
         line 48, after --17f-- insert --,--, and after
"i.e." insert --,--;
         line 66, after "respectively" insert --,--; and
         lines 67-68, after "respectively" insert --,--.

Col. 13, line 23, after "the" (first occurrence) insert
--respective--, and delete "respectively".

Col. 14, line 3, "i" should be --1--.

Col. 15, line 22, after "executed" insert --,--.

Col. 16, line 6, after "i.e." insert --,--; and
         line 55, after "20n" insert --,--.
```

UNITED STATES PATENT AND TRADEMARK OFFICE
CERTIFICATE OF CORRECTION

PATENT NO. : 5,341,076
DATED : August 23, 1994
INVENTOR(S) : Itsuki Bahn

It is certified that error appears in the above-indentified patent and that said Letters Patent is hereby corrected as shown below:

Col. 17, line 5, after "4a" insert --,--, and after "i.e." insert --,--;
    line 20, "20ng" should be --20n--; and
    line 25, after "4" insert --,--, and after "i.e." insert --,--.

Col. 18, line 23, after "47c" insert --,--; and
    line 68, after "S-pole" insert --,--.

Col. 19, lines 51-52, "No. 1-, No. 2- and No. 3-" should be --No. 1-, No. 2- and No. 3---;
    line 65, "No. 1-, No. 2- and No. 3-" should be --No. 1-, No. 2- and No. 3---; and
    line 66, after "signals" insert --,--.

Col. 20, line 13, "No. 1-, No. 2- and No. 3-" should be --No. 1-, No. 2- and No. 3---;
    line 15 "No. 1" (second occurrence) should be --No. 1--; and
    line 16, "No. 2" (second occurrence) should be --No. 2-- and "No. 3" (second occurrence) should be --No. 3--.

UNITED STATES PATENT AND TRADEMARK OFFICE
CERTIFICATE OF CORRECTION

PATENT NO. : 5,341,076
DATED : August 23, 1994
INVENTOR(S) : Itsuki Bahn

It is certified that error appears in the above-indentified patent and that said Letters Patent is hereby corrected as shown below:

Col. 21, lines 11-12, "No. 1-, No. 2- and No. 3-" should be --No. 1-, No. 2- and No. 3---;
        line 31, after "60" insert --,--; and
        line 32, after "respectively" insert --,--.

Col. 23, line 10, after "28c" delete space.

Col. 25, line 24, after "," insert --a--;
        line 55, "16" (second occurrence) should be --16--;
        line 63, delete "to";
        line 64, "16" (second occurrence) should be --16--;
        line 65, "16a, 16b" should be --16a, 16b--;
        line 66, "16" should be --16--;
        line 67, "17a, 17b" should be --17a, 17b--, and "16a" should be 16a--; and
        line 68, "16b" should be --16b--.

Col. 26, line 2, "16a, 16b" should be --16a, 16b--;
        line 12, "16a and 16d" should be --16a and 16d--;
        line 13, "16b and 16e, and 16c and 16f" should be --16b and 16e, and 16c and 16f--;
        line 39, "18" should be --16--;
        line 43, "16" should be --16--;
        lines 51-52, "No. 1-, No. 2- and No. 3-" should be --No. 1-, No. 2- and No. 3---;
        line 52, after "signals" insert --,--;
        line 54, "No. 1" (second occurrence) should be --No. 1--;
        line 56, "No. 2" (second occurrence) should be --No. 2--; and
        line 58, "No. 3" (second occurrence) should be --No. 3--.

UNITED STATES PATENT AND TRADEMARK OFFICE
CERTIFICATE OF CORRECTION

PATENT NO. : 5,341,076
DATED : August 23, 1994
INVENTOR(S) : Itsuki Bahn

It is certified that error appears in the above-indentified patent and that said Letters Patent is hereby corrected as shown below:

```
    Col. 27, line 37, after "," insert --in--.

Col. 28, line 37, after "44a" insert --,--.

Col. 29, line 9, after "15" insert --,--;
         line 37, "18b" should be --16b--;
         line 38, ";" should be --1--;
         line 43, "18" should be --16--, and "8" should be
--6--; and
         line 62, after "S-pole" insert --,--.

Col. 30, line 29, "10d and 10e" should be --10d and
10e--;
         line 31, "10d and 10e" should be --10d and 10e--;
         line 34, "10d and 10e" should be --10d and 10e--;
         line 60, "10d and 10e" should be --10d and 10e--;
and
         line 66, "No. 1" (second occurrence) should be
--No. 1--.

Col. 31, line 1, "No. 2" (second occurrence) should be
--No. 2--;
         line 5, "No. 1" (second occurrence) should be --No.
1--;
         line 26, "No. 2" (second occurrence) should be
--No. 2--;
         line 27, after "respectively" insert --,--;
         line 37, "No. 1" (second occurrence) should be
--No. 1--; and
         line 40, "No. 2" should be --No. 2--.
```

UNITED STATES PATENT AND TRADEMARK OFFICE
CERTIFICATE OF CORRECTION

PATENT NO. : 5,341,076

DATED : August 23, 1994

INVENTOR(S) : Itsuki Bahn

It is certified that error appears in the above-indentified patent and that said Letters Patent is hereby corrected as shown below:

Col. 32, line 1, ";" should be --,--;
        line 12, after "In" insert --the--; and
        line 66, "No. 1 and No. 2" should be --<u>No. 1</u> and <u>No. 2</u>--.

Col. 33, line 28, "No. 1 and No. 2" should be --<u>No. 1</u> and <u>No. 2</u>--; and
        line 31, after "49b" insert --,--.

Col. 34, line 21, after "- - -" insert --.--; and
        line 41, after "prevented" insert --,--.

Col. 35, line 18, after "42g" insert --,--; and
        line 38, after "second" delete ",".

Col. 36, line 8, after "units" insert --,--;
        line 24, after "stopped" insert --,--; and
        lines 31-32, "30 degree" should be --30-degree--.

Col. 38, line 46, after "coils" insert --,--.

Col. 41, line 1, before "first" (first occurrence) insert --a--; and
        line 4, before "second" (first occurrence) insert --a--.

UNITED STATES PATENT AND TRADEMARK OFFICE
CERTIFICATE OF CORRECTION

PATENT NO. : 5,341,076

DATED : August 23, 1994

INVENTOR(S) : Itsuki Bahn

It is certified that error appears in the above-indentified patent and that said Letters Patent is hereby corrected as shown below:

Col. 42, line 31, before "first" (first occurrence) insert --a--; and
         line 34, before "second" (first occurrence) insert --a--.

Col. 44, line 24, "11" should be --12--.

Signed and Sealed this

Seventh Day of February, 1995

BRUCE LEHMAN

*Attest:*

*Attesting Officer*    *Commissioner of Patents and Trademarks*